(12) United States Patent
Weiler et al.

(10) Patent No.: US 11,109,546 B2
(45) Date of Patent: Sep. 7, 2021

(54) IRRIGATION CONTROLLER WIRELESS NETWORK ADAPTER AND NETWORKED REMOTE SERVICE

(71) Applicant: Rain Bird Corporation, Azusa, CA (US)

(72) Inventors: Steven W. Weiler, Escondido, CA (US); David M. Redmond, Scottsdale, AZ (US); Harvey J. Nickerson, El Cajon, CA (US); Timothy J. Crist, Tucson, AZ (US); Gregory W. Decker, Oro Valley, AZ (US)

(73) Assignee: Walmart Apollo, LLC, Bentonville, AR (US)

( * ) Notice: Subject to any disclaimer, the term of this patent is extended or adjusted under 35 U.S.C. 154(b) by 32 days.

(21) Appl. No.: 16/408,066

(22) Filed: May 9, 2019

(65) Prior Publication Data

US 2019/0261585 A1    Aug. 29, 2019

Related U.S. Application Data

(60) Continuation of application No. 15/270,986, filed on Sep. 20, 2016, now Pat. No. 10,292,343, which is a
(Continued)

(51) Int. Cl.
*A01G 25/16* (2006.01)
*G05B 19/042* (2006.01)
(Continued)

(52) U.S. Cl.
CPC ........... *A01G 25/165* (2013.01); *A01G 25/16* (2013.01); *G05B 19/0426* (2013.01);
(Continued)

(58) Field of Classification Search
CPC .. A01G 25/165; A01G 25/16; G05B 19/0426; G06Q 50/02; H04L 63/102; H04W 92/10
See application file for complete search history.

(56) References Cited

U.S. PATENT DOCUMENTS 3,114,243 A    12/1963  Winters
3,372,899 A     3/1968  McPherson
(Continued)

FOREIGN PATENT DOCUMENTS

EP    2730159    5/2014
WO    9003724    4/1990
(Continued)

OTHER PUBLICATIONS

EPO; App. No. 12306370; European Examination Report dated Feb. 15, 2016.
(Continued)

*Primary Examiner* — Michael D Masinick
(74) *Attorney, Agent, or Firm* — Fitch, Even, Tabin & Flannery LLP

(57) ABSTRACT

Some embodiments provide systems for use in controlling irrigation, comprising: an irrigation controller configured to couple with one or more valves at a site and to control activation and deactivation of the one or more valves in accordance with an irrigation schedule stored in the irrigation controller; a wireless adapter directly communicationally coupled through a direct wired connection with the irrigation controller; and a network adapter wirelessly coupled over a point-to-point wireless communication path with the wireless adapter, wherein the network adapter is configured to further couple through a direct wired connection with a local router configured to provide communication over a distributed network to a remote server; wherein the wireless adapter is configured to poll the irrigation controller to acquire and locally store status information;
(Continued)

and the wireless adapter is configured to communicate, over the point-to-point wireless channel, the status information to the server.

21 Claims, 18 Drawing Sheets

Related U.S. Application Data division of application No. 13/843,319, filed on Mar. 15, 2013, now Pat. No. 9,468,162.

(60) Provisional application No. 61/770,984, filed on Feb. 28, 2013, provisional application No. 61/678,543, filed on Aug. 1, 2012.

(51) Int. Cl.
    *G06Q 50/02*     (2012.01)
    *H04L 29/06*     (2006.01)
    *H04W 92/10*     (2009.01)

(52) U.S. Cl.
    CPC ........... *G06Q 50/02* (2013.01); *H04L 63/102* (2013.01); *H04W 92/10* (2013.01)

(56) References Cited

U.S. PATENT DOCUMENTS

| | | |
|---|---|---|
| 3,599,867 A | 8/1971 | Griswold |
| 4,176,395 A | 11/1979 | Evelyn-Veere |
| 4,185,650 A | 1/1980 | Neves |
| 4,189,776 A | 2/1980 | Kendall |
| 4,230,989 A | 10/1980 | Buehrle |
| RE31,023 E | 9/1982 | Hall |
| 4,545,396 A | 10/1985 | Miller |
| 4,548,225 A | 10/1985 | Busalacchi |
| 4,626,984 A | 12/1986 | Unruh |
| 4,685,920 A | 8/1987 | Fritch |
| 4,760,547 A | 7/1988 | Duxbury |
| 4,937,732 A | 6/1990 | Brundisini |
| 4,962,522 A | 10/1990 | Marian |
| 4,985,638 A | 1/1991 | Brock |
| 5,097,861 A | 3/1992 | Hopkins |
| 5,173,855 A | 12/1992 | Nielsen |
| 5,208,855 A | 5/1993 | Marian |
| 5,251,153 A | 10/1993 | Nielsen |
| 5,333,785 A | 8/1994 | Dodds |
| 5,400,246 A | 3/1995 | Wilson |
| 5,427,350 A | 6/1995 | Rinkewich |
| 5,444,611 A | 8/1995 | Woytowitz |
| 5,465,904 A | 11/1995 | Vaello |
| 5,479,338 A | 12/1995 | Ericksen |
| 5,479,339 A | 12/1995 | Miller |
| 5,651,500 A | 7/1997 | Patterson |
| 5,696,671 A | 12/1997 | Oliver |
| 5,740,031 A | 4/1998 | Gagnon |
| 5,740,038 A | 4/1998 | Hergert |
| 5,748,466 A | 5/1998 | McGivern |
| 5,760,706 A | 6/1998 | Kiss |
| 5,805,442 A | 9/1998 | Crater |
| 5,813,606 A | 9/1998 | Ziff |
| 5,828,807 A | 10/1998 | Tucker |
| 5,860,715 A | 1/1999 | Lohde |
| 5,870,302 A * | 2/1999 | Oliver .................. A01G 25/167 700/11 |
| 5,884,224 A | 3/1999 | McNabb |
| 5,914,847 A | 6/1999 | Alexanian |
| 5,921,280 A | 7/1999 | Ericksen |
| 5,999,908 A | 12/1999 | Abelow |
| 6,019,290 A | 2/2000 | Grott |
| 6,061,603 A | 5/2000 | Papadopoulos |
| 6,088,621 A | 7/2000 | Woytowitz |
| 6,098,898 A | 8/2000 | Storch |
| 6,102,061 A | 8/2000 | Addink |
| 6,108,590 A | 8/2000 | Hergert |
| 6,123,093 A | 9/2000 | D'Antonio |
| 6,145,755 A | 11/2000 | Feltz |
| 6,173,727 B1 | 1/2001 | Davey |
| 6,218,953 B1 | 4/2001 | Petite |
| 6,227,220 B1 | 5/2001 | Addink |
| 6,236,332 B1 | 5/2001 | Conkright |
| 6,240,336 B1 | 5/2001 | Brundisini |
| 6,267,298 B1 | 7/2001 | Campbell |
| 6,283,139 B1 | 9/2001 | Symonds |
| 6,298,285 B1 | 10/2001 | Addink |
| 6,314,340 B1 | 11/2001 | Mecham |
| 6,337,971 B1 | 1/2002 | Abts |
| 6,437,692 B1 | 8/2002 | Petite |
| 6,452,499 B1 | 9/2002 | Runge |
| 6,453,215 B1 | 9/2002 | Lavoie |
| 6,491,062 B1 | 12/2002 | Croft |
| 6,507,775 B1 | 1/2003 | Simon |
| 6,518,980 B1 | 2/2003 | Demotte |
| 6,529,589 B1 | 3/2003 | Nelson |
| 6,553,336 B1 | 4/2003 | Johnson |
| 6,600,971 B1 | 7/2003 | Smith |
| 6,708,084 B2 | 3/2004 | Battistutta |
| 6,721,630 B1 | 4/2004 | Woytowitz |
| 6,763,287 B2 | 7/2004 | Brundisini |
| 6,782,310 B2 | 8/2004 | Bailey |
| 6,782,311 B2 | 8/2004 | Barlow |
| 6,823,239 B2 | 11/2004 | Sieminski |
| 6,834,662 B1 | 12/2004 | Olson |
| 6,850,819 B1 | 2/2005 | Townsend |
| 6,853,883 B2 | 2/2005 | Kreikemeier |
| 6,891,838 B1 | 5/2005 | Petite |
| 6,892,113 B1 | 5/2005 | Addink |
| 6,895,987 B2 | 5/2005 | Addink |
| 6,898,467 B1 | 5/2005 | Smith |
| 6,950,728 B1 | 9/2005 | Addink |
| 6,963,808 B1 | 11/2005 | Addink |
| 6,977,351 B1 | 12/2005 | Woytowitz |
| 6,990,335 B1 | 1/2006 | Shamoon |
| 6,997,642 B2 | 2/2006 | Bishop |
| 7,003,357 B1 | 2/2006 | Kreikemeier |
| 7,010,394 B1 | 3/2006 | Runge |
| 7,010,395 B1 | 3/2006 | Goldberg |
| 7,010,396 B2 | 3/2006 | Ware |
| 7,048,204 B1 | 5/2006 | Addink |
| 7,050,887 B2 | 5/2006 | Alvarez |
| 7,053,767 B2 | 5/2006 | Petite |
| 7,058,478 B2 | 6/2006 | Alexanian |
| 7,058,479 B2 | 6/2006 | Miller |
| 7,103,511 B2 | 9/2006 | Petite |
| 7,123,993 B1 | 10/2006 | Freeman |
| 7,133,749 B2 | 11/2006 | Goldberg |
| 7,146,254 B1 | 12/2006 | Howard |
| 7,181,319 B1 | 2/2007 | Woytowtiz |
| 7,182,272 B1 | 2/2007 | Marian |
| 7,203,576 B1 | 4/2007 | Wilson |
| 7,216,020 B2 | 5/2007 | Marian |
| 7,216,659 B2 | 5/2007 | Caamano |
| 7,225,057 B2 | 5/2007 | Froman |
| 7,245,991 B1 | 7/2007 | Woytowitz |
| 7,248,945 B2 | 7/2007 | Woytowitz |
| 7,250,860 B2 | 7/2007 | Smith |
| 7,257,397 B2 | 8/2007 | Shamoon |
| 7,264,177 B2 | 9/2007 | Buck |
| 7,266,428 B2 | 9/2007 | Alexanian |
| 7,269,829 B2 | 9/2007 | Smith |
| 7,272,456 B2 | 9/2007 | Farchmin |
| 7,280,892 B2 | 10/2007 | Bavel |
| 7,286,904 B2 | 10/2007 | Graham |
| 7,305,280 B2 | 12/2007 | Marian |
| 7,315,764 B1 | 1/2008 | Sutardja |
| 7,317,972 B2 | 1/2008 | Addink |
| 7,328,089 B2 | 2/2008 | Curren |
| 7,330,796 B2 | 2/2008 | Addink |
| 7,337,042 B2 | 2/2008 | Marian |
| 7,359,769 B2 | 4/2008 | Bailey |
| 7,363,113 B2 | 4/2008 | Runge |
| 7,383,721 B2 | 6/2008 | Parsons |
| 7,398,139 B1 | 7/2008 | Woytowitz |

(56) References Cited

U.S. PATENT DOCUMENTS

| | | |
|---|---|---|
| 7,400,944 B2 | 7/2008 | Bailey |
| 7,403,840 B2 | 7/2008 | Moore |
| 7,406,363 B2 | 7/2008 | Doering |
| 7,412,303 B1 | 8/2008 | Porter |
| 7,424,291 B1 | 9/2008 | Lunsford |
| 7,444,207 B2 | 10/2008 | Nickerson |
| 7,457,676 B1 | 11/2008 | Sutardja |
| 7,468,661 B2 | 12/2008 | Petite |
| 7,469,707 B2 | 12/2008 | Anderson |
| 7,532,954 B2 | 5/2009 | Evelyn-Veere |
| 7,546,172 B1 | 6/2009 | Sutardja |
| 7,558,650 B2 | 7/2009 | Thornton |
| 7,574,285 B2 | 8/2009 | Kah |
| 7,584,023 B1 | 9/2009 | Palmer |
| 7,584,053 B2 | 9/2009 | Abts |
| 7,590,471 B2 | 9/2009 | Jacobsen |
| 7,596,429 B2 | 9/2009 | Cardinal |
| 7,613,546 B2 | 11/2009 | Nelson |
| 7,620,565 B2 | 11/2009 | Abelow |
| 7,640,079 B2 | 12/2009 | Nickerson |
| D607,847 S | 1/2010 | Elliott |
| 7,643,823 B2 | 1/2010 | Shamoon |
| 7,650,425 B2 | 1/2010 | Davis |
| 7,693,582 B2 | 4/2010 | Bergman |
| 7,701,691 B2 | 4/2010 | Brundisini |
| 7,711,454 B2 | 5/2010 | Addink |
| 7,756,086 B2 | 7/2010 | Petite |
| 7,761,189 B2 | 7/2010 | Froman |
| 7,778,736 B2 | 8/2010 | Sutardja |
| 7,792,612 B2 | 9/2010 | Kah |
| 7,809,475 B2 | 10/2010 | Kaprielian |
| 7,822,511 B2 | 10/2010 | Ivans |
| 7,831,321 B2 | 11/2010 | Ebrom |
| 7,844,367 B2 | 11/2010 | Nickerson |
| 7,844,368 B2 | 11/2010 | Alexanian |
| 7,844,369 B2 | 11/2010 | Nickerson |
| 7,853,363 B1 | 12/2010 | Porter |
| 7,877,168 B1 | 1/2011 | Porter |
| 7,883,027 B2 | 2/2011 | Fekete |
| 7,883,029 B2 | 2/2011 | Chalemin |
| 7,899,580 B2 | 3/2011 | Cardinal |
| 7,912,588 B2 | 3/2011 | Runge |
| 7,913,653 B2 | 3/2011 | Jordan |
| 7,916,458 B2 | 3/2011 | Nelson |
| 7,917,249 B2 | 3/2011 | Jacobsen |
| 7,930,069 B2 | 4/2011 | Savelle |
| 7,930,070 B2 | 4/2011 | Imes |
| 7,937,187 B2 | 5/2011 | Kaprielian |
| 7,953,517 B1 | 5/2011 | Porter |
| 7,962,244 B2 | 6/2011 | Alexanian |
| 7,962,245 B2 | 6/2011 | Runge |
| 7,966,153 B2 | 6/2011 | Bangalore |
| 7,978,059 B2 | 7/2011 | Petite |
| 7,987,446 B2 | 7/2011 | Cypher |
| 7,996,115 B2 | 8/2011 | Nickerson |
| 7,996,192 B2 | 8/2011 | Repelli |
| 8,010,238 B2 | 8/2011 | Ensworth |
| 8,013,732 B2 | 9/2011 | Petite |
| 8,014,904 B1 | 9/2011 | Woytowitz |
| 8,019,328 B2 | 9/2011 | Lunsford |
| 8,019,482 B2 | 9/2011 | Sutardja |
| 8,024,073 B2 | 9/2011 | Imes |
| 8,024,074 B2 | 9/2011 | Stelford |
| 8,024,075 B2 | 9/2011 | Fekete |
| 8,055,389 B2 | 11/2011 | Holindrake |
| 8,061,080 B2 | 11/2011 | Loebl |
| 8,064,412 B2 | 11/2011 | Petite |
| 8,082,065 B2 | 12/2011 | Imes |
| 8,099,195 B2 | 1/2012 | Imes |
| 8,104,993 B2 | 1/2012 | Hitt |
| 8,108,076 B2 | 1/2012 | Imes |
| 8,108,077 B2 | 1/2012 | Smith |
| 8,136,484 B2 | 3/2012 | Jordan |
| 8,145,359 B2 | 3/2012 | Addink |
| 8,150,554 B2 | 4/2012 | Anderson |
| 8,158,248 B2 | 4/2012 | Hara |
| 8,160,750 B2 | 4/2012 | Weiler |
| 8,174,381 B2 | 5/2012 | Imes |
| 8,191,307 B2 | 6/2012 | Donoghue |
| 8,193,930 B2 | 6/2012 | Petite |
| 8,209,061 B2 | 6/2012 | Palmer |
| 8,215,570 B2 | 7/2012 | Hitt |
| 8,217,781 B2 | 7/2012 | Ebrom |
| 8,219,935 B2 | 7/2012 | Hunts |
| 8,224,493 B2 | 7/2012 | Walker |
| 8,225,810 B2 | 7/2012 | Blanchard |
| 8,234,014 B1 | 7/2012 | Ingle |
| 8,244,404 B2 | 8/2012 | Nickerson |
| 8,250,163 B2 | 8/2012 | Castaldo |
| 8,265,797 B2 | 9/2012 | Nickerson |
| 8,265,798 B2 | 9/2012 | Imes |
| 8,271,144 B2 | 9/2012 | Kah |
| 8,275,309 B2 | 9/2012 | Woytowitz |
| 8,285,460 B2 | 10/2012 | Hoffman |
| 8,301,309 B1 | 10/2012 | Woytoxitz |
| 8,302,881 B1 | 11/2012 | Campbell |
| 8,302,882 B2 | 11/2012 | Nelson |
| 8,311,765 B2 | 11/2012 | Nielsen |
| 8,321,365 B2 | 11/2012 | Anderson |
| 8,322,072 B2 | 12/2012 | Anderson |
| 8,326,440 B2 | 12/2012 | Christfort |
| 8,335,304 B2 | 12/2012 | Petite |
| 8,340,828 B2 | 12/2012 | Danieli |
| 8,341,023 B2 | 12/2012 | Benisti |
| 8,359,142 B2 | 1/2013 | Hoffman |
| 8,588,990 B2 | 1/2013 | Caceres |
| 8,369,996 B2 | 2/2013 | Choat |
| 8,374,930 B2 | 2/2013 | Benisti |
| 8,379,564 B2 | 2/2013 | Petite |
| 8,392,561 B1 | 3/2013 | Dyer |
| 8,396,602 B2 | 3/2013 | Imes |
| 8,396,604 B2 | 3/2013 | Imes |
| 8,401,705 B2 | 3/2013 | Alexanian |
| 8,571,518 B2 | 3/2013 | Imes |
| 8,412,382 B2 | 4/2013 | Imes |
| 8,423,437 B2 | 4/2013 | Benisti |
| 8,428,782 B2 | 4/2013 | Imes |
| 8,452,457 B2 | 4/2013 | Matsuoka |
| 8,442,695 B2 | 5/2013 | Imes |
| 8,446,884 B2 | 5/2013 | Petite |
| 8,457,797 B2 | 6/2013 | Imes |
| 8,600,564 B2 | 6/2013 | Imes |
| 8,473,109 B1 | 7/2013 | Imes |
| 8,477,021 B2 | 7/2013 | Slack |
| 8,498,572 B1 | 7/2013 | Schooley |
| 8,498,749 B2 | 7/2013 | Imes |
| 8,504,180 B2 | 8/2013 | Imes |
| 8,504,183 B2 | 8/2013 | McKinley |
| 8,509,683 B2 | 8/2013 | Woytowitz |
| 8,509,954 B2 | 8/2013 | Imes |
| 8,538,592 B2 | 9/2013 | Alexanian |
| 8,548,632 B1 | 10/2013 | Porter |
| 8,554,380 B2 | 10/2013 | Nourian |
| 8,565,904 B2 | 10/2013 | Kantor |
| 8,573,049 B1 | 11/2013 | Ware |
| 8,583,263 B2 | 11/2013 | Hoffberg |
| 8,600,569 B2 | 12/2013 | Woytowitz |
| 8,606,415 B1 | 12/2013 | Woytowitz |
| 8,620,480 B2 | 12/2013 | Alexanian |
| 8,620,481 B2 | 12/2013 | Holindrake |
| 8,626,344 B2 | 1/2014 | Imes |
| 8,636,122 B2 | 1/2014 | Smith |
| 8,649,907 B2 | 2/2014 | Ersavas |
| 8,650,069 B2 | 2/2014 | Mason, Sr. |
| 8,659,183 B2 | 2/2014 | Crist |
| 8,660,705 B2 | 2/2014 | Woytowitz |
| 8,680,983 B2 | 3/2014 | Ebrom |
| 8,874,275 B2 | 3/2014 | Alexanian |
| 8,924,032 B2 | 3/2014 | Woytowitz |
| 8,700,222 B1 | 4/2014 | Woytowitz |
| 8,706,913 B2 | 4/2014 | Doherty |
| 8,712,592 B2 | 4/2014 | Carlson |
| 8,738,189 B2 | 5/2014 | Alexanian |
| 8,750,796 B2 | 6/2014 | Claus |

(56) References Cited

U.S. PATENT DOCUMENTS

| | | |
|---|---|---|
| 8,751,052 B1 | 6/2014 | Campbell |
| 8,793,024 B1 | 7/2014 | Woytowitz |
| 8,812,007 B2 | 8/2014 | Hitt |
| 8,819,432 B2 | 8/2014 | Bergsten |
| 8,838,021 B2 | 9/2014 | Woytowitz |
| 8,839,135 B2 | 9/2014 | Vander Griend |
| 8,843,241 B2 | 9/2014 | Saberi |
| 8,855,794 B2 | 10/2014 | Imes |
| 8,855,830 B2 | 10/2014 | Imes |
| 8,862,275 B2 | 10/2014 | Runge |
| 8,862,277 B1 | 10/2014 | Campbell |
| 8,885,048 B2 | 11/2014 | Liu |
| 8,924,587 B2 | 12/2014 | Petite |
| 8,924,891 B2 | 12/2014 | Hunts |
| 8,930,032 B2 | 1/2015 | Shupe |
| 8,942,835 B2 | 1/2015 | Gerdes |
| 8,948,921 B2 | 2/2015 | Halahan |
| 8,964,708 B2 | 2/2015 | Petite |
| 8,977,400 B1 | 3/2015 | Porter |
| 8,981,946 B2 | 3/2015 | Runge |
| 9,007,050 B2 | 4/2015 | Hill |
| 9,032,998 B2 | 5/2015 | O'Brien |
| 9,043,036 B2 | 5/2015 | Fekete |
| 9,079,748 B2 | 7/2015 | Tracey |
| 9,081,376 B2 | 7/2015 | Woytowitz |
| 9,095,102 B2 | 8/2015 | Masters |
| 9,121,623 B2 | 9/2015 | Filson |
| 9,128,494 B2 | 9/2015 | Viera |
| 9,149,013 B2 | 10/2015 | Andrews |
| 9,158,292 B2 | 10/2015 | Quail |
| 9,164,524 B2 | 10/2015 | Imes |
| 9,192,110 B2 | 11/2015 | Standerfer |
| 9,200,985 B2 | 12/2015 | Rice |
| 9,209,652 B2 | 12/2015 | Imes |
| 9,258,952 B2 | 2/2016 | Walker |
| 9,270,645 B2 | 2/2016 | Dyer |
| 9,280,885 B2 | 3/2016 | Frederick |
| 9,295,170 B1 | 3/2016 | Woytowitz |
| 9,297,150 B2 | 3/2016 | Klicpera |
| 9,301,460 B2 | 4/2016 | Runge |
| 9,301,461 B2 | 4/2016 | Woytowitz |
| 9,307,620 B2 | 4/2016 | Woytowitz |
| 9,307,706 B2 | 4/2016 | Larsen |
| 9,319,234 B2 | 4/2016 | Davis |
| 9,324,067 B2 | 4/2016 | Van Os |
| 9,326,462 B2 | 5/2016 | Runge |
| 9,360,874 B2 | 6/2016 | Imes |
| 9,380,750 B2 | 7/2016 | Wang |
| 9,405,310 B2 | 8/2016 | Imes |
| 9,414,552 B2 | 8/2016 | Halahan |
| 9,425,978 B2 | 8/2016 | Frei |
| 1,527,098 A1 | 9/2016 | Weiler |
| 9,442,474 B2 | 9/2016 | Madonna |
| 9,465,377 B2 | 10/2016 | Davis |
| 9,468,162 B2 | 10/2016 | Weiler |
| 9,494,480 B2 | 11/2016 | Klicpera |
| 9,538,713 B2 | 1/2017 | Pearson |
| 9,590,427 B2 | 3/2017 | Davis |
| 9,618,137 B2 | 4/2017 | Ferrer Herrera |
| 9,678,485 B2 | 6/2017 | Malaugh |
| 9,703,275 B2 | 7/2017 | Ersavas |
| 9,747,538 B2 | 8/2017 | Gudan |
| 9,749,792 B2 | 8/2017 | Klicpera |
| 9,756,797 B2 | 9/2017 | Sarver |
| 9,829,869 B2 | 11/2017 | Ersavas |
| 1,012,349 A1 | 11/2018 | Runge |
| 1,018,805 A1 | 1/2019 | Walker |
| 1,019,459 A1 | 2/2019 | Bauman |
| 1,029,234 A1 | 5/2019 | Weiler |
| 1,032,739 A1 | 6/2019 | Olive-Chahinian |
| 2002/0002425 A1 | 1/2002 | Dossey |
| 2002/0010516 A1 | 1/2002 | Addink |
| 2002/0019725 A1 | 2/2002 | Petite |
| 2002/0130834 A1 | 9/2002 | Madarasz |
| 2003/0067889 A1 | 4/2003 | Petite |
| 2003/0093159 A1* | 5/2003 | Sieminski ............ A01G 25/167 700/12 |
| 2003/0109964 A1 | 6/2003 | Addink |
| 2003/0120393 A1 | 6/2003 | Bailey |
| 2003/0135286 A1 | 7/2003 | Brundisini |
| 2003/0179102 A1 | 9/2003 | Barnes |
| 2003/0182022 A1 | 9/2003 | Addink |
| 2004/0003060 A1 | 1/2004 | Asoh |
| 2004/0013468 A1 | 1/2004 | Kadner |
| 2004/0015270 A1 | 1/2004 | Addink |
| 2004/0089164 A1 | 5/2004 | Addink |
| 2004/0100394 A1 | 5/2004 | Hitt |
| 2004/0181315 A1 | 9/2004 | Cardinal |
| 2004/0217847 A1 | 11/2004 | Fries |
| 2005/0038569 A1 | 2/2005 | Howard |
| 2005/0044372 A1 | 2/2005 | Aull |
| 2005/0090936 A1* | 4/2005 | Hitt ...................... A01G 25/167 700/284 |
| 2005/0137752 A1* | 6/2005 | Alvarez ................ G01F 15/063 700/282 |
| 2005/0187665 A1 | 8/2005 | Fu |
| 2005/0216129 A1 | 9/2005 | Clark |
| 2005/0216130 A1 | 9/2005 | Clark |
| 2005/0220050 A1 | 10/2005 | Uchida |
| 2005/0223379 A1* | 10/2005 | Rehg .................. G06K 9/00993 718/100 |
| 2006/0027677 A1 | 2/2006 | Abts |
| 2006/0043208 A1* | 3/2006 | Graham ................ A01G 25/16 239/71 |
| 2006/0116791 A1 | 6/2006 | Ravula |
| 2006/0122735 A1 | 6/2006 | Goldberg |
| 2006/0161309 A1 | 7/2006 | Moore |
| 2006/0259199 A1 | 11/2006 | Gjerde |
| 2007/0016334 A1 | 1/2007 | Smith |
| 2007/0043454 A1 | 2/2007 | Sonnenberg |
| 2007/0179674 A1* | 8/2007 | Ensworth .............. H04W 88/00 700/284 |
| 2007/0191991 A1* | 8/2007 | Addink ................ A01G 25/16 700/284 |
| 2007/0268121 A1 | 11/2007 | Vasefi |
| 2007/0282486 A1 | 12/2007 | Walker |
| 2007/0289635 A1 | 12/2007 | Ghazarian |
| 2008/0027587 A1 | 1/2008 | Nickerson |
| 2008/0037485 A1 | 2/2008 | Osinga |
| 2008/0039978 A1 | 2/2008 | Graham |
| 2008/0058964 A1 | 3/2008 | Nickerson |
| 2008/0058995 A1 | 3/2008 | Holindrake |
| 2008/0119948 A1 | 5/2008 | O'Connor |
| 2008/0125917 A1 | 5/2008 | Walker |
| 2008/0125918 A1 | 5/2008 | Curren |
| 2008/0140262 A1 | 6/2008 | Williams |
| 2008/0147205 A1 | 6/2008 | Ollis |
| 2008/0157995 A1 | 7/2008 | Crist |
| 2008/0234870 A1 | 9/2008 | Chalemin |
| 2008/0251602 A1 | 10/2008 | Leggett |
| 2008/0275595 A1 | 11/2008 | Bailey |
| 2008/0287062 A1 | 11/2008 | Claus |
| 2009/0076659 A1 | 3/2009 | Ensworth |
| 2009/0076660 A1 | 3/2009 | Goldberg |
| 2009/0099701 A1 | 4/2009 | Li |
| 2009/0145974 A1 | 6/2009 | Fekete |
| 2009/0150000 A1 | 6/2009 | Stelford |
| 2009/0150001 A1 | 6/2009 | Fekete |
| 2009/0150002 A1 | 6/2009 | Fekete |
| 2009/0204265 A1 | 8/2009 | Hackett |
| 2009/0216345 A1 | 8/2009 | Christfort |
| 2009/0222141 A1 | 9/2009 | Ensworth |
| 2009/0271045 A1 | 10/2009 | Savelle |
| 2009/0276102 A1 | 11/2009 | Smith |
| 2009/0281672 A1* | 11/2009 | Pourzia ................ A01G 25/167 700/284 |
| 2009/0292401 A1 | 11/2009 | Kah |
| 2009/0316671 A1 | 12/2009 | Rolf |
| 2009/0326723 A1 | 12/2009 | Moore |
| 2010/0023173 A1 | 1/2010 | Wu |
| 2010/0030389 A1 | 2/2010 | Palmer |
| 2010/0030476 A1 | 2/2010 | Woytowitz |
| 2010/0032493 A1 | 2/2010 | Abts |

(56) References Cited

U.S. PATENT DOCUMENTS

| | | |
|---|---|---|
| 2010/0032495 A1 | 2/2010 | Abts |
| 2010/0038440 A1 | 2/2010 | Ersavas |
| 2010/0062757 A1 | 3/2010 | Reina |
| 2010/0070097 A1 | 3/2010 | Morgenstern |
| 2010/0094472 A1 | 4/2010 | Woytowitz |
| 2010/0100247 A1 | 4/2010 | Nickerson |
| 2010/0129154 A1 | 5/2010 | Cox |
| 2010/0130188 A1 | 5/2010 | Brundisini |
| 2010/0145531 A1 | 6/2010 | Nickerson |
| 2010/0146491 A1 | 6/2010 | Hirano |
| 2010/0152909 A1 | 6/2010 | Hitt |
| 2010/0179701 A1 | 7/2010 | Gilbert |
| 2010/0194582 A1 | 8/2010 | Petite |
| 2010/0198418 A1 | 8/2010 | Williams |
| 2010/0200674 A1 | 8/2010 | Everett |
| 2010/0222932 A1 | 9/2010 | O'Connor |
| 2010/0241279 A1 | 9/2010 | Castella |
| 2010/0256827 A1 | 10/2010 | Bragg |
| 2010/0265909 A1 | 10/2010 | Petite |
| 2010/0268391 A1 | 10/2010 | Anderson |
| 2010/0274398 A1 | 10/2010 | Choat |
| 2010/0286833 A1 | 11/2010 | Kaprielian |
| 2010/0305764 A1 | 12/2010 | Carr |
| 2010/0305765 A1 | 12/2010 | Sutardja |
| 2010/0306012 A1 | 12/2010 | Zyskowski |
| 2010/0312881 A1 | 12/2010 | Davis |
| 2010/0324744 A1 | 12/2010 | Cox |
| 2010/0325569 A1 | 12/2010 | King |
| 2011/0015802 A1 | 1/2011 | Imes |
| 2011/0017845 A1 | 1/2011 | Crist |
| 2011/0035059 A1 | 2/2011 | Ersavas |
| 2011/0035064 A1 | 2/2011 | Kah |
| 2011/0040415 A1 | 2/2011 | Nickerson |
| 2011/0040416 A1 | 2/2011 | Nickerson |
| 2011/0045761 A1 | 2/2011 | Rolf |
| 2011/0046792 A1 | 2/2011 | Imes |
| 2011/0046798 A1 | 2/2011 | Imes |
| 2011/0046799 A1 | 2/2011 | Imes |
| 2011/0046800 A1 | 2/2011 | Imes |
| 2011/0049260 A1 | 3/2011 | Palmer |
| 2011/0093123 A1 | 4/2011 | Alexanian |
| 2011/0097534 A1 | 4/2011 | Lee |
| 2011/0098351 A1 | 4/2011 | Mioskoski |
| 2011/0106320 A1 | 5/2011 | Hall |
| 2011/0111700 A1* | 5/2011 | Hackett .................. A01G 25/16 455/41.2 |
| 2011/0118857 A1 | 5/2011 | Bodnar |
| 2011/0137472 A1 | 6/2011 | Hitt |
| 2011/0137827 A1 | 6/2011 | Mason |
| 2011/0166715 A1 | 7/2011 | Hoffman |
| 2011/0170239 A1 | 7/2011 | Nelson |
| 2011/0190947 A1 | 8/2011 | Savelle |
| 2011/0190948 A1 | 8/2011 | Fekete |
| 2011/0196541 A1 | 8/2011 | Bauman |
| 2011/0202185 A1 | 8/2011 | Imes |
| 2011/0210049 A1 | 9/2011 | O'Regan |
| 2011/0214060 A1 | 9/2011 | Imes |
| 2011/0224838 A1 | 9/2011 | Imes |
| 2011/0238228 A1 | 9/2011 | Woytowitz |
| 2011/0238229 A1 | 9/2011 | Woytowitz |
| 2011/0246898 A1 | 10/2011 | Imes |
| 2011/0270448 A1 | 11/2011 | Kantor |
| 2011/0270449 A1 | 11/2011 | Nickerson |
| 2011/0288690 A1 | 11/2011 | Ensworth |
| 2011/0301767 A1 | 12/2011 | Alexanian |
| 2011/0307101 A1 | 12/2011 | Imes |
| 2011/0310929 A1 | 12/2011 | Petite |
| 2011/0320050 A1 | 12/2011 | Petite |
| 2012/0023225 A1 | 1/2012 | Imes |
| 2012/0029709 A1 | 2/2012 | Safreno |
| 2012/0035898 A1 | 2/2012 | Repelli |
| 2012/0037725 A1 | 2/2012 | Verfuerth |
| 2012/0041606 A1 | 2/2012 | Standerfer |
| 2012/0046859 A1 | 2/2012 | Imes |
| 2012/0064923 A1 | 3/2012 | Imes |
| 2012/0072033 A1 | 3/2012 | Imes |
| 2012/0072036 A1 | 3/2012 | Piper |
| 2012/0072037 A1 | 3/2012 | Alexanian |
| 2012/0078425 A1 | 3/2012 | Gardenswartz |
| 2012/0089259 A1 | 4/2012 | Williams |
| 2012/0092154 A1 | 4/2012 | Petite |
| 2012/0093141 A1 | 4/2012 | Imes |
| 2012/0095604 A1 | 4/2012 | Alexanian |
| 2012/0101637 A1 | 4/2012 | Imes |
| 2012/0109387 A1 | 5/2012 | Martin |
| 2012/0123817 A1 | 5/2012 | Hohenberger |
| 2012/0135759 A1 | 5/2012 | Imes |
| 2012/0175425 A1 | 7/2012 | Evers |
| 2012/0203383 A1 | 8/2012 | Holindrake |
| 2012/0215366 A1 | 8/2012 | Redmond |
| 2012/0215725 A1 | 8/2012 | Imes |
| 2012/0216881 A1 | 8/2012 | Donoghue |
| 2012/0221154 A1 | 8/2012 | Runge |
| 2012/0221718 A1 | 8/2012 | Imes |
| 2012/0232708 A1 | 9/2012 | Ensworth |
| 2012/0239211 A1 | 9/2012 | Walker |
| 2012/0239807 A1 | 9/2012 | Davis |
| 2012/0253529 A1 | 10/2012 | Carlson |
| 2012/0254784 A1 | 10/2012 | Vander Griend |
| 2012/0259473 A1 | 10/2012 | Nickerson |
| 2012/0286062 A1 | 11/2012 | Sicotte |
| 2012/0290137 A1 | 11/2012 | Raestik |
| 2012/0290139 A1 | 11/2012 | Brundisini |
| 2012/0290140 A1 | 11/2012 | Groeneveld |
| 2012/0303168 A1 | 11/2012 | Halahan |
| 2012/0303768 A1 | 11/2012 | Fiennes |
| 2012/0323392 A1 | 12/2012 | Gerdes |
| 2013/0006400 A1 | 1/2013 | Caceres |
| 2013/0054033 A1 | 2/2013 | Casilli |
| 2013/0054758 A1 | 2/2013 | Imes |
| 2013/0079931 A1 | 3/2013 | Wanchoo |
| 2013/0085619 A1 | 4/2013 | Howard |
| 2013/0090746 A1 | 4/2013 | Quail |
| 2013/0110293 A1 | 5/2013 | Illig |
| 2013/0116837 A1 | 5/2013 | Malaugh |
| 2013/0123991 A1 | 5/2013 | Richmond |
| 2013/0131874 A1 | 5/2013 | Shupe |
| 2013/0160092 A1 | 6/2013 | Benisti |
| 2013/0162390 A1 | 6/2013 | Ersavas |
| 2013/0173070 A1* | 7/2013 | Tennyson ............. G05B 19/042 700/284 |
| 2013/0185786 A1 | 7/2013 | Dyer |
| 2013/0201316 A1 | 8/2013 | Binder |
| 2013/0212262 A1 | 8/2013 | Imes |
| 2013/0227126 A1 | 8/2013 | Imes |
| 2013/0238160 A1 | 9/2013 | Imes |
| 2013/0253713 A1 | 9/2013 | Vanwagoner |
| 2013/0269798 A1 | 10/2013 | Wood |
| 2013/0274932 A1 | 10/2013 | Curren |
| 2013/0310992 A1 | 11/2013 | Larsen |
| 2013/0318217 A1 | 11/2013 | Imes |
| 2013/0318444 A1 | 11/2013 | Imes |
| 2013/0325190 A1 | 12/2013 | Imes |
| 2013/0332000 A1 | 12/2013 | Imes |
| 2014/0005809 A1 | 1/2014 | Frei |
| 2014/0005810 A1 | 1/2014 | Frei |
| 2014/0005843 A1 | 1/2014 | Thomas |
| 2014/0018965 A1 | 1/2014 | Pearson |
| 2014/0039697 A1 | 2/2014 | Weiler |
| 2014/0128001 A1 | 5/2014 | Imes |
| 2014/0129039 A1 | 5/2014 | Olive-Chahinian |
| 2014/0163751 A1 | 6/2014 | Davis |
| 2014/0172121 A1 | 6/2014 | Li |
| 2014/0172180 A1 | 6/2014 | Woytowitz |
| 2014/0222223 A1 | 8/2014 | Horton |
| 2014/0229024 A1 | 8/2014 | Wang |
| 2014/0236868 A1 | 8/2014 | Cook |
| 2014/0244044 A1 | 8/2014 | Davis |
| 2014/0244045 A1 | 8/2014 | Davis |
| 2014/0244063 A1 | 8/2014 | Davis |
| 2014/0258386 A1 | 9/2014 | Imes |
| 2014/0316587 A1 | 10/2014 | Imes |
| 2014/0370879 A1 | 12/2014 | Redding |
| 2015/0019736 A1 | 1/2015 | Imes |

(56) References Cited

U.S. PATENT DOCUMENTS

| | | |
|---|---|---|
| 2015/0025697 A1 | 1/2015 | Imes |
| 2015/0026316 A1 | 1/2015 | Imes |
| 2015/0032274 A1 | 1/2015 | Runge |
| 2015/0039143 A1 | 2/2015 | Alexanian |
| 2015/0056979 A1 | 2/2015 | Davis |
| 2015/0084748 A1 | 3/2015 | Davis |
| 2015/0097663 A1 | 4/2015 | Sloo |
| 2015/0105921 A1 | 4/2015 | Shupe |
| 2015/0204563 A1 | 7/2015 | Imes |
| 2015/0230418 A1 | 8/2015 | Woytowitz |
| 2015/0244675 A1 | 8/2015 | Dyer |
| 2015/0331404 A1 | 11/2015 | Kantor |
| 2016/0050860 A1 | 2/2016 | Standerfer |
| 2016/0157446 A1 | 6/2016 | Bentwich |
| 2016/0192602 A9 | 7/2016 | Alexanian |
| 2016/0198646 A1 | 7/2016 | Ensworth |
| 2016/0212952 A1 | 7/2016 | Runge |
| 2017/0006787 A1 | 1/2017 | Weiler |
| 2017/0322527 A1 | 11/2017 | Ersavas |
| 2018/0014480 A1 | 1/2018 | Montgomery |
| 2018/0278581 A1 | 9/2018 | Dyer |
| 2019/0261584 A1 | 8/2019 | Olive-Chahinian |

FOREIGN PATENT DOCUMENTS

| | | |
|---|---|---|
| WO | 2007050175 | 5/2007 |
| WO | 2008068699 | 6/2008 |

OTHER PUBLICATIONS

EPO; App. No. 12306370; European Examination Report dated Oct. 7, 2016.

EPO; App. No. 12306370; Extended European Search Report dated Aug. 5, 2013.

EPO; App. No. 12306370; Partial European Search Report dated Mar. 14, 2013.

Mayer, Peter, et al.; "Evaluation of California weather-based "smart" irrigation controller programs"; Aquacraft, Inc., Water Engineering and Management, and National Research Center, Inc.; Jul. 1, 2009; pp. 1-309.

Quicksmart Development; Networked & Wireless Automated Control Systems; EtherRain Networked Sprinkler Controllers; 2012; 4 Pages.

Rain Bird; "Catalog: TBOS Field Transmitter"; published at http://web.archive.org/web/20111218221822/http://rainbird.com/documents/parts/part_TBOS.pdf; Sep. 8, 2011; pp. 1-2; Rain Bird Corporation, Azusa, CA.

Rain Bird; "Manual: TBOS Field Transmitter"; published at http://web.archive.org/web/20111218215847/http://rainbird.com/documents/turf/man_TBOS_FT.pdf; Sep. 8, 2011; pp. 1-30; Rain Bird Corporation, Azusa, CA.

Rain Bird; "Manual: TBOS One, Two, Four and Six Station Control Module"; published at http://web.archive.org/web/20110904171326/http://www.rainbird.com/documents/turf/man_TBOS.pdf; Sep. 8, 2011; pp. 1-20; Rain Bird Corporation, Azusa, CA.

Rain Bird; "Rain Bird TBOS Three-Program Battery-Operated Controller"; published at http://web.archive.org/web/20110908065404/http://www.rainbird.com/landscape/products/controllers/TBOScontroller.htm; Sep. 8, 2011; pp. 1-3; Rain Bird Corporation, Azusa, CA.

Rain Bird; "Tech Specs: TBOS "; published at http://web.archive.org/web/20110812073350/http://www.rainbird.com/documents/turf/ts_TBOS.pdf; Sep. 8, 2011; pp. 1-2; Rain Bird Corporation, Azusa, CA.

Regaber; SKYGREEN: GPRS/Radio Centralised Irrigation System; published at http://web.archive.org/web/20120526052826/http://www.regaber.com/webregaber/bd/descargas/AP_P0_06_SKgreen.pdf; May 26, 2012; pp. 1-6; Regaber Automatismos y servicios.

Sandu, F., et al.; "Remote and mobile control in donnotics"; IEEE; Optimization of Electrical and Electronic Equipment, 2008. OPTIM 2008. 11th International Conference on Optimization of Electrical and Electronic Equipment; May 22-24, 2018; pp. 1-6.

Souza, Christine; "Irrigation technology: Smart water solutions for state's farmers"; AgAlert; Jul. 9, 2008; pp. 1-6.

U.S. Appl. No. 13/843,319; Notice of Allowance dated Jun. 21, 2016.

U.S. Appl. No. 13/843,319; Office Action dated Feb. 10, 2016.

U.S. Appl. No. 13/843,319; Office Action dated Jun. 4, 2015.

U.S. Appl. No. 13/843,319; Office Action dated Sep. 30, 2015.

U.S. Appl. No. 15/270,986; Notice of Allowance dated Jan. 25, 2019.

U.S. Appl. No. 15/270,986; Notice of Allowance dated Sep. 26, 2018.

\* cited by examiner

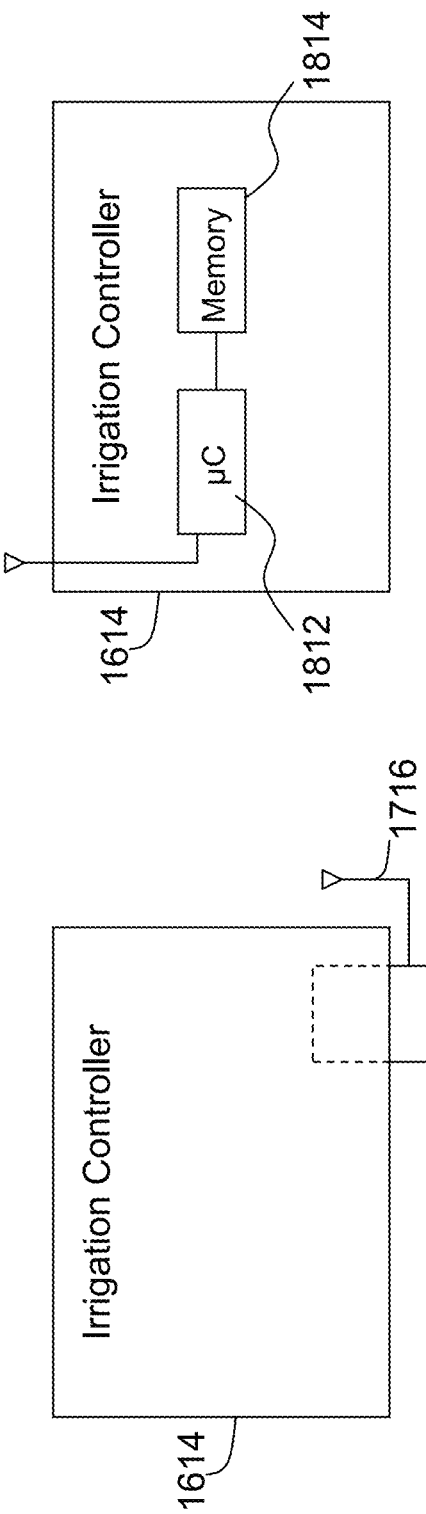
FIG. 18
FIG. 17
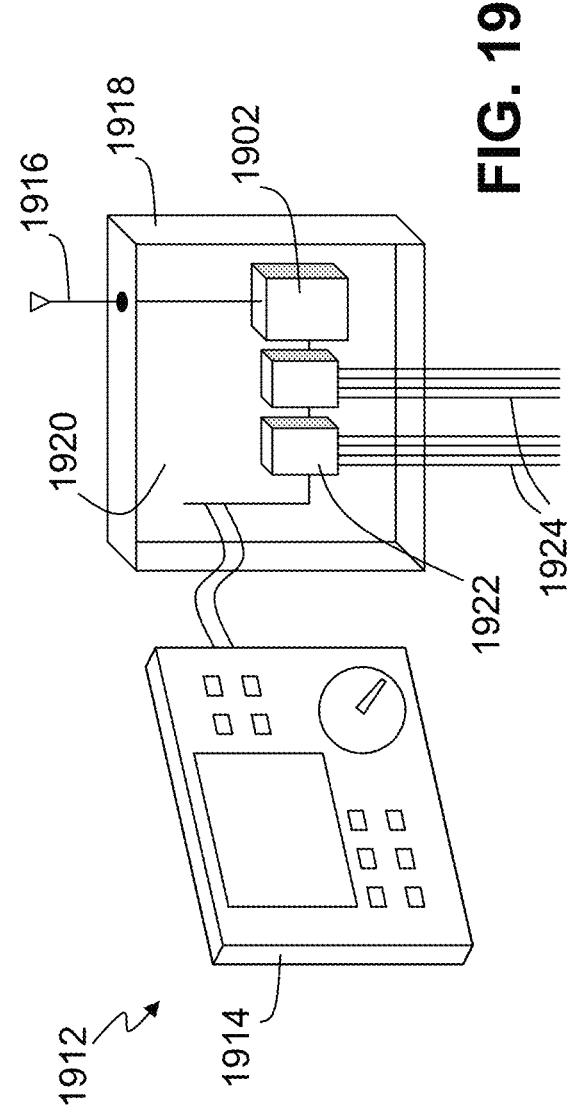
FIG. 19

IRRIGATION CONTROLLER WIRELESS NETWORK ADAPTER AND NETWORKED REMOTE SERVICE

This application is a continuation of U.S. application Ser. No. 15/270,986, filed Sep. 20, 2016 filed for Weiler et al., entitled IRRIGATION CONTROLLER WIRELESS NETWORK ADAPTER AND NETWORKED REMOTE SERVICE which is a divisional of U.S. application Ser. No. 13/843,319, filed Mar. 15, 2013, for Weiler et al., entitled IRRIGATION CONTROLLER WIRELESS NETWORK ADAPTER AND NETWORKED REMOTE SERVICE, which claims the benefit of U.S. Provisional Application No. 61/678,543, filed Aug. 1, 2012, for Redmond et al., entitled IRRIGATION CONTROLLER WIRELESS NETWORK ADAPTER AND NETWORKED REMOTE SERVICE; and claims the benefit of U.S. Provisional Application No. 61/770,984, filed Feb. 28, 2013, for Redmond et al., entitled IRRIGATION CONTROLLER WIRELESS NETWORK ADAPTER AND NETWORKED REMOTE SERVICE, each of which is incorporated in its entirety herein by reference.

BACKGROUND

1. Field of the Invention

The present invention relates generally to irrigation, and more specifically to irrigation control.

2. Discussion of the Related Art

Generally, irrigation controllers are used to control the delivery of water to irrigation devices connected to switchable irrigation valves. To control the delivery of water to groups of irrigation devices that define irrigation stations or zones, conventional program-based irrigation controllers typically provide programs that can define different watering days and start times. Once a program is created, the irrigation controllers can implement the irrigation schedule for activating irrigation valves.

The irrigation programming can become more complex, for example, as the area to be irrigated increases, the variations in types of plant life to be irrigated increases and/or the differences in slope and/or soil type increase. Further, it can be complicated to design and implement irrigation systems for such complex areas.

SUMMARY OF THE INVENTION

Several embodiments of the invention advantageously address the needs above as well as other needs by providing systems and method of implementing and/or controlling irrigation. Some of these embodiments provide systems for use in controlling irrigation, comprising: an irrigation controller configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site; a wireless adapter directly communicationally coupled through a direct wired connection with the irrigation controller; and a network adapter wirelessly coupled over a point-to-point wireless communication path with the wireless adapter, wherein the network adapter is configured to further couple through a direct wired connection with a local router configured to provide communication over a distributed network to a remote server; wherein the wireless adapter is configured to poll the irrigation controller to acquire and locally store at the wireless adapter status information from the irrigation controller, and to receive a request communicated from the server, through the network adapter and over the distributed network, requesting the status information; and wherein the wireless adapter is configured to communicate, over the point-to-point wireless channel, the status information to be forwarded by the network adapter and over the distributed network to the server.

Some embodiments provide a system configured to provide irrigation control, the system comprising: a server located remotely from a plurality of sites where irrigation is to be implemented and controlled, wherein the server couples with a distributed network accessible by other devices remote from the server; a plurality of irrigation systems, each irrigation system located at a different one of the plurality of sites where irrigation is to be implemented and controlled, wherein each irrigation system is in communication with the server over the distributed network, and each irrigation system comprises: an irrigation controller positioned locally at a respective site where irrigation is to be controlled; one or more valves at the respective site, the one or more valves coupled with the irrigation controller, wherein the irrigation controller is configured to control an activation and deactivation of the one or more valves in accordance with an irrigation schedule stored in the irrigation controller to implement irrigation at the respective site; and a wireless adapter directly communicationally coupled through a direct wired connection with the irrigation controller; and a network adapter wirelessly coupled over a point-to-point wireless communication path with the wireless adapter, wherein the network adapter further couples through a direct wired connection with a local router, wherein the local router is further configured to provide a communication path to the distributed network.

Other embodiments provide methods of controlling irrigation, comprising: communicating, from a wireless adapter over a direct wireline connection coupling the wireless adapter to an irrigation controller, a request to the irrigation controller for status information from the irrigation controller, wherein the wireless adapter is separate from and external to the irrigation controller, and wherein the wireless adapter and the irrigation controller are located at a site where the irrigation controller is configured to control irrigation; receiving, at the wireless adapter, the status information from the irrigation controller; storing the status information locally at the wireless adapter; receiving, at the wireless adapter, a request from a server for the status information; and communicating, from the wireless adapter to a network adapter over a point-to-point wireless communication channel between the wireless adapter and the network adapter, the status information retrieved from the local storage of the wireless adapter.

Further embodiments provide methods of providing irrigation control, comprising: detecting a change to an irrigation schedule configured to be implemented by an irrigation controller located remote from a server and at a site where irrigation is to be controlled by the irrigation controller; calculating a predicted change in a cost of irrigation according to the change to the irrigation schedule; and communicating, from the server and over a distributed communication network, the predicted change in cost of the irrigation to be displayed to the user.

Some embodiments provide methods of implementing irrigation, comprising: confirming, at a server, authorized access to a first user account of multiple user accounts by a user utilizing a remote user device remote from the server and communicating with the server over a distributed communication network; receiving, at the server, a request to associate a wireless adapter with the first user account, wherein the wireless adapter is located at a site where irrigation is to be controlled by a local irrigation controller that is separate from and coupled with the wireless adapter over a direct wireline connection, and wherein the site is remote from the server; communicating instructions to the user device to initiate the association by pressing a communication button on the wireless adapter; determining, at the server, whether a communication is received, from over the distributed communication network, from the wireless adapter, wherein the communication is generated from the wireless adapter in response to a user physically activating the communication button on the wireless adapter and wirelessly communicated from the wireless adapter; and associating the wireless adapter with the first user account when the communication is received.

Additionally, some embodiments provide methods of providing irrigation control, comprising: displaying, on a display, a user interface configured to allow a user to interact with the user interface, wherein the user interface comprises multiple user selectable options configured to define parameters available in programming an irrigation schedule configured to be implemented in controlling irrigation at a site; detecting a designation, specified by the user through the user interface, of one or more of the multiple options in programming the irrigation schedule; and displaying a natural language description of at least one or more of the designated options of the programmed irrigation schedule, wherein the natural language description describes the one or more of the designated options designated by the user through the user interface.

Some embodiments provide systems for use in controlling irrigation, comprising: an irrigation controller configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site; a wireless adapter communicationally coupled with the irrigation controller; a local network at the site, wherein the wireless adapter is configured to communicate over the local network at the site providing access to a network to communicate with a remote server, wherein the wireless adapter is configured to receive information from the irrigation controller and wirelessly communicate that information to the remote server, and to wirelessly receive information from the remote server; and the remote server; wherein the remote server is configured to provide an authorized user remote access to data from the irrigation controller and control of the irrigation controller via the wireless adapter, the remote server also being configured to provide other authorized users remote access to other irrigation controllers at other sites and control of the other irrigation controllers via other wireless adapters at the other sites.

Other embodiments provide systems for use in controlling irrigation, comprising: an irrigation controller configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site; a wireless adapter communicationally coupled with the irrigation controller and communicationally coupled with a remote server via a wireless wide area network; wherein the wireless adapter is configured to receive information from the irrigation controller and wirelessly communicate that information to the remote server and to wirelessly receive information from the remote server over the wireless wide area network; and the remote server, wherein the remote server is configured to provide an authorized user remote access to data from the irrigation controller and control of the irrigation controller via the wireless adapter, the remote server also being configured to provide other authorized users remote access to other irrigation controllers at other sites and control of the other irrigation controllers via other wireless adapters at the other sites.

Still other embodiments provide systems for use in controlling irrigation, comprising: an irrigation controller configured to be positioned locally at a site, wherein the irrigation controller comprises a controller and a plurality of station terminals configured to couple with one or more valves to activate valves to distribute water over at least one or more zones of the site in accordance with an irrigation schedule implemented by the irrigation controller; wherein the irrigation controller comprises an integrated wireless adapter configured to communicate with a remote server over a network; wherein the wireless adapter is configured to receive information from the irrigation controller and wirelessly communicate that information to the remote server, and to wirelessly receive information from the remote server over the network; and the remote server, wherein the remote server is configured to provide an authorized user remote access to data from the irrigation controller and control of the irrigation controller via the wireless adapter, the remote server also being configured to provide other authorized users remote access to other irrigation controllers at other sites and control of the other irrigation controllers via other wireless adapters at the other sites.

BRIEF DESCRIPTION OF THE DRAWINGS

The above and other aspects, features and advantages of several embodiments of the present invention will be more apparent from the following more particular description thereof, presented in conjunction with the following drawings.

FIG. 17 illustrates a simplified block diagram of an exemplary irrigation controller with a wireless adapter cooperated with the irrigation controller, in accordance with some embodiments.

FIG. 18 illustrates a simplified block diagram of an exemplary irrigation controller that incorporates the functionality of a wireless adapter, in accordance with some embodiments.

FIG. 19 illustrates a simplified block diagram of an exemplary irrigation controller with a wireless adapter removably positioned within a backplane of the irrigation controller, in accordance with some embodiments.

Figure 1:
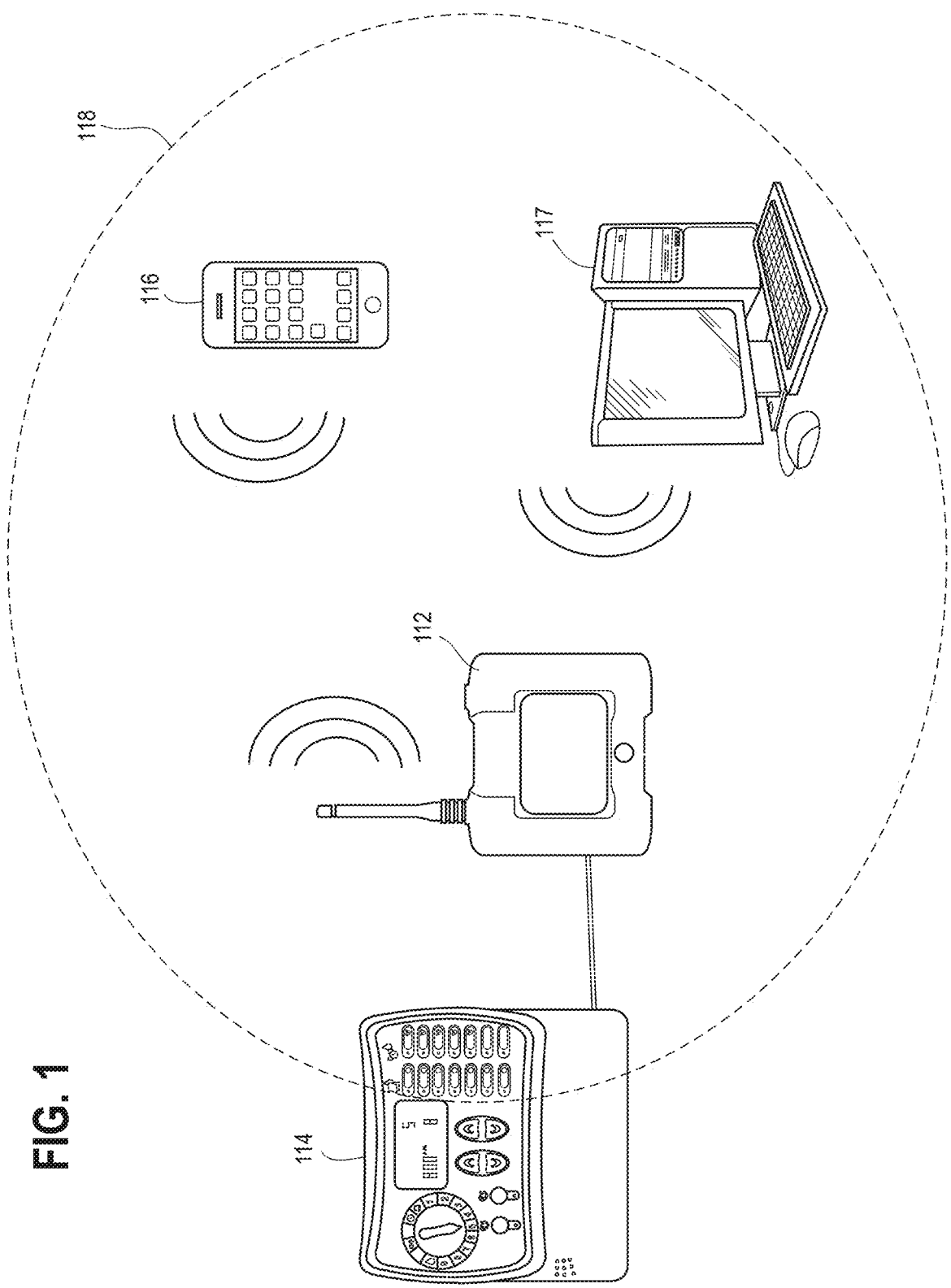
FIG. 1 depicts a simplified block diagram of a system providing wireless access to an irrigation controller in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Residential irrigation controllers cooperate with valves on a property and allow an end user to define a schedule that the irrigation controller implements to control the valves to implement the scheduled irrigation. Typically, the user interacts with the irrigation controller through a control panel at the irrigation controller. The control panel includes one or more buttons, dials, switches, displays, LEDs and the like to allow the user to define the irrigation schedule, set parameters, receive information from the irrigation controller, and/or take other action. Several embodiments allow a user to interact with the controller wirelessly and/or remotely with a wireless and/or remote device. In some embodiments, the wireless interaction with the controller is directly with the controller or a wireless device coupled to the controller, or indirectly with the controller via a remote networked device, such as a networked server.

Wireless Adapter Direct to Device

An adapter is provided that cooperates with an irrigation controller through a direct connection, e.g., a Simple Irrigation Protocol (SIP) Port, of the control panel of an irrigation controller. The adapter allows a user to wirelessly interact with the irrigation controller using a separate consumer electronic device capable of wireless communication with the adapter according to a wireless protocol utilized by the adapter. In some embodiments, the adapter utilizes the WiFi wireless protocol, and as such can be a WiFi adapter. It is noted that as understood in the art, WiFi is a technology that allows an electronic device to exchange data wirelessly (using radio waves) over a computer network, including high-speed Internet connections. For example, WiFi can refer to as any wireless local area network (WLAN) products that are based on the Institute of Electrical and Electronics Engineers' (IEEE) 802.11 standards. In general use, since most WLANs are based on these standards, the term WiFi can be used as a synonym for WLAN.

FIG. 1 shows system providing a wireless local area network. The system, in some embodiments, includes a wireless adapter 112 coupled with an irrigation controller or control panel 114 of an irrigation controller. In some embodiments, the adapter 112 is typically a small unit or box that includes an antenna for wireless communication (e.g., WiFi, DSSS, FHSS, Bluetooth™, etc.) and couples with the control panel through a wired connection that connects with a port (e.g., the SIP port) of the control panel.

Accordingly, the adapter 112 provides a wireless external communications interface for connecting end users with the irrigation control panel 114 through one or more consumer electronic devices 116-117 (some times referred to as user devices). In the embodiment depicted in FIG. 1, the adapter 112 and the consumer electronic device 116 are not required to have access to the Internet, e.g., controller 114 and adapter 112 are not required to be connected to the Internet. Instead, the communication can be directly between the consumer electronic device 116 and the adapter 112 through a wireless connection therebetween. In some embodiments, the adapter 112 hosts a wireless network 118 (e.g., a WiFi network hosted/created by the adapter 112) for the consumer electronic devices 116 and 117 to join. The wireless network 118 provided by the adapter 112 can be an independent network, including being separate from a user's home network. As such, the user or a contractor can join and detach from this adapter established network at will without having to connect with a user's home network, assuming the user's device is within range of the adapter established wireless network 118. Although in some embodiments, the adapter 112 as is a WiFi adapter, we note that WiFi is one example of a wireless network 118 that allows other devices to join the network. Accordingly, the adapter 112 can be configured for other wireless networks that allow other devices to join the network. In other embodiments, the wireless communication between the adapter 112 and one or more of the devices 116-117 is a direct wireless link, each device being paired to the adapter 112. In some embodiments, including various embodiments of the wireless adapters described herein and in all figures, one or more (or all) components of the adapter 112 (and/or 212, 312, 412) may be integrated into the housing of the controller 114.

The consumer electronic devices 116-117 can be substantially any consumer electronic device that is capable of wirelessly communicating via WiFi (or other relevant wireless protocol, such as Bluetooth™, 900 MHz, 2.4 GHz, 5.8 GHz links, etc.), capable of displaying the relevant information and/or options to the user, and capable of allowing the user to take actions that are communicated from the consumer electronic device back to the control panel 114 of the irrigation controller. For example, the consumer electronic devices can be smart phones, computers, laptops, tablets or substantially any other relevant wirelessly enabled device.

The consumer electronic device 116 can, in some instances, provide a user and/or contractor with an easier-to-use interactive user interface in comparison to the user interface of the control panel. Further, in some instances, the user interface provided through the consumer electronic device 116 can allow greater or different information than typically available through the user interface of the control panel 114 and/or can provide additional features or functions that may not be expressly available through the user interface of the control panel. Additionally, the user can readily interact with the irrigation controller without having to physically go to and interact with the irrigation controller providing potentially a day-to-day interaction between the user and the irrigation controller. In some instances, the irrigation controller can communicate status information, reports and/or other such information to the user on a daily, weekly and/or other such schedule, which may be user defined.

The adapter 112 is configured to communicate information to the consumer electronic device 116. For example, in some embodiments, the adapter 112 can be configured to serve up HTML pages to the consumer electronic device and/or cooperates with an application (an "app") or other software application operating on the consumer electronic device. This can allow the user to interact with the control panel 114 to control irrigation and/or program the irrigation controller with more natural and intuitive interfaces, leveraging the graphics and input capabilities of the remote consumer electronic device. Again, this can improve ease of use and reduce problems associated with programming. Additionally, the adapter 112 can reduce the cost and/or complexity of irrigation controllers as the wireless network can eliminate the burden of providing irrigation controllers with expensive user interfaces.

Again, in the embodiment of FIG. 1, the user can have access to the irrigation controller 114 from a remote device without needing access to the Internet. It is noted, that the range of communication between the adapter 112 and the consumer electronic device 116 is limited to the wireless range of the adapter 112 (e.g., WiFi, Bluetooth, etc. range of the adapter), but range is a function of the wireless protocol, frequencies, power, interference, etc.

Wireless Adapter to Remote Server Via User's Network

Figure 2:
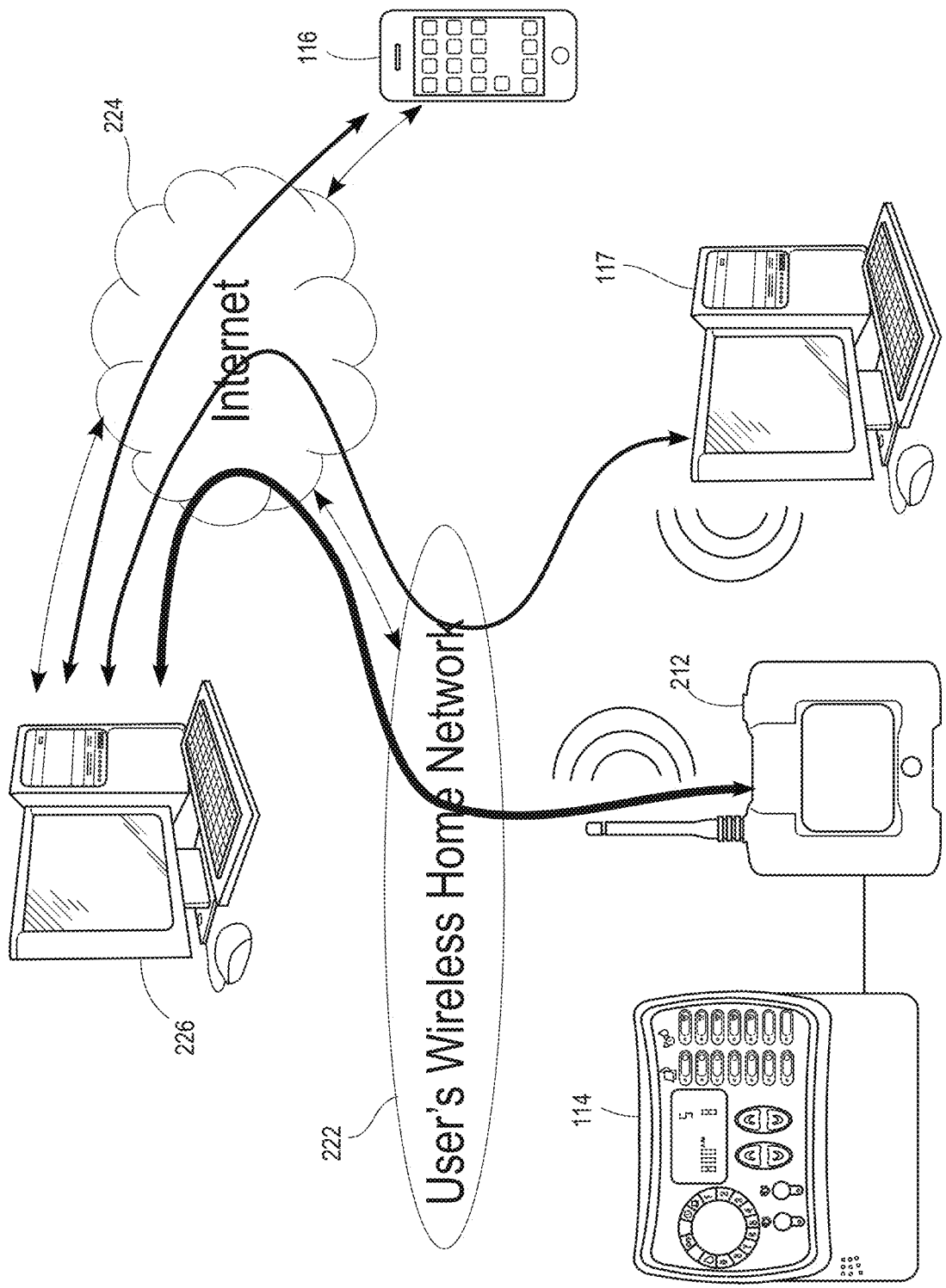
FIG. 2 depicts a simplified block diagram of a system providing Internet access to an irrigation controller in accordance with some embodiments.

FIG. 2 depicts a simplified block diagram of a system providing Internet access to an irrigation controller 114 in accordance with some embodiments. This system provides modified or alternate networked irrigation controller embodiments where the wireless adapter 212 (also referred to as a controller internet adapter) can connect to a local wired and/or wireless network 222 (e.g., a wireless WiFi home network or other local area network). The user can instruct the adapter 212 how to join the local wireless network 222, where typically such local wireless networks 222 further allow access to a distributed network 224 (e.g., the Internet). Once connected to the wireless network 222, the adapter 212 can connect with a remote server and/or service 226 accessible over the Internet 224 (e.g., a server provided by the Rain Bird Corporation or other provider).

Accordingly, the irrigation controller 114 can now be controlled and/or monitored by a user using a consumer electronic device 116-117 from substantially anywhere through the Internet 224 (or other Intranet or computer network) by accessing the server 226 from the consumer electronic device. This can avoid the distance limits in directly connecting with the adapter 212 of the adapter provided wireless network. In some instances, the adapter 212 can be connected to the server 226 through the local wireless network 222 and the Internet 224, and can also simultaneously be configured to receive local wireless (e.g., WiFi) communications directly from a local consumer electronic device 117.

Once the adapter 212 is cooperated with the server 226 via the networks 222 and 224, the adapter 212 and irrigation controller 114 can be paired to a user profile created and maintained through the server 226. The server 226 can store irrigation scheduling, parameters, settings and the like, as well as receive status information, alerts, reports and the like from the irrigation controller 114 through the adapter 212. Users can view irrigation schedules, parameters, settings, as well as set parameters, settings, modify scheduling and take other action through the server 226 from anywhere. In some embodiments, the adapter 212 can intermittently connect with the server 226 (e.g., based on a schedule, periodically, etc.) to determine whether there is a new schedule or other information to download for the associated irrigation controller 114. In some embodiments, the server 226 may use "push" (as opposed to "pull") technologies such that the server pushes new schedules or information to the adapter 212 and/or controller 114 via the adapter 212 without such information being requested by the client. Both push and pull models are well known in the art. As such, changes, new schedules, modifications and the like can be downloaded to the irrigation controller 114 through the adapter 212. Similarly, the irrigation controller 114 can upload information, reports, alerts and/or other information to the server 226, which can be later accessed by a user or the server 226 can issue a notification or alert to the user (e.g., text message, email, cellular call, etc.).

Further, contractors and homeowners can each have their own separate accounts and/or profiles at the server 226 that are linked to appropriate irrigation controllers. Accordingly, homeowners can see all of their irrigation controllers (typically only one controller, but may be multiple if the user has multiple residences), and a contractor (e.g., a gardener) can access all irrigation controllers of the contractor's clients that can be accessed through the server 226. Again, the server 226 can be accessed and the irrigation controller 114 controlled with substantially any web/network browser and/or app configured to interact with the server 226. This control can include, for example, manual watering activated through the Internet 224, rapidly adjusting irrigation, and other such actions. Similarly, a contractor can easily make changes to irrigation in response to clients' requests, from substantially anywhere and at substantially any time.

Wireless Adapter to Remote Server Via External Network

Figure 3:
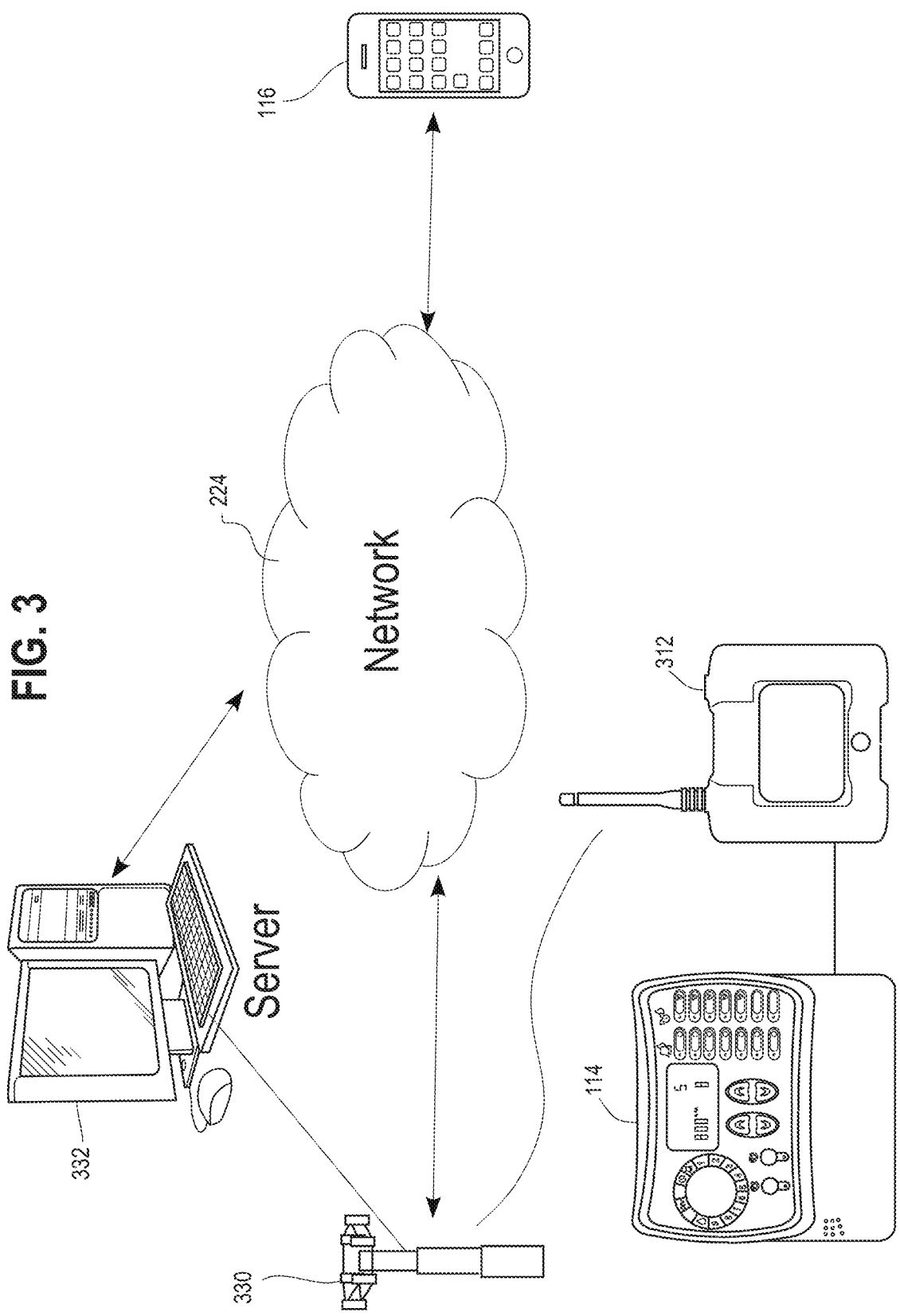
FIG. 3 depicts a simplified block diagram of a system allowing an irrigation controller to be cooperated with an external network in accordance with some embodiments.

FIG. 3 depicts a simplified block diagram of an external wireless network (such as a cellular communications network) communicating with the wireless adapter 112 in accordance with some embodiments. Additionally or alternatively, a wireless adapter 312 (which may also be referred to as a controller internet adapter) can be configured to wirelessly communicate via a cellular, satellite or other wireless protocol-based network providing a greater range. In some instances, the irrigation controller 114, and thus the adapter 312, may be in a location where the user's local network (such as the user's home WiFi network) cannot be used (e.g. due to poor range and/or signal quality), and/or cannot connect with a local network 222 (e.g., user's household wireless network). Accordingly, in some embodiments, the adapter 312 can provide longer range wireless communication.

The adapter 312 is configured to provide cellular communication to communicate with a cellular network 330 (i.e., a network external to any local networks (e.g., WiFi) of the user). Through the cellular communication, the adapter 312 can access to a third party service 332 either directly through the cellular network or through a distributed network 224 (such as the Internet or other Intranet or computer network), which could include the Internet.

The adapter 312 can have an IP addressed linked to the service cloud maintained by the third party service 332. The service cloud can include a server farm that maintains services for the irrigation controller company. The irrigation company can contract with the third party service such that the irrigation company does not have to set-up or maintain a server farm to support the intelligent water services.

The adapter 312 can be associated with a user profile in the intelligent water service. Accordingly, a user using a consumer electronic device 116 can access over the Internet the service maintained by the third party service 332 to gain access to the user profile, the irrigation schedule and other relevant information, as well as to modify the irrigation schedules, parameters, settings, get information, or the like.

Figure 4:
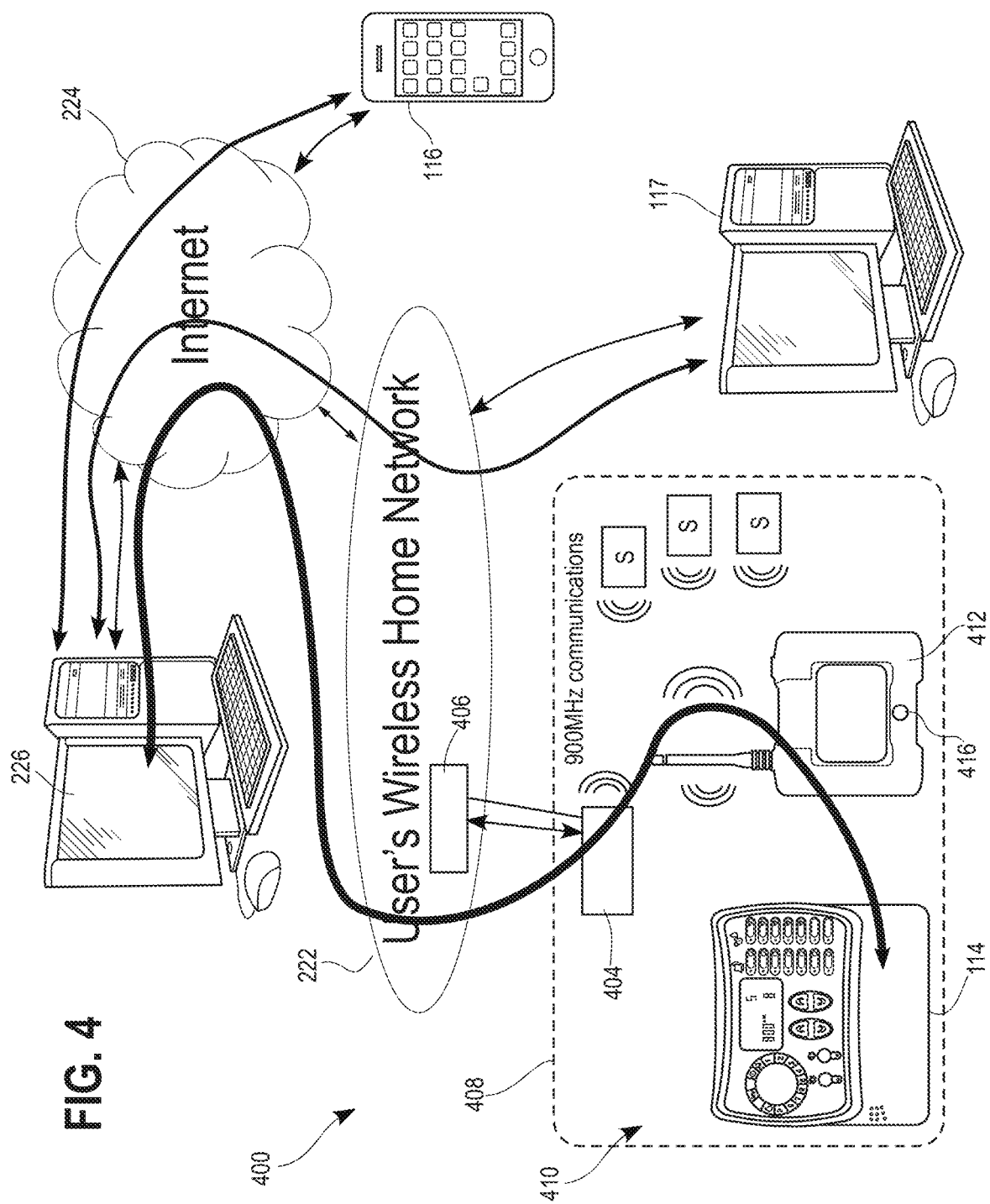
FIG. 4 depicts a simplified block diagram of a system providing irrigation control in accordance with some embodiments.

Controller Networked to a Server Via Wireless Adapter, Network Adapter and Local Router FIG. 4 depicts a simplified block diagram of a system 400 providing irrigation control in accordance with some embodiments. The system 400 includes an irrigation controller 114, a wireless adapter 412 (which may also be referred to as a controller internet adapter), which in some instances can act as a wireless hub as described below, a wireless gateway 404 (or network adapter 404), a network connection or local router 406 that cooperates with a local network 222 and provides a communication path to allow access through the Internet 224 and/or other distributed communication network to a remote server 226. In some embodiments, the irrigation controller 114, network adapter 404 and irrigation valves are part of an irrigation system 410 that implements and controls irrigation at a site where the irrigation system is located. The server 226 is configured to communicate over the distributed network 224 with multiple irrigation systems 410 located at different sites where irrigation is being controlled. The server 226 is typically located remote from the sites. Further, many if not most of the different sites are further configured to be controlled independent of the other sites. Additionally, the server is a multi-user access server allowing multiple different users to access the server over the distributed network 224 to acquire information, specify commands and/or program irrigation schedules.

The wireless adapter 412 cooperates with the irrigation controller 114 through a direct wired connection to the controller 114, e.g., a Simple Irrigation Protocol (SIP) Port of the control panel of the irrigation controller. The wireless adapter 412 wirelessly couples over a direct point-to-point wireless communication path with the network adapter 404 (e.g., a small dongle type device). In some embodiments, the network adapter 404 is configured to communicate with multiple wireless adapters 412. Again, the communication between the network adapter 404 and the one or more wireless adapters 412 is typically via point-to-point communications between each individual wireless adapter 412 and the network adapter 404. The network adapter 404 connects, typically by wire line, to the local router 406 of a local network 222 (e.g., a local network, a WiFi wireless home network, etc.). This allows two-way communications between the irrigation controller 114 and/or the wireless adapter 412 and the remote server or service 226 via the Internet 224. Further, in some implementations, the wireless adapter 412, network adapter 404 and router 406 allow the irrigation controller 114 to be networked to the remote server 226 via the Internet 224. In many embodiments, the wireless adapter 412 and the network adapter 404 are located at the customer's premises.

In some embodiments, the wireless communications between the wireless adapter 412 and the network adapter 404 are via a radio frequency wireless communication (e.g., a 900 MHz, 2.4 GHz, etc. wireless communication). Typically, this wireless communication is not a WiFi connection but can be any wireless protocol suitable for use in this application. The network adapter 404 couples by wireline connection to the router 406, such as to an Ethernet port of the local router 406. The communication between the local router 406 and the Internet 224 may be wired and/or wireless. In some embodiments, to establish a connection between the wireless adapter 412 and the network adapter 404, the end user may simply press a button on both devices or the wireless adapter 412 and the network adapter 404 may be configured to pair to each other when powered. In some embodiments, the network adapter 404 is powered when connected to the router 406, has its own power or is connected to an external power supply other than the router 406, e.g., an AC power source. Further, in some implementations, the installer is not required to know the network ID (e.g., SSID) and password for the user's wireless home network; however, the installer may need to be able to get physical access to the local router 406. Once connected, the wireless adapter 412 and network adapter 404 connect the irrigation controller 114 with the remote server and/or service 226 accessible over the Internet 224 (e.g., a server provided by the Rain Bird Corporation, or another server owned and operated by a third party, such as Arrayent, headquartered in Redwood City, Calif.).

Accordingly, the irrigation controller 114 can be controlled and/or monitored by an end user using a consumer electronic device 116-117 from substantially anywhere through the Internet 224 (or other computer network) by accessing the server 226 from the consumer electronic device 116. For example, the consumer electronic devices can be smart phones, computers, laptops, tablets, other relevant wireless enabled devices, or substantially any other device that can access the server 226. Again, the consumer electronic device 116 can, in some instances, provide a user and/or contractor with an easier-to-use interface in comparison to the user interface of the control panel. In some embodiments, the network adapter 404 can be implemented and/or the server and corresponding service 226 can be implemented through products and services available from Arrayent or other company providing similar devices.

The wireless adapter 412 and the irrigation controller 114 can be paired to a user profile created and maintained through the server 226. Again, the server 226 can store irrigation scheduling, parameters, settings and the like, as well as receive status information, alerts, reports and the like from the irrigation controller 114 through the wireless adapter 412 and network adapter 404. Users can view irrigation schedules, parameters, settings, as well as set parameters, settings, modify scheduling and take other action through the server 226 from anywhere. In some instances the wireless adapter 412 (or in some cases, the network adapter 404) intermittently connects with the server 226 (e.g., based on a schedule, periodically, etc.) to determine whether there is a new schedule or other information to download for the associated irrigation controller 114. In some embodiments, the server 226 may use "push" (as opposed to "pull") technologies such that the server pushes new schedules or information to the network adapter 404, the wireless adapter 412 and/or controller 114 without such information being requested by the client. As such, changes, new schedules, modifications and the like can be downloaded (e.g., pulled or pushed) to the irrigation controller 114 through the wireless adapter 412. Similarly, the irrigation controller 114 can upload information, reports, alerts and/or other information to the server 226, which can be later accessed by a user or the server 226 can issue a notification or alert to the user (e.g., text message, email, cellular call, etc.).

While there are no range limitations on user devices 116 and 117 relative to the irrigation controller 114, the irrigation controller 114 and wireless adapter 412 are positioned to be in communication range of the network adapter 404 that is in communication with the local router 406. Typically, there is no special software needed at the devices 116 and 117. The server 226 will serve up web content in the appropriate form to the browsers of the devices 116 and 117. In some embodiments, the devices 116 and 117 may use additional software, e.g., an app or other application, to enhance the interactive user interface at the device.

Additionally, in some embodiments, the wireless adapter 412 can be configured as a hub to additionally communicate with external wireless sensors S, peripherals or other devices of the system through wired and/or wireless communication. Thus, in some embodiments, the wireless adapter 412 creates a network, such as a wireless network 408 in which it is the hub, and the other paired devices are the spokes. Again, in some embodiments, the wireless adapter 412 and other devices (e.g., network adapter 404, sensors S and the like) of the wireless network 408 that wireless communication with the wireless adapter 412 include wireless transceivers, such as 900 MHz 2.4 GHz or 5.8 GHz wireless transceivers, by way of example. In these embodiments, the wireless adapter 412 can communicate with network adapter 404 and/or sensors S via the local 900 MHz, 2.4 GHz or 5.8 GHz communication network 408. Further, the wireless communications may be modulated, such as using one or more of Frequency Hopping Spread Spectrum (FHSS), Direct Sequence Spread Spectrum (DSSS) and Frequency Shift Keying (FSK), or other such modulation.

In some embodiments, the wireless adapter 412 listens for commands and information received from one or more devices on the wireless network 408 and takes the appropriate action. In some embodiments, packets may be received at the wireless adapter 412 from the network adapter 404 and/or sensors (S), such as rain, moisture and/or flow sensors. In some embodiments, the wireless adapter 412 is responsible for decision-making and action-taking based on received commands and/or information. For example, the wireless adapter 412 may listen to sensors (which may or may not require a response); the wireless adapter 412 may receive sensor limits/actions/set points/thresholds from the server via the network adapter 404 or directly from the user at an optional user interface of the wireless adapter 412; and may take defined actions based on sensor inputs. In some embodiments, the wireless adapter 412 has an optional user interface, such as LCD display (or other visual and/or audio display), buttons, dials, switches, touch sensitive components, etc. In some embodiments, the firmware of the wireless adapter 412 and/or the network adapter 404 is upgradeable via the server. And in some embodiments, the wireless adapter 412 is paired to the network adapter 404 in a 1:1 relationship. In some embodiments, multiple wireless adapters 412 may be paired to a single network adapter 404, e.g., in an N:1 relationship.

In some embodiments, the wireless gateway or network adapter 404 handles communications with the server 226 via TCP/IP (through the Internet); however, it is understood that other protocols may be used. For example, in some cases, the network adapter 404 includes "tunneling" functionality to allow it to access the server 226 through firewalls. In another example, the network adapter 404 passes along requests for actions from server to the wireless adapter 412. In some embodiments, the network adapter 404 does not store or process data, it simply passes it back and forth between the wireless adapter 412 and the server 226 via the internet or computer network. In other embodiments, the network adapter 404 stores and processes data, as well as passes data back and forth between itself and the wireless adapter 412 and the server 226 via the internet or computer network. In some embodiments, the network adapter 404 authenticates with the controller 114 through the wireless network 408 and controller interface.

In some embodiments, one or more of the server 226, the network adapter 404 and the wireless adapter 412 include at least a portion of a "Controller Port Polling Engine" for managing polling of the irrigation controller 114 via commands at the controller port (e.g., SIP port). For example, in some embodiments, the server 226 polls one or both of the adapters 404, 412 for irrigation controller (or sensor) changes and/or polls the irrigation controller 114 for changes via the adapters 404, 412. In other embodiments, the network adapter 404 polls the wireless adapter 412 for controller (or sensor) changes and/or polls the controller 114 for changes via the wireless adapter 412. In other embodiments, the wireless adapter 412 directly polls the controller 114 for changes via the controller port. The wireless adapter 412, in some embodiments, is configured to communicate status information obtained from the irrigation controller, over the point-to-point wireless channel, to the network adapter. The network adapter is further configured to forward some or all of the status information through the router 406 and over the distributed network to the server 226. See the embodiments of FIG. for more details. In some embodiments, the network adapter 404 and/or the wireless adapter 412 store raw data (logs, schedules, etc.) for on-demand retrieval. In some embodiments, the network adapter 404 and/or the wireless adapter 412 log irrigation controller activity (such as Flow, Station Activity, and/or Rain Sensor Activity). In some embodiments, the firmware of the network adapter 404 and/or the wireless adapter 412 is upgradeable via the Internet. Further, the network adapter 404 can also download new firmware for the wireless adapter 412 to transfer to and re-flash the wireless adapter 412. In some embodiments, the network adapter 404 and/or the wireless adapter 412 house an HTTP server (and optional DHCP server) and simple HTML pages. Thus, the controller 114 can be accessed via a local network (no Internet access required) or directly via laptop using the DHCP server and the HTTP. With this functionality, users/installers will be able to set levels and define actions required for rain sensors/flow meters to operate in the absence of an Internet connection.

In some embodiments, the wireless network 408 allows for data (e.g., packets) to be communicated between the wireless adapter 412 and the network adapter 404. In some embodiments, these packets are TCP/IP packets, while in other embodiments, they are in any packet form supported by the communications protocol of the wireless network 408. Non-limiting examples of types of messages or data/information in the packets include: Controller Port Commands (such as SIP Commands), Pairing Commands, Flow Commands (limits, actions, etc.), Rain/Flow/Moisture Sensor Commands (limits, actions, etc.) and Firmware Update (for updating wireless adapter 412 firmware).

Figure 5:
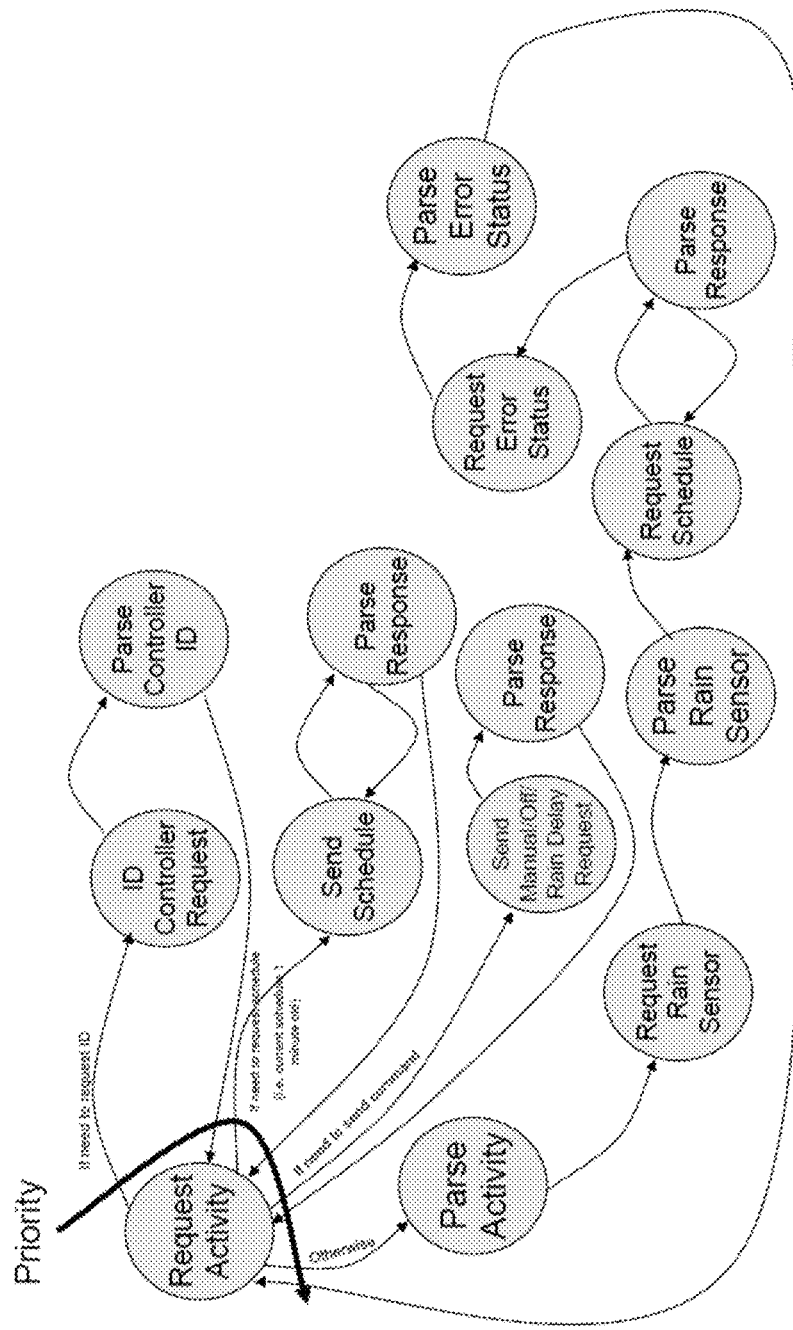
FIG. 5 is an exemplary flow diagram for a polling engine that may be implemented in one or more of a wireless adapter, a network adapter and a server in accordance with some embodiments.

FIG. 5 illustrates an exemplary flow diagram for a polling engine that may be implemented in one or more of a wireless adapter, a network adapter and a server in accordance with some embodiments. In some embodiments, the polling engine is implemented in the network adapter 404 of FIG. 4, while in some embodiments, the polling engine is implemented in the wireless adapter 412 of FIG. 4, while in other embodiments, the polling engine is implemented in the server 226. Furthermore, in some embodiments, the polling engine functionality may be included in more than one of the adapters 404, 412 and the server 226. It is understood that this engine may be implemented in other devices such as wireless adapters 112, 212, 312. Generally, an activity is requested (e.g., from the server 226) and the polling engine takes the appropriate action. For example, if a controller ID is needed, the polling engine requests the controller ID and parses the response. If a schedule is to be sent to the controller 114, the polling engine sends the schedule and parses the response. If a command is to be sent to the controller 114, the polling engine sends the command (e.g., manual/off/rain delay, etc.) and parses the response. If the request is for something else, the activity is parsed into possible additional requests. If it is a rain sensor request, the request is sent and the response parsed. If a schedule is requested, the schedule is requested and response is parsed. If the request is for error status, the request is sent and the response is parsed. It is noted that this polling engine is exemplary only and may include many other possible requests and processes. For example, in some embodiments, an authentication procedure can be included in the polling engine, e.g., to authenticate the controller 114 and/or the wireless adapter 412. Generally, in one example, the polling engine gets a tick periodically, e.g., every 0.5 seconds). Parsing may then take up to 3-4 ticks to receive a message and complete, but usually within 1 tick.

Figure 6:
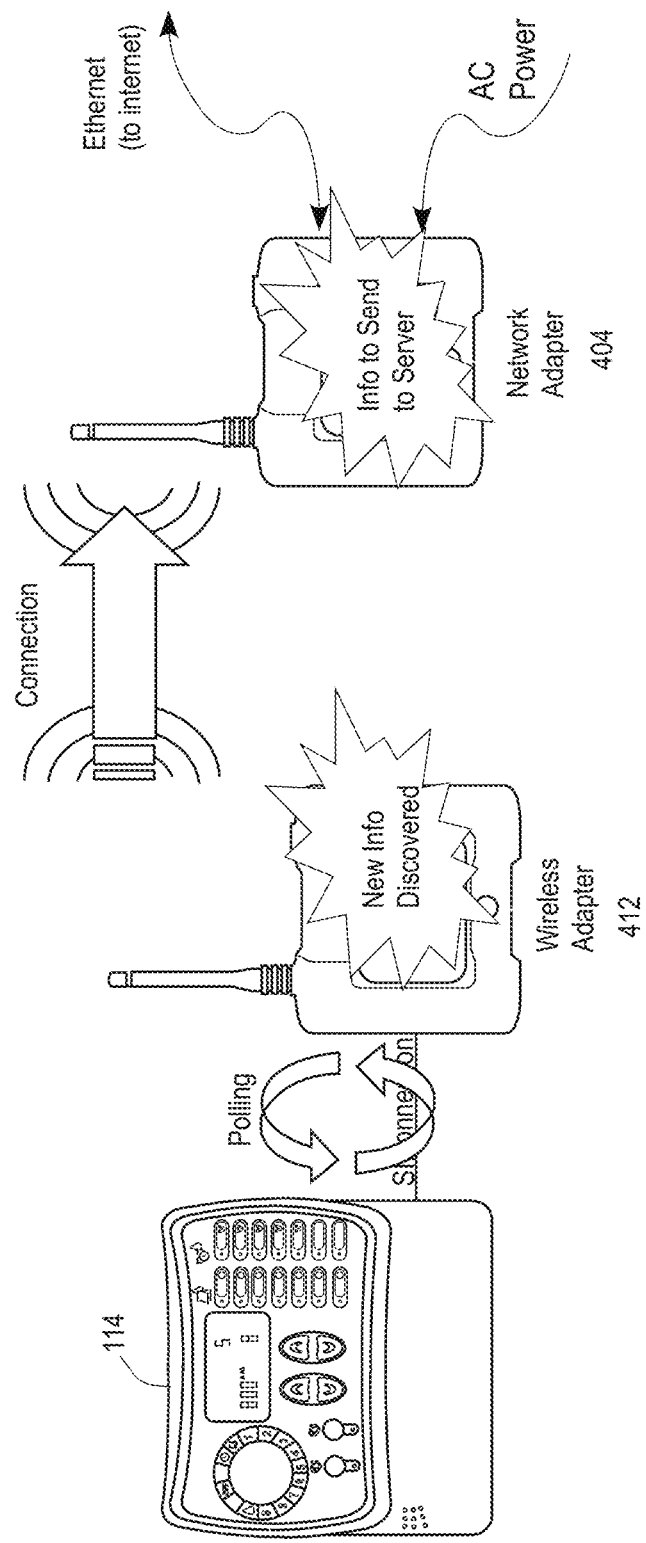
FIG. 6 is an illustration of a general sequence when information or an event is triggered from the wireless adapter in accordance with some embodiments.
Figure 7:
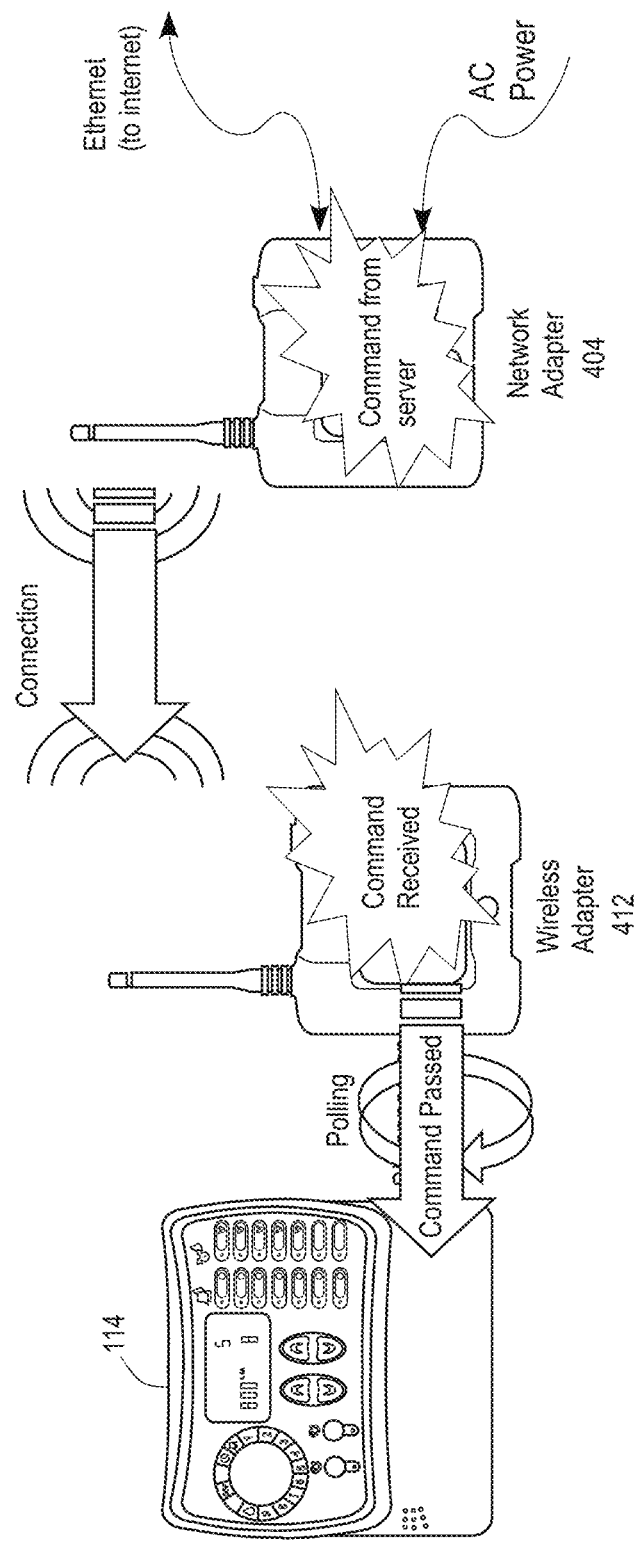
FIG. 7 is an illustration of a general sequence when information, a command or an event is triggered remotely, e.g., from a remote server, in accordance with some embodiments.

By way of example, in some embodiments, FIG. 6 provides a general sequence when information or an event is triggered from the wireless adapter, and FIG. 7 provides a general sequence when information, a command or an event is triggered remotely, e.g., from the server 226. For example, as shown in the example embodiment of FIG. 6, the controller polling engine is implemented in the wireless adapter 412 such that when new information is discovered at the wireless adapter 412, information is sent to the network adapter 404 to be forwarded to the server 226 via the Internet. In some embodiments, this information may be discovered at the wireless adapter 412 through polling of the controller 114 and/or its control port and/or information received from connected sensors (not shown). It is understood that the polling engine may be also or alternatively implemented in the network adapter 404 and/or the server 226. Non-limiting examples of the information learned at the wireless adapter 412 and corresponding actions that can be communicated to the server 226 from the wireless adapter 412 (via the network adapter 404 and the internet) can include:

| Observation | Action |
| --- | --- |
| Change in controller schedule | Update schedule data on server |
| Change in sensor status | Update sensor status on server |
| Change in valve activity | Update station activity on server |
| Change in error status | Update error status on server |
| Periodic update time (misc) | Update misc information on server |

Additionally, as shown in the example of FIG. 7, when a command is received from the server 226 at the network adapter 404, the command is forwarded to the wireless adapter 412, processed (if needed) and then passed to the controller 114 (e.g., via the controller port).

In some embodiments, the remote server 226 stores and processes data. In some cases, the server 226 is run by an irrigation company that sells the irrigation equipment or is run by another third party that provides the remote water management services. In some embodiments, to the extent desired, access to the data stored and collected at the server 226 may be provided to other entities. For example, this information can be stored in a database that is accessible. Database queries could provide at least one or more of the following: provide a list of homeowners that have stations in error, sorted by contractor; what percentage of controller model users use more than one program; provide a list of homeowners that had irrigation events during rainy weather, sorted by contractor; and provide a list of contractors with accounts along with a count of active systems, sorted by sales region. These are only examples of the type of database queries that may be possible.

In some embodiments, the irrigation controller 114 stores the log information, status information, sensor information, parameters and/or other such information. This information can then be retrieved by the server upon request from the server to the irrigation controller. For example, the server may request the log information and/or other such information in response to a user request through a remote consumer electronic device 116 requesting some or all of the information (e.g., user activating a user interface to view some or all of the information). As such, the server does not store the log information and other such information, and instead retrieves the information upon request by the user, which can reduce network traffic. Additionally or alternatively, the wireless adapter 412 (and/or network adapter 404) can store some or all of the log information, sensor information, parameters, settings, irrigation programs and/or other such information received from the irrigation controller and/or server. The information stored by the wireless adapter 412 and/or network adapter 404 can then be retrieved by the server 226, such as in response to a user accessing a user interface through a consumer electronic device 116. Further, in some embodiments, the server 226 can forward the relevant information to the user without storing the information. The server, however, may store some or all of the information as it is transferred. Again, in other embodiments, log information and/or other such information may be temporarily stored at the irrigation controller 114 and/or the wireless adapter 412, and forwarded to the server 226 to be stored until requested.

User Accounts for Services of Remote Server

In some embodiments where a service is provided via a remote server (such as server 226) as variously described throughout this specification, the service and the server 226 may be referred to as an irrigation service portal (or simply portal). The following supplements any prior discussion of remote services and user accounts and provides additional and/or alternative implementational details. In some embodiments, users create accounts (or user profiles) with the service. For example, via a remote device 116, 117, the user interacts with the server 226 to create a user account for the service. In some embodiments, the user accounts are password protected. User accounts can be provided to individual users (such as home/property owners and/or contractors or other persons managing or overseeing irrigation for one or more home/property owners) and/or to irrigation companies that manage irrigation for one or more home/property owners. In some embodiments, the user account is provided an account name, such as an email address associated with the account, or other user defined account name. In some embodiments, the account name may be verified by the server through a confirmation email (or other communication with the user). In some embodiments, the service will allow users to change their password or delete their account at any time.

In some embodiments, wireless adapters (e.g., adapters 112, 212, 312, 412) are associated with respective user accounts through an account association process. In some forms, the association process prevents (or makes difficult) the possibility of unauthorized pairing or "hijacking" of the controller. In associating an account with a wireless adapter, in some embodiments, a user accesses a user account (e.g., providing the appropriate password and/or other authorization information) through the server and activates an association process requesting the server associate a user account with a wireless adapter. The user enters an identifier of the wireless adapter (e.g., a serial number). In response, the server instructs the user to press an association or link communication button 416 (or combination of buttons) on the wireless adapter 412 within a predefined threshold period of time (e.g., five minutes) while the wireless adapter is in communication through the network adapter 404 with the server and capable of communicating over the distributed network 224 through the network adapter. Alternatively or additionally, a user can depress the communication button 416 within a predefined time period prior to or after being prompted by the server 226 to activate the button. The activation of the communication button 416 causes the wireless adapter 412 to generate and send a communication to the server, typically including identifier information of the wireless adapter. Upon receipt of the communication from the wireless adapter, the server confirms the association of the wireless adapter to the user account and records the association. For example, the server may extract an identifier of the wireless adapter from the association communication. Again, this association process prevents (or makes difficult) the possibility of unauthorized pairing or "hijacking" of the controller because the association process includes having the wireless adapter connected to the Internet and a confirmation that the user is physically close to the wireless adapter and controller to confirm the account association.

In some embodiments, the user account association process does not require having the controller 114 connected to the Internet or confirmation of being physically close to the controller. This allows contractors or installers to install the wireless adapter without requiring access to the homeowner's network. In some embodiments, users may disassociate their account from an associated wireless adapter at any time. Typically, disassociation may be limited to users with certain types of authority. For example, a user having authority to access a home owner account may have authority to disassociate a contractor account from a wireless adapter (e.g., in the event a new contractor is employed). In some embodiments, the user accounts are associated through the wireless adapter's serial number. In one form, the serial numbers are one or both of unique and not easily generated/guessed at by the public, e.g., they are not simply sequential numbers. In some embodiments, multiple adapters can be associated with a given user account, and in some embodiments, the number of adapters that may be associated with any given account is not limited. In other embodiments, however, the number of adapters that may be associated with any given account may be limited (e.g., five adapters to a given user account, and 500 adapters to a give contractor type account). Accordingly, the server may prevent an adapter from being associated with a user account when this would exceed the threshold number of adapters that can be associated with the account. The server typically notifies the user that the association could not be implemented because of the threshold, and/or may allow the user the opportunity to remove one or more of the adapters associated with the account (e.g., providing a listing of the adapters associated with the account). Again, some embodiments allow a user define names for adapters associated with the account (e.g., home adapter, rental adapter, main street house adapter, Johnson adapter, etc.).

Further, some embodiments provide the capability to allow a contractor that is installing an irrigation controller and/or wireless adapter to notify the homeowner, property owner or the like that she/he can access a user account and/or the irrigation controller through the system. For example, in some implementations, the contractor or user enters an e-mail address, phone number, fax number or the like into the server associated with the user account requesting an invitation be sent to link to a particular wireless adapter. The server then sends the notification (e.g., an e-mail, text message, fax, etc.) to the specified address or contact information inviting the user to create an account (if required) and visit the site.

In some embodiments, user accounts may be granted all the rights of a "master" account. The "master" may remove this grant at any time. In some embodiments, adapters being associated through an account holding rights granted by a "master" force the association of the adapter to occur with the "master" rather than the account being used. For example, this may be useful for companies that want to grant access to individual employees, but may wish to remove this access at some point in the future. In some embodiments, accounts that have been granted the rights of a master account do not have the rights to cause the disassociation of other accounts. Further, in some embodiments, master accounts may un-grant previously granted access at any time, and previously granted access is un-granted if the Master account is deleted. Similarly, in some embodiments, a user with access to an associated homeowner account or master homeowner account (i.e., not a contractor account) can disassociate another associated account, whether contractor or homeowner account, from the adapter associated with the account. Alternatively, in some embodiments, a contractor accounts cannot cause the disassociation of other accounts other than through the master grant scheme. In some embodiments, if a master account loses access to an adapter, all accounts inheriting access through that master also lose access.

In some embodiments, users have the ability to assign "friendly" names to each adapter. In some cases, this name is unique to the user account, not the adapter. For example, one account may have the friendly name "1234 Main St—Front" and another account may have the friendly name "Home—Front" for the same adapter. In some embodiments, when an account lists its associated adapters, it does so showing the friendly name along with the time/date of the last portal contact by the adapter. In some cases, this will indicate the adapter's connection status. Typically, the time/date will be in a smaller font than the friendly name.

In some embodiments, wireless adapters are granted access to the service portal for a period of time (e.g. one year) starting from the day of their first association with any account. In some embodiments, adapters are listed with associated accounts, expired or not. In some embodiments, any user attempting to access an adapter with expired portal access shall not be given access to the adapter through the portal. Instead, in some cases, the user shall be given the opportunity to purchase a new access period. In some embodiments, accounts associated with adapters with less than a certain period of time (e.g., 90 days) of portal access remaining shall receive an e-mail (or other communication) summarizing all of their associated adapters close to expiration or already expired.

In some embodiments, a user with an account associated with a given adapter may disassociate the adapter from any/all other users associated with the adapter. In some cases, accounts that have been disassociated are notified via e-mail or other communication. In some embodiments, the system verifies that the user is physically located near the adapter before disassociating the other accounts.

The wireless adapter 112, 412, 802, in some embodiments includes an indicator, display or the like that provides information to the user. For example, the wireless adapter can comprise one or more LEDs that notify the user of status information. In some implementations, for example, an LED can be illuminated as solid red indicating that communication with the network adapter 404, 804 has not been established. The solid red LED, in some embodiments is a default condition that continues until a response from the network adapter is received. This solid red LED can notify the user that the connection has not been established, and in some instances indicate that the user should relocate the network adapter 404 and/or wireless adapter 412. Similarly, the LED or a separate LED can flash or blink red indicating, for example, that the wireless adapter 412 has established contact with the network adapter 404, but is unable to establish contact with the server 226 over the wireless network 222 (e.g., due to a problem at the server, a problem with a local area network, problem with a router 406, or the like). In some instances, the LED or another LED can be illuminated a solid green indicating normal operating conditions and that successful connections have been established with the network adapter 404 and the server 226 with communications working as intended. Other indications, patterns, LEDs or the like can similarly be used.

In some embodiments, the server or portal keeps an activity log of at least the most recent non-irrigation activities associated with the adapter, for example, the most recent 20 such activities. In some cases, the log for each adapter is viewable by every associated account. In some embodiments, "non-irrigation activities" are events such as: manual starts, schedule changes, clock changes, association, and/or disassociation. In some embodiments, log entries include one or more of account, type of change, new value, time and date of change. In some embodiments, the portal keeps an activity log the most recent irrigation activities associated with the adapter, e.g., at least the 200 most recent irrigation activities associated with the adapter. In some cases, the log for each adapter is viewable by every associated account. "Irrigation Activities" are such events as: station on, station off, rain detected, rain no longer detected. Log entries include the type of event, Station number (if applicable), and/or time/date of event. In some embodiments, logs shall be maintained for all adapters that are within the period of valid portal access. In some embodiments, logs are kept, regardless of the status of the adapter, i.e., adapters that are within their access period and adapters that have an expired access period both have their logs maintained.

In some embodiments, for technical support purposes, the portal has a mode where a special account can be used to access all adapters by serial number. This account is associated with every adapter in a hidden fashion. In some cases, the password for this account shall be periodically changed automatically, e.g., every 7 days. After automatically changing to the updated password, the portal communicates (e.g., emails) the new password to the designated user.

In some embodiments, contractors that are installing wireless devices will want to have a method for easily letting the homeowner or property owner know how to access the controller through the portal. To this end, for example, a user may enter an e-mail address into the portal for a particular adapter, which causes the portal to send an e-mail (or other communication) to the specified address inviting them to create an account (if required) and visit the site hosted by the server.

In some embodiments, a given wireless adapter 212, 312, 412 can be associated with one or more accounts maintained at the server 226. For example, a contractor "office" account and a homeowner account. In some cases, both types of accounts may be associated with more than one wireless adapter 412 and network adapter 404 pair. In some embodiments, a third account type (Contractor "Individual" Account) is provided to allow individual employees of contractors managed access to site. In one form, an individual contractor account has access to all of the accounts that the "office" account grants access to, where the default is all accounts linked to the office are viewable.

In some embodiments, when a user (such as a Homeowner or Contractor) programs and/or updates irrigation schedule data at the user device 116 and/or the server 226, the server sends the new schedule data to the controller 114 via the adapters 404 and 412. In some embodiments, when a user (such as a Homeowner or Contractor) Requests Manual/All Off, the server sends a Manual Run Request or All Off command to the controller 114 via the adapters 404 and 412. In some embodiments, when the server 226 has not heard from the wireless adapter 412 in a specified period of time, the server sends an e-mail (or other communication or alert) to the Homeowner/Contractor.

The following describes some embodiments of exemplary features and functions of "contractor accounts". In one form, the user of the contractor account can see all controllers of their clients' controllers. In one form, for a given client's controller, the user of the contractor account can do one or more of: Start Manual Run, Turn Everything Off, See Error Reports, View/Edit Schedules, and View Sensor Status. In one form, the user of the contractor account has the following Account Management abilities: Add Controller/Adapter, Invitation to add Controller/Adapter (sent to homeowner), Remove Controller/Adapter, Edit Contact Information (shown on Homeowner's Screen), and Change Password. In some embodiments, there are "Office" and "Individual" Contractor Accounts. In one form, an office account is an account that is linked to many wireless adapters; however, note that the contractor is only linked to homeowner through the wireless adapter. The contractor account is not directly linked to homeowner account. Homeowners may have many accounts, each with a different contractor. In some embodiments, an Individual contractor account is linked to and managed by Office account and allows for many employees at contractor to access info without having to give out master account information. In some forms, an office contractor account can manage the Individual contractor accounts. In some cases, for simplicity, the Office contractor account may be the only account used by a contractor (i.e., all functions are available from the office account, and this can be used as the sole account).

The following describes some embodiments of exemplary features and functions of "homeowner accounts" (or property owner accounts). In one form, the user of the homeowner account can see all controllers that they "own". This may be many controllers, but may often be only one controller. In some embodiments, the user of the homeowner account can do at least one or more of the following for each client controller: Start Manual Run; Turn Everything Off; See Error Reports (shorted Station); View/Edit Schedule Data; View Sensor Status; Approve Linking Contractor "Office" account (e.g., network adapters may be installed by Contractors before having been set up by a homeowner, and they may get linked without requiring homeowner approval); Un-link Contractor Account; Edit Location Information for Controller (Address/Location info); and View Rain Sensor Status. In some embodiments, the user of the homeowner account has at least one or more of the following Account Management abilities: Change Password; and Delete Account.

Figure 8:
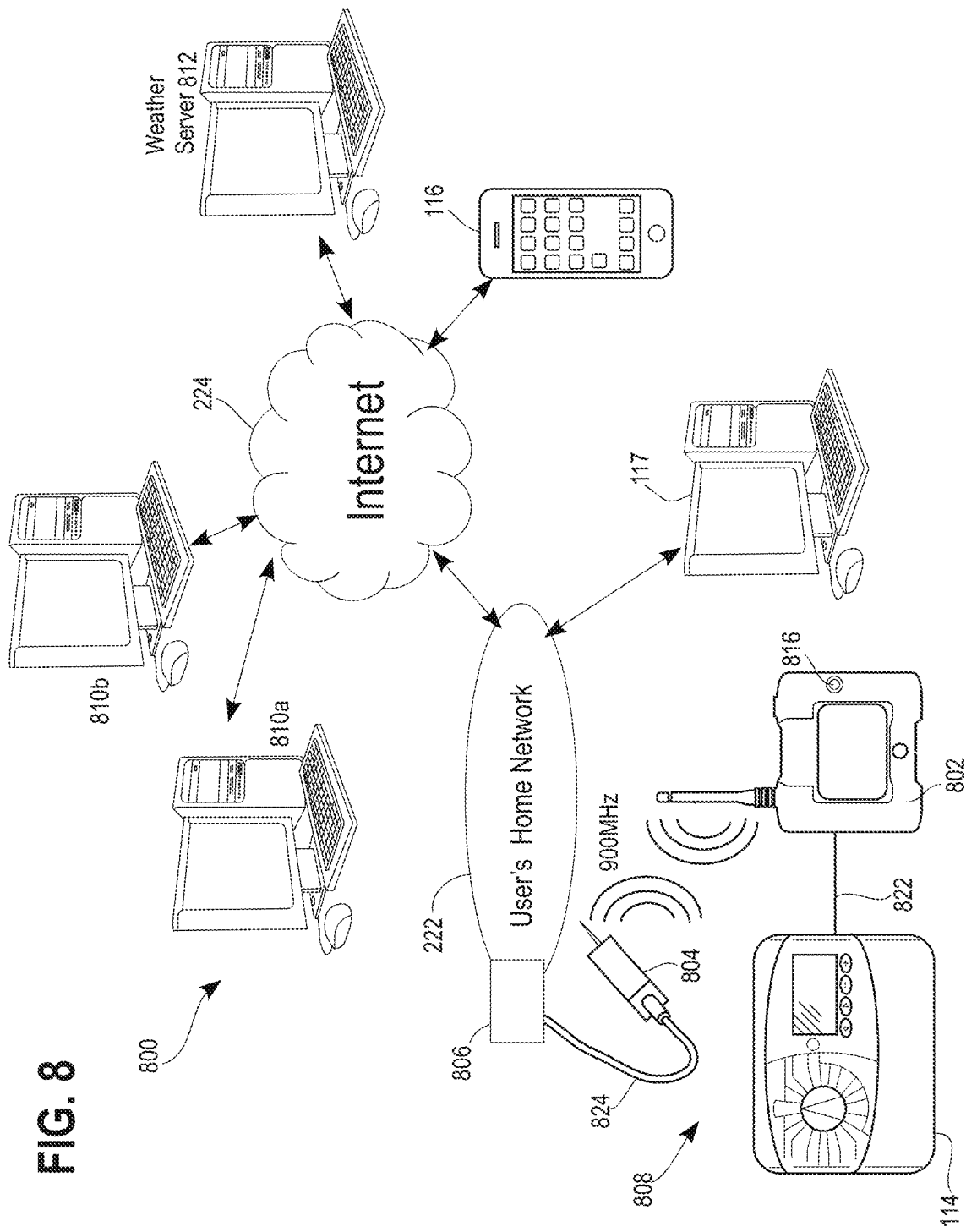
FIG. 8 depicts a simplified block diagram of a system providing wireless access to one or more irrigation controllers, in accordance with some embodiments.

FIG. 8 depicts a simplified block diagram of a system 800 providing wireless access to one or more irrigation controllers 114, in accordance with some embodiments. The system 800 includes a wireless adapter or interface 802 that communicationally couples with the irrigation controller 114. In some embodiments, the coupling between the irrigation controller 114 and the wireless adapter 802 is through a direct connection 822, e.g., a Simple Irrigation Protocol (SIP) Port, of a control panel of the local irrigation controller 114. In other embodiments, the wireless adapter may wirelessly communication with the irrigation controller 114 (e.g., Bluetooth, WiFi, 900 MHz, etc.). The wireless adapter 802 further wirelessly communicates with a network adapter 804 (or wireless gateway 804). In some embodiments, the wireless adapter 802 wirelessly couples with the network adapter 804 via a direct point-to-point wireless communication path. Additionally, in some embodiments, the network adapter 804 is an Ethernet adapter or other wireless communication device. The wireless network adapter 804 is configured to provide a translation of communications between the wireless communication protocol and the wired communication protocol, and similarly between the wired communication protocol and the wireless communication protocol. Further, in some embodiments, the network adapter can couple with or be included within a local router 806 of a user's local wireless network 222 (e.g., a WiFi wireless home network). In some embodiments, the network adapter 804 connects by direct wireline connection to the local router 806, with the local network 222 coupled with a distributed communication network 224 (e.g., a WAN, the Internet or the like). This allows two-way communications between the irrigation controller 114 and one or more remote servers 810a-810b or services, consumer electronic devices 116-117, and/or other such devices via the internet 224. In some embodiments, the irrigation controller 114, wireless adapter 802, irrigation valves that are activated and deactivated by the irrigation controller 114, and in some instances the network adapter 804, are part of an irrigation system 808 that implements and controls irrigation at a site where the irrigation system is located.

In some embodiments, the wireless communications between the wireless adapter 802 and the network adapter 804 are via a 900 MHz wireless communication link using one or more of FHSS, DSSS and FSK or other such modulation techniques. Other embodiments may communicate over alternative communication techniques (e.g., Bluetooth, cellular, radio frequency, optically, and/or other such techniques). The network adapter 804 couples, for example, by wireline 824, fiber optic and/or other such connections to an Ethernet port of the local router 806, and provides a translation from the wireless protocol to the network protocol to be received by the local router. In some embodiments, a user establishes a connection between the wireless adapter 802 and the network adapter 804 by pressing one or more buttons 816 on one or both the wireless adapter 802 and/or the network adapter 804. In other embodiments, the wireless adapter 802 and network adapter 804 may be configured to pair to each other when powered up, upon activation by the irrigation controller 114 or through other methods. Once connected, the wireless adapter 802 and network adapter 804 connect the irrigation controller 114 with the remote server 810 accessible over the Internet 224 (e.g., server 810a provided by the Rain Bird Corporation, or another server 810b owned and operated by a third party, such as Arrayent).

Further, as described above, in some embodiments, a wireless adapter 802 and/or the corresponding irrigation controller 114 are associated with a user account at the server 810. For example, the user can press one or more buttons 816 on the wireless adapter 802, which may be the same button or a different button as used to link with the network adapter 804, to initiate and/or complete an association process as described above.

Accordingly, the irrigation controller 114 can now communication with, be controlled and/or be monitored by a user using a consumer electronic device 116-117 from substantially anywhere through the Internet 224 by accessing the server/s 810a, 810b from the consumer electronic device. For example, the consumer electronic devices can be smart phones, computers, laptops, tablets or substantially any other relevant WiFi, internet or other network enabled device or other such device capable of accessing the Internet. In some implementations, the consumer electronic device 116 can provide a user and/or contractor with a user interface that is similar to the interface of the control panel of the irrigation controller 114. In some embodiments, the consumer electronic device 116 can provide the user with an easier-to-use interface in comparison to the user interface of the control panel of the irrigation controller 114. Additionally or alternatively, a user interface can be provided that provides features, functions and/or parameters that are not available through an interface of the irrigation controller or not readily available through the interface at the irrigation controller. For example, the server 810a can issue web content with one or more graphical user interfaces that can be displayed on the consumer electronic device 116 allowing the user to interact with the user interface. In some embodiments, the consumer electronic device 116 provides interaction with the server 810a-b through the web browser of the consumer electronic device. Additionally or alternatively, the consumer electronic device 116 can include an application or other software to interact with one or both the servers 810a-b.

The wireless adapter 802 and/or the irrigation controller 114 can be paired to or associated with a user account and/or profile created and maintained through the server 810. In some embodiments, the server 810 can store irrigation scheduling, parameters, settings and/or the like, as well as obtain status information, reports and/or other such relevant information from the irrigation controller 114 through the wireless adapter 802 and network adapter 804. Users can view irrigation schedules, parameters, settings, as well as set parameters, settings, irrigation schedules, modify irrigation scheduling, implement manual irrigation, interrupt irrigation and/or take other action through the server 810 from substantially anywhere the electronic device 116 can gain access to the distributed network 224 (e.g., the Internet). In order to reduce bandwidth consumption, in some instances the wireless adapter 802 intermittently connects with the server 810 (e.g., based on a schedule, periodically, etc.) to determine whether there is a new irrigation schedule, parameters, commands, instructions or other information to download for the associated irrigation controller 114. As such, changes, new schedules, modifications and the like can be downloaded to the irrigation controller 114 through the wireless adapter 802. Similarly, the irrigation controller 114 and/or wireless adapter 802 can upload information, reports, alerts, status information, sensor states or data, and/or other information to the consumer electronic device 116 and/or the server 810. In some embodiments, the server 810 may store some or all of the information obtained from the irrigation controller and/or the wireless adapter 802, which can be later accessed by a user or the server 810 can issue a notification alert to the user (e.g., text message, email, cellular call, etc.).

As described above, the irrigation controller 114 is typically configured to store the irrigation schedule that is implemented by the irrigation controller in controlling the activation and deactivation of the one or more vales at the site to control irrigation at the site. In some embodiments, the irrigation controller 114 stores relevant irrigation schedule(s), parameters, sensor data, event information, triggers, settings, log information, and the like (generally referred to below as status information). Additionally, in some implementations, the wireless adapter 802 collects status information from the irrigation controller 114 and locally stores that information so that some or all of that information can be forwarded to the server 810 and/or a user device 116. The wireless adapter can supply some or all of this information to the server, for example, in response to a request by the server (e.g., a polling request). In some embodiments, the wireless adapter 802 polls or requests status information from the irrigation controller 114 and stores or logs the information. The status information can include substantially any relevant information known at or provided to the irrigation controller, and can include but is not limited to current (active) irrigation, current status of one or more sensor, error status, and other information. The wireless adapter can be configured to poll the irrigation controller periodically, based on a schedule, in response to a request from the server (e.g., based on instructions from a user at a user device), and the like. Accordingly, in some embodiments, the wireless adapter may acquire and store at least some of the current status information before it is sent to the server and/or requested by the server. Similarly, the wireless adapter can poll the irrigation controller in response to a request, for example, from the server for status information in addition to or alternative to the wireless adapter providing some or all of the status information previously obtained locally stored at the wireless adapter.

In some embodiments, the server does not have to store such information. The server retrieves and/or receives information from the wireless adapter 802 and can be configured to forward that information to a user device 116. Further, a user at a remote consumer electronic device 116 can cause the server to retrieve relevant information to be forwarded to the consumer electronic device 116 for use and/or observation by the user. Accordingly, the server does not have to store irrigation schedules, programming, logs or other such information. In other embodiments, the wireless adapter 802 and/or the network adapter 804 can store some or all of the irrigation schedule(s), parameters, settings, sensor data, event information, triggers, status information, log information, and the like.

Further, property owners, contractors or the like can each have their own separate accounts and/or profiles at the server 810 that are associated with or linked to appropriate irrigation controllers 114 and/or wireless adapter 802. Accordingly, homeowners can see all of their irrigation controllers 114 (typically only one controller, but may be multiple if the user has multiple residencies), and a contractor (e.g., a gardener) can access all irrigation controllers for the contractor's clients. Again, the server 810 can be accessed and the irrigation controller 114 controlled with substantially any web browser and/or app. This control can include, for example, manual watering activated through the Internet 224, rapidly adjusting irrigation, changing and/or programming irrigation schedules, manual interrupt of an irrigation schedule, and other such actions. Similarly, a contractor can easily make changes to irrigation in response to user requests, from substantially anywhere and at substantially any time. Further, the user and/or contractor can obtain information, status reports, notifications, alerts and/or other information from the irrigation controller 114 and/or server 810.

In some embodiments, there is no special software required at the consumer electronic devices 116 and 117 since the server 810 serves up web content in the appropriate form to the browsers of the devices 116 and 117 (e.g., HTML, XML and/or other relevant content). For example, a user interface is provided by the server 810 when interacting with web browsers of remote devices 116, 117. In other embodiments, an "app" is installed and run on the consumer electronic device 116 that allows for easy programming and monitoring for the user from the consumer electronic device 116.

In some embodiments, the wireless adapter 802 does not wirelessly communicate with sensors, as it did in FIG. 4 above. In other embodiments, the wireless adapter can communicate via wired or wirelessly with one or more sensors.

Some embodiments take advantage of weather data provided by one or more sources, such as a weather server 812 or service, one or more sensors or other such sources. Further, some embodiments can utilize predicted weather forecast conditions and/or data predicting pending weather conditions in determining whether to adjust and/or interrupt irrigation. For example, a server 810 and/or the wireless adapter 802 can use predicted and/or forecasted wind, rainfall, snow fall, temperature and/or other such predicted weather conditions from the weather server 812 and/or other source/s to determine whether irrigation should be interrupted for one or more irrigation controllers 114 at one or more sites. In some instances, the servers 810 obtain information (e.g., on-demand) regarding the near-term rain forecast for a given city, county, region (e.g., defined by ZIP code) or the like. Irrigation (or bypassing irrigation) decisions can be made by the server 810 and sent to individual wireless adapters 802 as relevant. In some embodiments, for example, the server 810 gets forecast or predicted rainfall data and makes decisions on whether to allow or interrupt irrigation based on rainfall that is predicted but has not yet occurred. As another example, if a given controller 114 were scheduled to water on a given day, but it was known that rainfall was expected on the following day, that controller's schedule could be interrupted or adjusted to account for the fact that future predicted rainfall would provide additional irrigation (assuming the prediction is accurate). In other embodiments, the forecast information and/or some of the forecast information is provided to the wireless adapter 802 and/or the irrigation controller 114 to allow the wireless adapter and/or irrigation controller to adjust and/or interrupt one or more irrigation schedules. Typically, the wireless adapter and/or the irrigation controller are provided with threshold information, which in some instances is defined by the user (e.g., through a user interface of the irrigation controller, remotely at a user device 116, or the like). The wireless adapter 802 and/or irrigation controller can receive the forecast information or other sensor information (e.g., local sensor information) and determine whether an irrigation schedule should be interrupted, suspended and/or modified based at least in part on the threshold and the received weather data.

Again, in some embodiments, the decision of whether to interrupt irrigation and/or modify an irrigation schedule at a controller is determined at the server 810. The user can enter settings to define parameters and/or threshold dictating when the interruption and/or modifications will occur. For example, the user can define that irrigation should be interrupted when it is predicted that a first amount or threshold (e.g., X inches of rain) will fall. In some instances, the amount or threshold may be limited to a period of time, such as occurring within a specified number of days. For example, interrupt irrigation when X inches of rain is predicted to fall in the next Y days. If the server 810 determines (based on user settings) that irrigation should not occur because of predicted rainfall, the server 810 sends a command (e.g., suspend or interrupt command) to the wireless adapter 802 via the internet 224 and network adapter 804, and the wireless adapter 802 then sends a command (e.g., an "ALL OFF" interrupt command, "RAIN DELAY" interrupt command, etc.) to the irrigation controller 114 with which it is wired.

Weather Forecast Data

Figure 9:
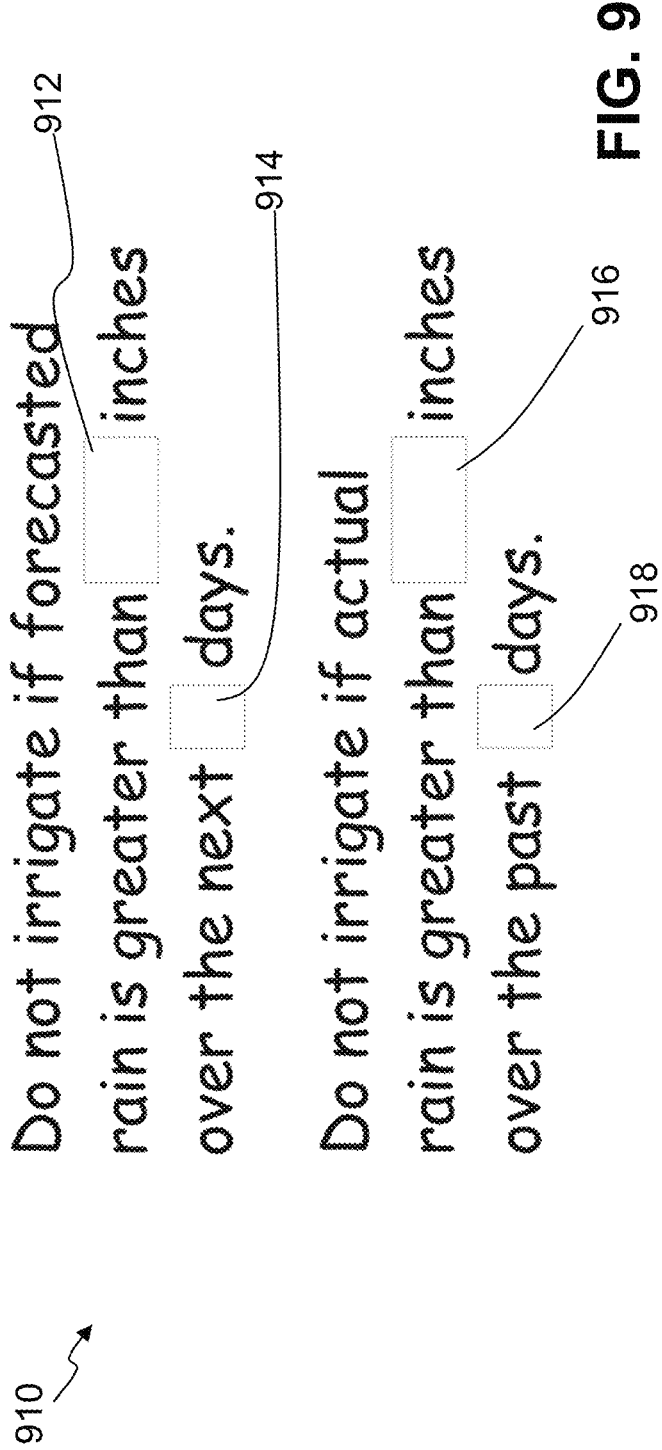
FIG. 9 shows a simplified exemplary forecast control user interface that can be provided to the user through the server and/or at a consumer electronic device, in accordance with some embodiments.

FIG. 9 shows a simplified exemplary forecast control user interface 910 that can be provided to the user through the server 810 and/or at a consumer electronic device 116-117, in accordance with some embodiments. The forecast control user interface 910 can, in some embodiments, provide an amount parameter 912 and duration parameter 914. For example, the user can specify that when a first amount 912 of rain fall (e.g., 1.5 inches) is forecasted to be received during the defined period of time 914 (e.g., over the next three (3) days), irrigation is to be interrupted and/or adjusted.

Similarly, in some embodiments, the forecast control user interface 910 can allow a user to further interrupt and/or adjust irrigation based on actually amounts of rain received and/or specified (e.g., by the weather server 812). In some embodiments, the forecast control user interface 910 includes an actual amount parameter 916 and a second duration parameter 918. For example, the user can define that irrigation is to be interrupted when a second actual amount of rain 916 (e.g., 2 inches) is measured over the second duration 918 (e.g., past three (3) days). Again, the forecast control user interface 910 can be accessed through a user's consumer electronic device 116, a user interface of the server or the like.

By being connected to a remote server 810 that receives predicted rainfall from a weather server 812, irrigation can be locally interrupted and/or adjusted without needing a local rain sensor. In some embodiments, the irrigation controller 114 and/or the wireless adapter 802 can receive local sensor data and use that information to supplement the forecast and/or actual weather data, override instructions from the server 810 and/or confirm the predicted weather and make adjustments when the prediction was inaccurate. Additionally or alternatively, the local sensor data can be forwarded to the server 810 to be used by the server in confirming forecasted weather and/or making relevant adjustments or interruptions to irrigation.

In some embodiments, the server 810 can provide some timing parameters and/or clock signals to the wireless adapter 802 and/or irrigation controller 114. The server 810 can send clock signals to ensure that the internal clocks of the various wireless adapters 802 and/or irrigation controller 114 are updated and synchronized with the server such that the wireless adapters 802 and/or irrigation controllers 114 have substantially the same time and date as the server 810. For example, the server 810 can initiate a clock update and/or synchronization twice a day, where the server 810 sends synchronization signals to the one or more wireless adapters 802 that the server is in communication with. In some implementations, the server/s 810 may communicate with hundreds, thousands or even hundreds of thousands of wireless adapters 802. Accordingly, some embodiments utilize multiple distributed servers 810.

Additionally or alternatively, in some embodiments, the server 810 does not send all clock synchronization signals at the same time (which could overload the server). Instead, the server staggers the transmission times of the synchronization signals. The timing of the staggered transmission times can be based on random number generation, based on when the wireless adapter 802 was cooperated in a system 800 with a server 810, based on an identifier or serial number of the wireless adapter 802, or other such factors. In some embodiments, the server determines an identification of the wireless adapter and a time of transmission of the clock synchronization signal as a function of the identification of the wireless adapter. For example, the time of transmission of the clock synchronization can be determined by identifying two predefined digits of an identifier of the wireless adapter, and defining an hour of transmission by a first of the two predefined digits and the minute of transmission by a second of the two predefined digits. As a further, example, in some embodiments the transmission times of the synchronization signals are staggered based on the last two digits of the serial number of each wireless adapter, where the second to the last digit defines the hour and the last digit defines the minute of the transmission of a clock update signal. Thus, the clock update signals are staggered over several hours.

Other information is typically communicated between the server 810 and the wireless adapter 802. For example, the server forwards irrigation schedules (which can include complete irrigation schedules or modifications to irrigation schedules), control signal and other relevant information and/or parameters. Similarly, the wireless adapter 802 can communicate information to the server 810. In some embodiments, the server 810 polls the wireless adapters 802 for information. For example, in response to a user's request, the server 810 polls the wireless adapters 802 for information such as but not limited to: status and/or state information of sensors in communication with the controller 114; information regarding which stations of the irrigation controller 114 are currently on and off; error status information; operating conditions of the wireless adapter 802 and/or irrigation controller 114; and/or other such information. The wireless adapters 802 get at least some of this information from the irrigation controllers 114 to which they are wired. In some embodiments, the data is stored at the wireless adapters 802. The request from the server 810 occurs when the user requests relevant information (e.g., when the user clicks to "review logs" from a user interface of a consumer electronic device 116). The server 810 receives and forwards the data. In some embodiments, the server 810 does not store the information and instead retrieves the relevant information from the wireless adapter 802 and/or the irrigation controller 114. In other embodiments, the server, the wireless adapter 802 and/or the irrigation controller 114 may store some or all of the information for a limited period of time (e.g., the ten most recent entries for specific conditions and/or parameters). In many implementations, the storage of log, status, activity and/or other such data is maintained at the wireless adapters 802, not the server 810.

Again, the user interfaces provided to the user through the consumer electronic devices allows the user to not only obtain information but to interact with the server 810, provide commands, define, program and/or modify irrigation schedules, and/or otherwise interact with the server and/or provide instructions. For example, the users can enter programming data from the remote consumer electronic devices 116, 117 including irrigation schedules, adjustments, manual commands, thresholds (e.g., rain cutoff thresholds (e.g., for forecast rainfall), temperature thresholds), seasonal adjustments and/or other such controls and programming. The user programming is transferred from the server 810 to the wireless adapters 802, and then transferred to the relevant irrigation controller 114.

Figure 10:
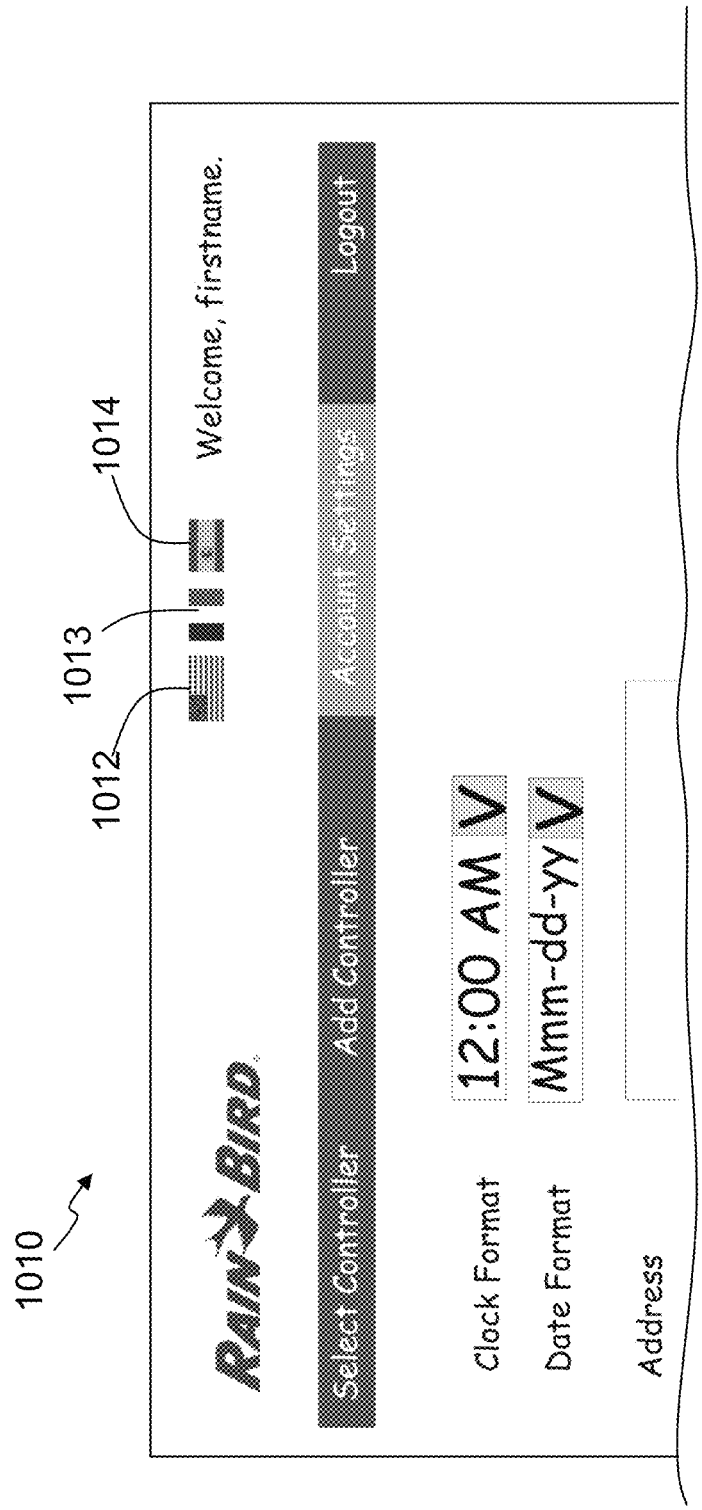
FIG. 10 shows a portion of a user interface, in accordance with some embodiments, which provides language options.

FIG. 10 shows a portion of a user interface 1010, in accordance with some embodiments, which provides language options 1012-1014. The language options or icons 1012-1014 allow a user to dictate the language of the interface as displayed to the user. For example, images or graphics of flags can be associated with relevant languages, such as the flag option 1012 for the United States corresponding with English; the flag option 1013 for France corresponding to French; the flag option 1014 for Spain corresponding to Spanish; etc. There can be substantially any number of available languages, and the options or icons 1012-1014 can be included in substantially any user interface provided through the server 810 and consumer electronic device 116-117. The selection of a flag option 1012-1014 changes the displayed language of the user interface, and typically subsequent user interfaces provided from the server 810.

Figure 11:
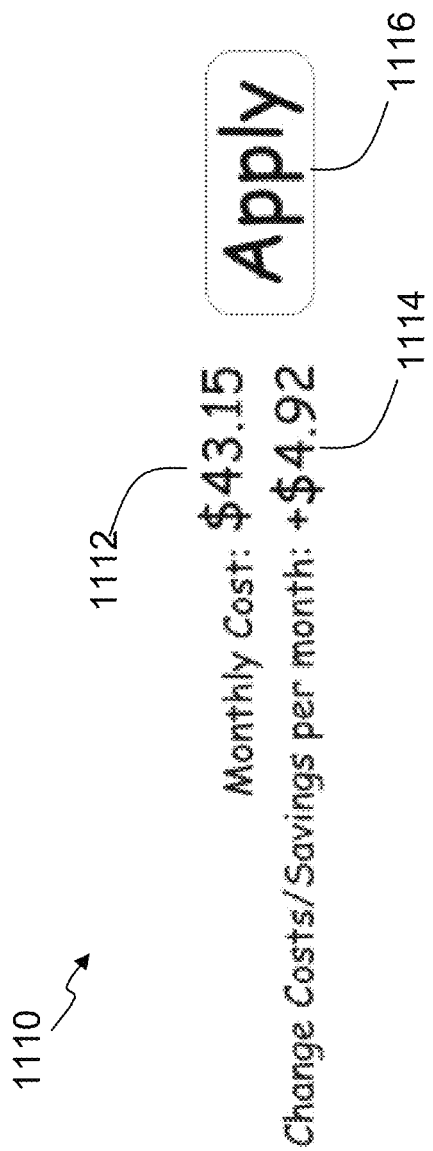
FIG. 11 shows a cost estimate user interface in accordance with some embodiments.

FIG. 11 shows a cost estimate user interface 1110 in accordance with some embodiments. In some embodiments, the cost estimate user interface 1110 may be part of or incorporated into another interactive user interface. The cost estimate user interface 1110 allows the user to obtain cost estimates 1112 for implementing irrigation. In some embodiments, server 810, wireless adapter 802, irrigation controller 114 and/or the consumer electronic device 116 can calculate and provide estimated costs 1112 for implementing one or more irrigation schedules (or one or more portions of an irrigation schedule). Typically, the cost estimate 1112 is based on a period of time, such as a billing period, per month, per week, per day, etc. (which may be user specified in some implementations), while in other instances it may provide costs per cycle. For example, the user can enter information such as flow rates for each zone (e.g., gallons per minute) and marginal costs of water (e.g., in tiers of usage and provided by the water utility provider, e.g., $/gallon). This information can be stored at and/or acquired by the wireless adapter 802, consumer electronic device 116, the irrigation controller 114 and/or server 810. For example, the information may be stored at the irrigation controller 114 and the wireless adapter 802 can request the relevant information from the irrigation controller to perform the calculations and/or forward the information to the server for calculation. The server, wireless adapter 802 and/or the consumer electronic device 116 can then calculate a predicted cost of implementing the irrigation schedule and forward the cost estimate 1112 of operating the scheduled irrigation to be displayed to the user (e.g., through a user device 116) or otherwise provided to the user (e.g., through email, text message, etc.). In this way, the user can see an estimate of how much it will cost in dollars (or other currency) to irrigate according to the programmed schedule.

Additional, in some embodiments, the server, wireless adapter 802 and/or the consumer electronic device 116 can calculate predicted changes in costs 1114 associated with programming changes specified by the user and/or events that alter the irrigation schedule. For example, when the user programs a change to an existing watering schedule, the server 810, wireless adapter 802 and/or the consumer electronic device 116 can calculate a predicted cost of implementing the changed irrigation and/or calculate a predicted change in the cost (delta cost) of the irrigation. The change in irrigation can be a temporary change (e.g., an interrupt of one or more zones, or a cycle, a one day adjustment in runtimes, etc.) or a reprogramming of one or more parameters of an irrigation schedule and/or a complete reprogramming of an irrigation schedule. In some embodiments, the predicted change in cost can be calculated by estimating a predicted cost of implementing the initial irrigation schedule, estimating a predicted cost of implementing a changed irrigation schedule that incorporates the change to the irrigation schedule, and subtracting the predicted cost of implementing the irrigation schedule and the predicted cost of implementing the changed irrigation schedule. As described above, the server 810 would have knowledge of estimates and/or actual flow rates through one or more zones of irrigation at a site, and can use this flow rate along with durations of runtime and cost per unit or volume of water (or other such cost) to calculate predicted costs and/or changes in costs.

One or more of the predictions can be forwarded to the user. For example, the predicted cost and predicted change in cost can be forwarded to a user device, which can display the predicted cost 1112 and the estimated change in cost 1114 that would be expected should the change in irrigation actually be implemented. This allows the user to see how much the change will cost or save. In some embodiments, the cost estimate user interface 1110 is displayed in response to proposed changes and the user can choose to apply the changes by selecting an apply option 1116, or discarding the potential changes once the user views the costs of the change. In some embodiments the potential change in cost 1114 can include indicating whether there is an expected increase (e.g., by displaying the expected change in red, include a plus symbol "+", up arrow or the like as part of the estimated change in cost 1114) or an expected decrease in cost (e.g., by displaying the expected change in green, include a minus symbol "−", down arrow or the like as part of the estimated change in cost 1114).

As described above, the detected change in irrigation can include detecting an interruption and/or suspension to the irrigation schedule, whether initiated by the user, a sensor threshold being exceeded, forecast predictions or the like. The predicted change in cost can be calculated as a result of the interruption, and in some instances a predicted interruption. For example, the server 810, wireless adapter 802 and/or the consumer electronic device 116 can identify when the irrigation schedule is resumed or predicted to resume. An estimate of an amount of water that would have otherwise been used while the irrigation schedule was interrupted had the interruption to the irrigation schedule not occurred can be calculated. For example, the wireless adapter or server can acquire the irrigation schedule from the irrigation controller (e.g., poll the irrigation controller) and calculate the predicted cost of the irrigation schedule prior to the change. In some embodiments, the predicted change in a cost of irrigation can be calculated, at least based on a predicted cost of the amount of water that would have been used while the irrigation schedule was interrupted. Additionally, some embodiments further calculate a total savings in cost over a period of time during which multiple interruptions, suspensions and/or changes to the irrigation schedule occurred. For example, the predicted cost of the amount of water that would have been used while the irrigation schedule was interrupted can be added to a summation of one or more savings in cost resulting from one or more interruptions and/or changes to the irrigation schedule occurring during the period of time.

In some embodiments, additional or alternative cost information is provided to the user. For example, the server 226, 810, wireless adapter 802 and/or consumer electronic device 116 can calculate an estimate of how much money and/or a percentage change was saved or additionally cost by a change, interruption, suspension or the like, an estimate of how much money has been saved by one or more features (e.g., suspension and/or modification of a schedule as a result of forecast information, suspension due to detection of rainfall or threshold amount of rainfall, etc.), an estimate of how much money has been saved by one or more features over a period of time (e.g., 1 year, 5 years, user specified, etc.) and/or over the life of the irrigation controller, an estimate of how much money is predicted to be saved over a 10-year period for implementing changes to irrigation programming and/or the activation of the one or more features, or other such estimates or combinations of such estimates. Still further, some embodiments additionally or alternatively provide the user with estimated changes in the amount of water used (e.g., in gallons).

Further, some embodiments are configured to provide the user with predicted costs (e.g., generate one or more reports that can include estimated monthly water costs of the irrigation system). In calculating the costs the server 810, wireless adapter 802 and/or the consumer electronic device 116 is provided with and/or access information that includes the cost of water (e.g., $/gal) and flow rates for each station (e.g., gal/min). This information can be supplied by a user, obtained from a water authority (e.g., via the distributed network 224), a third party source, predefined by a manufacturer, other sources or combinations thereof. As an example in accordance with some embodiments, the cost of water in a month can be approximated as:

$$CW \approx \sum_{\substack{j: All \\ Stations}} \left[ \left( \sum_{\substack{k: All \\ Programs}} dur_{j,k} \cdot stc_k \cdot SA_k \cdot wdc_k \right) \cdot FR_j \right] \cdot MCW,$$

where the parameters are as follows, CW: Cost of water (e.g., $/month); $dur_{j,k}$: duration of station j in program k (e.g., minutes); $stc_k$: start time count for program k; $SA_k$: seasonal adjust for program k, $wdc_k$: Watering day count for program k, $FR_j$: flow rate for station j (e.g., gal./min.), and MCW: marginal cost of water (e.g., $/gal.).

For programs irrigating, for example, by day of week, the monthly water day count can be calculated as:

$$wdc = \frac{\text{\# of irrigating days}}{7} * 30,$$

where an "irrigating day" is a selected, non-excluded day.

For programs irrigating using an odd or even schedule, the monthly water day count can be calculated as:

$$wdc = \frac{7 - \text{\# of excluded days}}{7} * 15.$$

For programs irrigating using a repeating cycle, the monthly water day count can be calculated as:

$$wdc = \frac{7 - \# \text{ of excluded days}}{7} * \frac{30}{\# \text{ of days in cycle}}.$$

Again, some embodiments calculate and provide estimated costs associated with changes in irrigation (e.g., the change in estimated monthly costs of water). The change is typically relative to the current schedule. However, the change may be based on a previous schedule, a predefined or base schedule, a default schedule or some other reference. As described above, the predicted cost for implementing the irrigation and/or the predicted change in costs can be calculated by the server 810, the wireless adapter 802, irrigation controller 114 and/or the consumer electronic device 116. In some embodiments, the current schedule is obtained at the wireless adapter 802, server 810 or consumer electronic device from the irrigation controller 114. In some implementations, a user may select the irrigation controller 114 from a list of irrigation controllers associated with the user and/or an account with which the user is authorized, or otherwise identify the irrigation controller. In other instances, for example, when the user is only associated with a single irrigation controller, the irrigation controller does not have to be expressly identified. In some embodiments, the predicted change is costs can be calculated as follows:

$$\text{Cost Change} \approx CW - CW',$$

where the parameters are as follows, CW: cost of water due to current and/or changed schedule, and CW': cost of water due to previous schedule.

In some embodiments, the predicted change in cost for a schedule change is provided as a percentage change, for example, when a marginal cost of water is not available. For example, the predicted percentage change can be provided as:

$$V_{irr} \approx \sum_{j: All\ Stations} \left[ \left( \sum_{k: All\ Programs} dur_{j,k} \cdot stc_k \cdot SA_k \cdot wdc_k \right) \cdot FR_j \right]$$

$$RCC = \frac{V_{irr} - V'_{irr}}{V'_{irr}} \times 100$$

where the parameters are as follows, $V_{irr}$: volume of irrigation due to current/changed schedule (e.g., gal.); $V'_{irr}$: volume of irrigation due to previous schedule (e.g., gal.); $dur_{j,k}$: duration of station j in program k (e.g., minutes); $stc_k$: start time count four program k, $SA_k$: seasonal adjust for program k, $FR_j$: flow rate for station j (e.g., gal./min.); RCC: relative cost of change (e.g., percent); and $wdc_k$: watering day count for program k (e.g., # of watering days in a month).

Some embodiments attempt to aid the user in programming and/or defining irrigation programming and/or schedules, and help the user understand the programming being defined and/or previously defined by providing additional information to the user. For example, some embodiments display in a textual format additional natural language descriptions and/or explanations of the programming defined and/or changed by a user.

Figure 12:
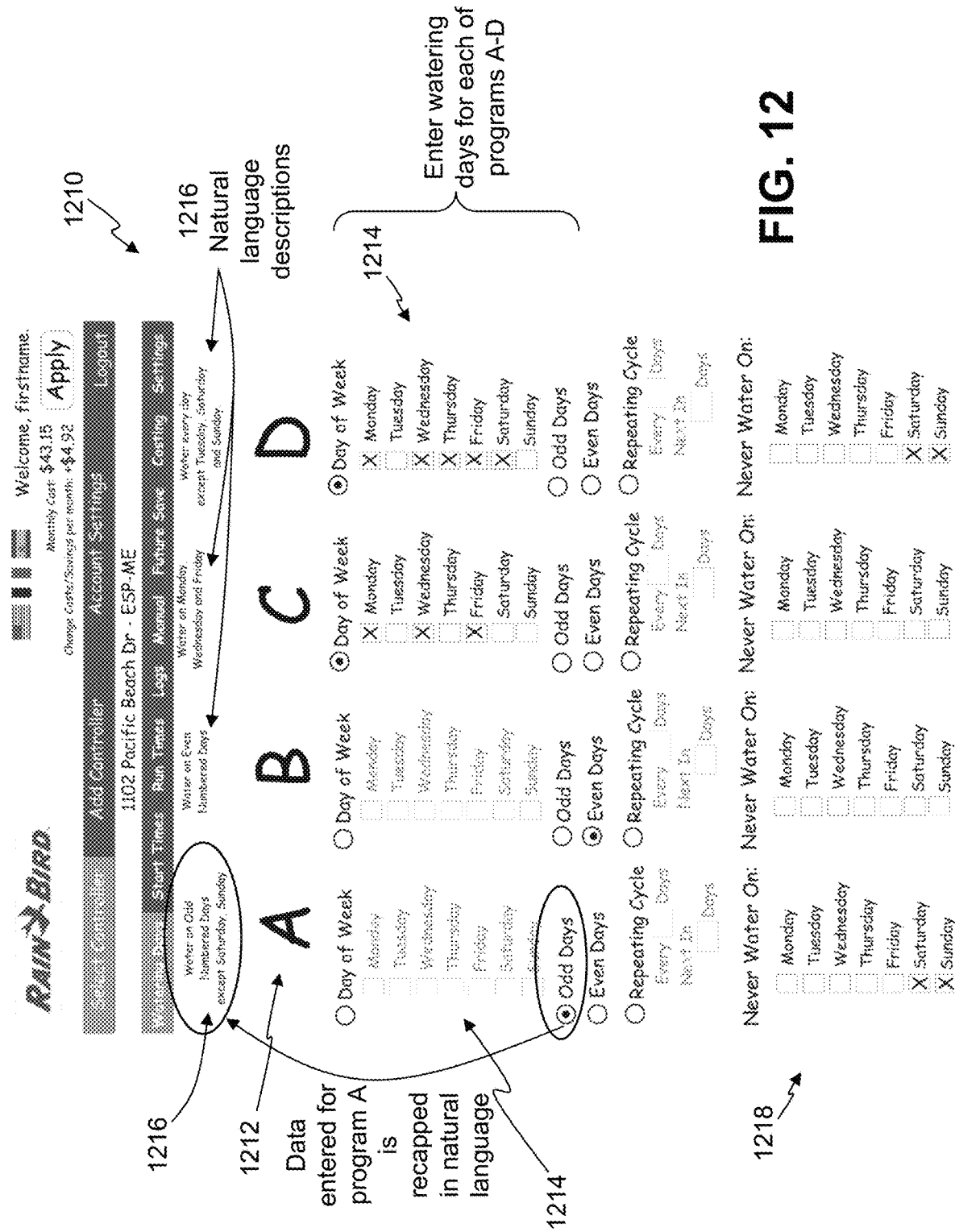
FIG. 12 shows a simplified, exemplary irrigation watering days user interface in accordance with some embodiments.

FIG. 12 shows a simplified, exemplary irrigation watering days user interface 1210 in accordance with some embodiments. This interface is displayed to the user by communicating the interface, portions of the interface or just the natural language description from the server 226, 810, and/or locally displaying the user interface through the user device 116 or the irrigation controller 114 (e.g., through an app or other such software on the user device or controller). In the example watering days interface 1210 of FIG. 12, the watering days interface 1210 identifies one or more irrigation programs 1212, corresponding days options 1214, natural language descriptions 1216 of the programming, and further day restrictions 1218. The natural language descriptions 1216 typically include textual content that explains and/or describes previous related irrigation programming steps and/or options, and in some instances further explains and/or describes current programming and/or options selected. In some embodiments, the natural language description may be limited to previous and/or current programming and/or selected options that are relevant and/or may affect options or selections available in a current portion of the programming process.

The display of the natural language descriptions 1216 of the programming details helps users understand and troubleshoot irrigation schedule programming. For example, when the user is entering or has entered irrigation schedule programming data (e.g., watering days, start times and run times), a natural language summary description 1216 of some or all of previous and/or currently specified programming steps (e.g., prior programming steps and/or current settings) can be displayed. This assists the user in better understanding what the irrigation schedule will be, and also helps to troubleshoot an irrigation schedule. Again, the user interface 1210 is typically communicated from the server over the communication network to the user device, and/or portions of the user interface and/or data to be incorporated into the interface are communicated over the communication network to the user device for display.

Further, in some embodiments, the displayed natural language description includes descriptions of previous options selected and/or defined that are dependent upon and/or affected by options and/or conditions available through the user interface actively displayed to the user. Additionally or alternatively, displayed natural language description includes descriptions of previous options selected and/or defined that have some affect on and/or limit options and/or conditions available through the user interface actively displayed to the user. Accordingly, the description 1216 may not be a complete description of current and/or previous programming, and instead may be limited to describing previous and/or programming steps have some dependency on currently available options and/or settings available to the user through the actively displayed user interface.

In some implementations, for example, as the user enters the watering days for each of the irrigation programs 1212 (e.g., irrigation programs A-D), a natural language description 1216 is displayed in the user interface and/or a separate user interface to explain some or all of the user's programming and/or selection(s) and/or previous programming. In the example depicted in FIG. 12, the user defines relative to irrigation program A to irrigate on "Odd Days" in the days option 1214, and further defines day restrictions 1218 of never watering on "Saturday" and "Sunday." Accordingly, the corresponding natural language description 1216 can describe, for example, "Water on Odd Numbered Days, except Saturday, Sunday." As another example, in the irrigation program D the user can define day options 1214 to irrigate on Monday, Wednesday, Thursday, Friday and Saturday, with further defined day restrictions 1218 of never watering on "Saturday" and "Sunday." Accordingly, the corresponding natural language description 1216 can describe, for example, "Water every day except Tuesday, Saturday and Sunday."

Figure 13:
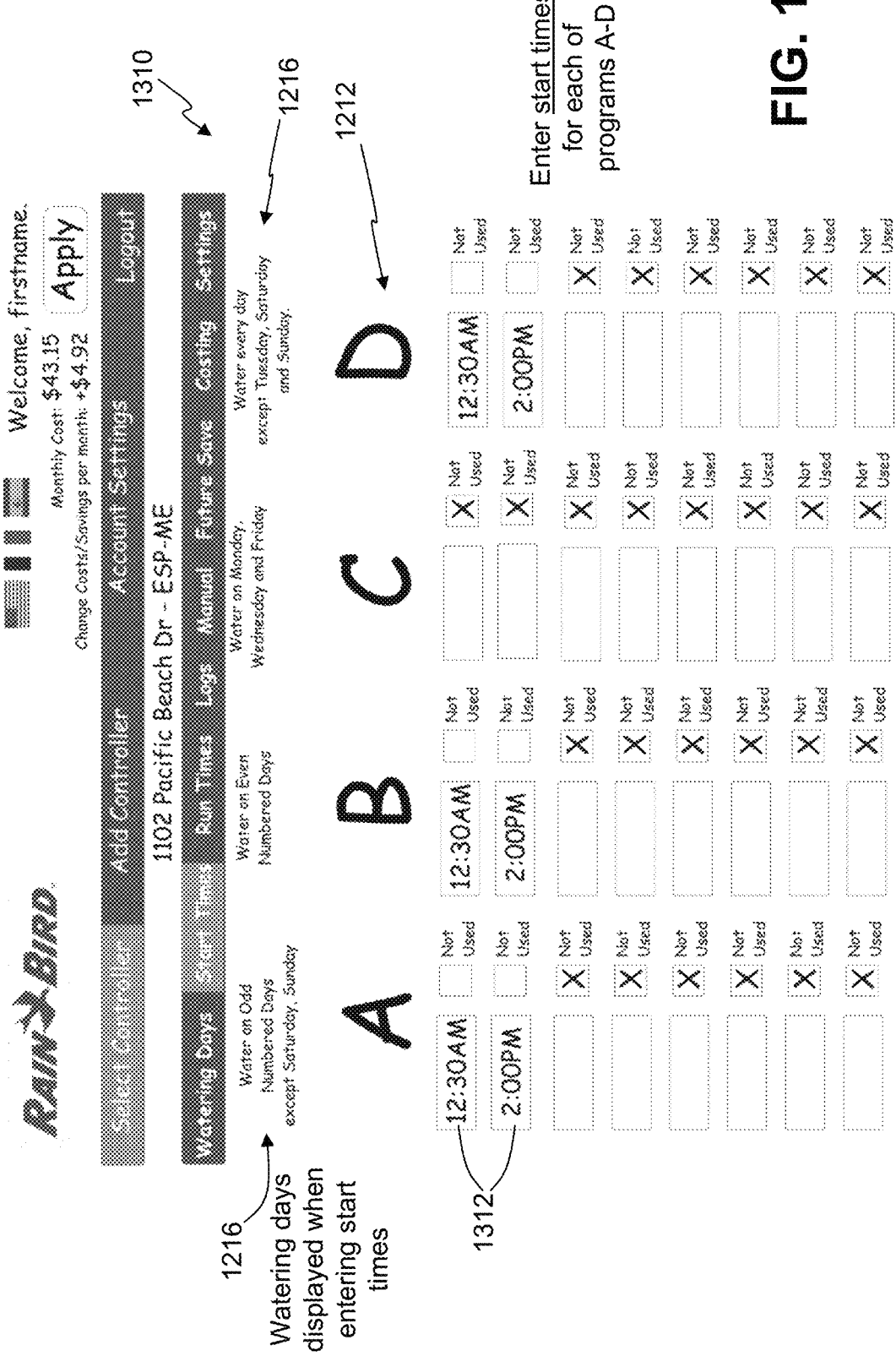
FIG. 13 shows a simplified, exemplary irrigation start times user interface in accordance with some embodiments.

FIG. 13 shows a simplified, exemplary irrigation start times user interface 1310 in accordance with some embodiments. In the example of FIG. 13, the start times interface 1310 identifies the one or more irrigation programs 1212, one or more start times 1312 corresponding to each irrigation program, and the natural language descriptions 1216 of the previous step of programming. Accordingly, the user while specifying the one or more start times 1312 knows, through the natural language descriptions 1216, what days were previously designated as irrigation days without having to go back to the watering days user interface 1210. In some embodiments, the natural language descriptions 1216 further include current programming as the user enters the programming. For example, as the user enters the start times for each of programs A-D 1212, a natural language description 1216 is displayed of the prior programming step (e.g., watering days) and to explain the user's current selection (e.g., relative to program A the natural language description could state "Water on Odd Numbered Days except Saturday, Sunday, at 12:30 AM and 2:00 PM").

Figure 14:
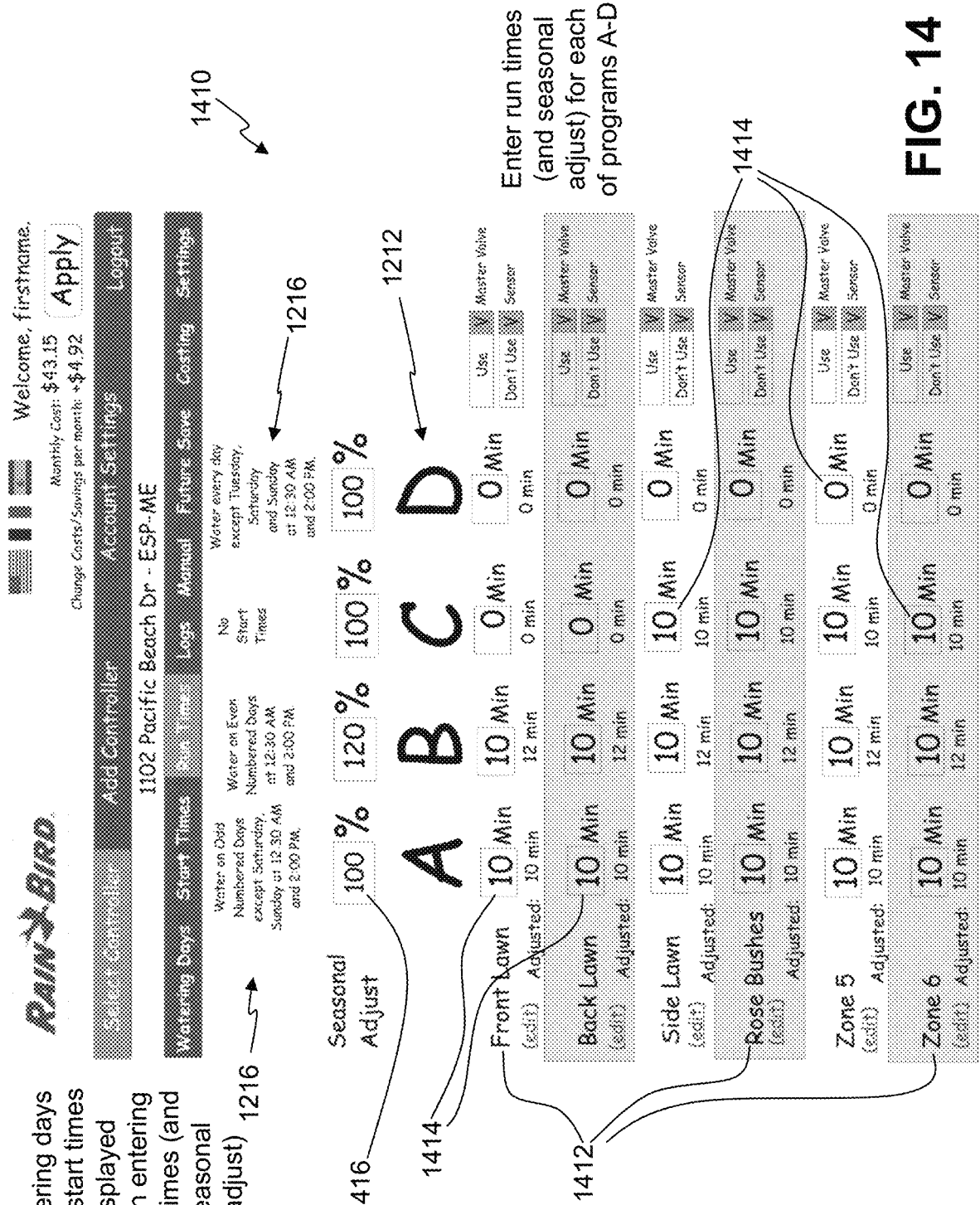
FIG. 14 shows a simplified, exemplary irrigation run times user interface in accordance with some embodiments.

FIG. 14 shows a simplified, exemplary irrigation run times user interface 1410 in accordance with some embodiments. In the example of FIG. 14, the run times interface 1410 identifies the one or more irrigation programs 1212, one or more zones and/or station identifiers 1412 corresponding to each irrigation program (e.g., "Front Lawn," "Back Lawn," "Side Lawn," "Rose Bushes," "Zone 5," "Zone 6" or other such zone identifiers), corresponding run time fields 1414, the natural language descriptions 1216 of one or more of the previous steps of programming. Other features and/or options may also be provided, such as seasonal adjust feature 1416 corresponding to one or more irrigation programs 1212, options to edit zone identifiers or names 1412 which may make understanding the programming easier, indications of a change to the runtime and other such features or options. For example, as the user enters the run times 1414 for each of programs A-D 1212, a natural language description 1216 is displayed of one or more the prior programming step or steps (e.g., watering days and start times). In some embodiments, the natural language description 1216 further includes an explanation of the user's current selection.

In some embodiments, one or more of the watering days interface 1210, the start times interface 1310, the run times interface 1410 and/or other such interfaces may further include the language options 1012-1014. Additionally, in some embodiments, one or more of the watering days interface 1210, the start times interface 1310, the run times interface 1410 and/or other such interfaces may further include the cost estimate user interface 1110.

In some embodiments, for example, the user interacts with a user interface displayed on the consumer electronic device 116, the irrigation controller 114, the server 810 or other device to program the irrigation schedule. The user interface includes multiple user selectable options configured to define parameters available in programming an irrigation schedule. For example, options can be included for designating irrigation watering days, designating run times and/or start times (e.g., by selecting one or more times from a listing of available times, entering or typing in the one or more times, or other such designations), designating non-irrigation days and/or times, designating sensor thresholds, designating cost thresholds, designating predicted cost (e.g., per gallon), and other such parameters that can be used with the irrigation controller and/or in determining irrigation scheduling. The user designates one or more of the multiple options in programming the irrigation schedule through the user interface. Again, this can include selecting an option from a listing of options, toggling an option between different states (e.g., on or off; high, medium, low; etc.), entering in information (e.g., alphanumeric characters), and the like. As a result of the designation of one or more of the options, one or more natural language descriptions of at least one or more of the designated options of the programmed irrigation schedule are displayed through a user interface. The natural language description describes the designated options explaining one or more of the current and/or previous options and/or how those options were designated in programming the irrigation controller. It is noted, that the natural language description can be applied to a previously defined irrigation schedule, such as when a user is reviewing a schedule and/or making modifications to the schedule.

In some embodiments, the natural language description is displayed in a user interface as the user makes selections and/or designates one or more parameters. Additionally or alternatively, the natural language description can be displayed and/or carried over to subsequent and/or previous user interfaces as the user programs and/or reviews an irrigation schedule. For example, a first user interface can be displayed that includes a first plurality of options (e.g., allowing a user to designate watering days). In those embodiments where a subsequent user interface is displayed while programming an irrigation schedule, the natural language can be described in the second subsequent user interface that typically includes a second plurality of options configured to be designated by the user in programming the irrigation schedule, where the displayed natural language description in the second user interface is displayed in cooperation with the second plurality of options. Further, in some implementations, the natural language description displayed in the second user interface describes the designated options that have a dependency on at least some of the second plurality of options displayed in the second user interface, which is typically associated with the first user interface. For example, the options in the second user interface may limit what is described in the natural language description to describing designated options that are relevant to, that are affected by and/or affect one or more of options of the second plurality of options.

In some embodiments, natural language description is displayed on a display of a user device 116, an irrigation controller 114, the server 810 and the like while programming and/or reviewing an irrigation schedule. For example, the user device 116 can be configured, such as through software and/or an app on the user device, to utilize the designated options to identify natural language descriptions, such as selecting one or more predefined natural language description depending on the designated options and/or the combinations of designated options. Similarly, an irrigation controller can also display natural language description as the user programs and/or reviews one or more irrigation schedules. In other embodiments, the server generates the natural language descriptions based on designated options and forwards the natural language description/s to the user device, irrigation controller or the like. As an example, the server may communicate a first user interface, and based on designated options in the first user interface, the server communicates a second user interface with a second set of options and the relevant natural language description of one or more of the designated options in the previous user interface. Additionally, the one or more user interfaces may be associated with a user account and/or users may be restricted access to a user account without first authorizing access to an account associated with an irrigation system and/or wireless adapter.

For example, in some embodiments, the server 226, 810 can detect access by a remote user device 116 selectively communicating with the server over the distributed network 224 to program and/or modify an irrigation schedule or program. An irrigation system 808 and/or wireless adapter 802 is identified that is associated with the user operating the user device and with which the user has authorization (e.g., the wireless adapter 802 is associated with the user account the user has successfully accessed, such as by providing user name and password). Again, first irrigation system is one irrigation system of a plurality of irrigation systems in communication with the server and located remote from the server at different sites where irrigation it to be implemented by the corresponding ones of the plurality of irrigation systems. One or more user interfaces are communicated over the distributed network 224 to the user device 116 and/or displayed through an app on the user device. At least one of the user interfaces allows user to program an irrigation schedule. The programming of an irrigation schedule can include programming a complete irrigation schedule, modifying an irrigation schedule, defining parameters, runtimes, start times, days of watering and/or other such programming. During the programming, at least a portion of a programmed irrigation schedule is identified and a natural language description of the portion of the programmed irrigation schedule is displayed.

Components

Figure 15:
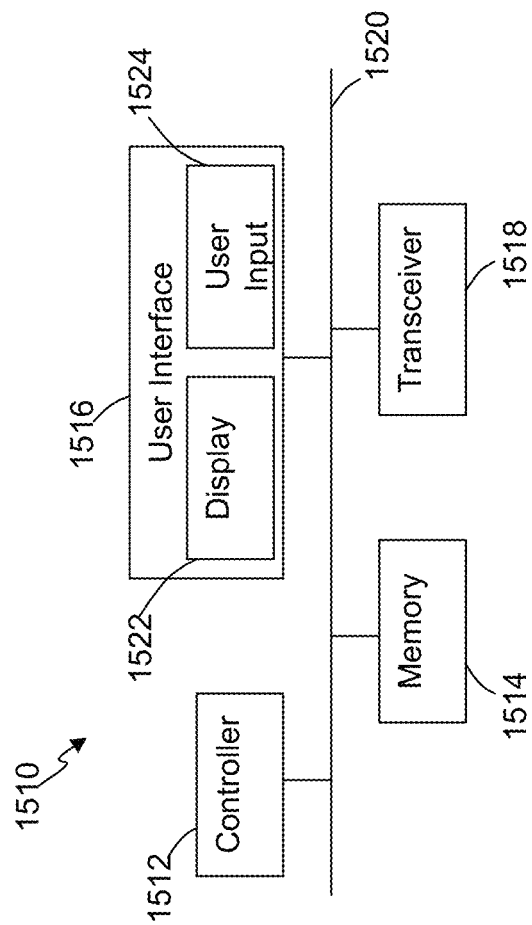
FIG. 15 illustrates a system for use in implementing methods, techniques, devices, apparatuses, systems, servers, sources and the like in providing user interactive virtual environments in accordance with some embodiments.

The systems, devices, methods, techniques, services, servers, sources and the like described herein may be utilized, implemented and/or run on many different types of devices and/or systems. Referring to FIG. 15, there is illustrated a system 1510 that may be used for any such implementations, in accordance with some embodiments. One or more components of the system 1510 may be used for implementing any system, apparatus or device mentioned above or below, or parts of such systems, apparatuses or devices, such as for example any of the above or below mentioned wireless adapters 112, 212, 312, 412, gateway/network adapter 404, irrigation controllers 114, consumer electronic devices 116-117, servers 226, 332, and the like. However, the use of the system 1510 or any portion thereof is certainly not required.

By way of example, the system 1510 may comprise a controller or processor module 1512, memory 1514, an optional user interface 1516, communication transceiver 1518 (e.g., wired and/or wireless), and one or more communication links, paths, buses or the like 1520. A power source or supply (not shown) is included or coupled with the system 1510 (e.g., the power supply is external to the system 1510). The controller 1512 can be implemented through one or more processors, microprocessors, central processing unit, logic, local digital storage, firmware and/or other control hardware and/or software, and may be used to execute or assist in executing the steps of the methods and techniques described herein, and control various communications, programs, content, listings, services, interfaces, etc. The user interface 1516 can allow a user to interact with the system 1510 and receive information through the system. In some instances, the user interface 1516 includes a display 1522 and/or one or more user inputs 1524, such as a buttons, switches, rotary dial, keypad, keyboard, remote control, touch pad, mouse, track ball, touch screen, etc., which can be part of or wired or wirelessly coupled with the system 1510.

Typically, the system 1510 further includes one or more communication interfaces, ports, transceivers 1518 and the like allowing the system 1510 to communication over a distributed network, a local network, the Internet, communication link 1520, other networks or communication channels with other devices and/or other such communications. Further the transceiver 1518 can be configured for wired, wireless, optical, fiber optical cable or other such communication configurations or combinations of such communications.

The system 1510 comprises an example of a control and/or processor-based system with the controller 1512. Again, the controller 1512 can be implemented through one or more processors, controllers, central processing units, logic, software and the like. Further, in some implementations the controller 1512 may provide multiprocessor functionality.

The memory 1514, which can be accessed by the controller 1512, typically includes one or more processor readable and/or computer readable media accessed by at least the controller 1512, and can include volatile and/or nonvolatile media, such as RAM, ROM, EEPROM, flash memory and/or other memory technology. Further, the memory 1514 is shown as internal to the system 1510; however, the memory 1514 can be internal, external or a combination of internal and external memory. Similarly, some or all of the memory can be internal to the controller 1512 and/or one or more processors used in implementing the controller 1512. External memory can be substantially any relevant memory such as, but not limited to, one or more of flash memory secure digital (SD) card, universal serial bus (USB) stick or drive, other memory cards, hard drive and other such memory or combinations of such memory. The memory 1514 can store code, software, executables, scripts, data, content, text, parameters, settings, schedules, conditions, programming, programs, identifiers, log or history data, user information, location information, environmental information, and the like.

Figure 16:
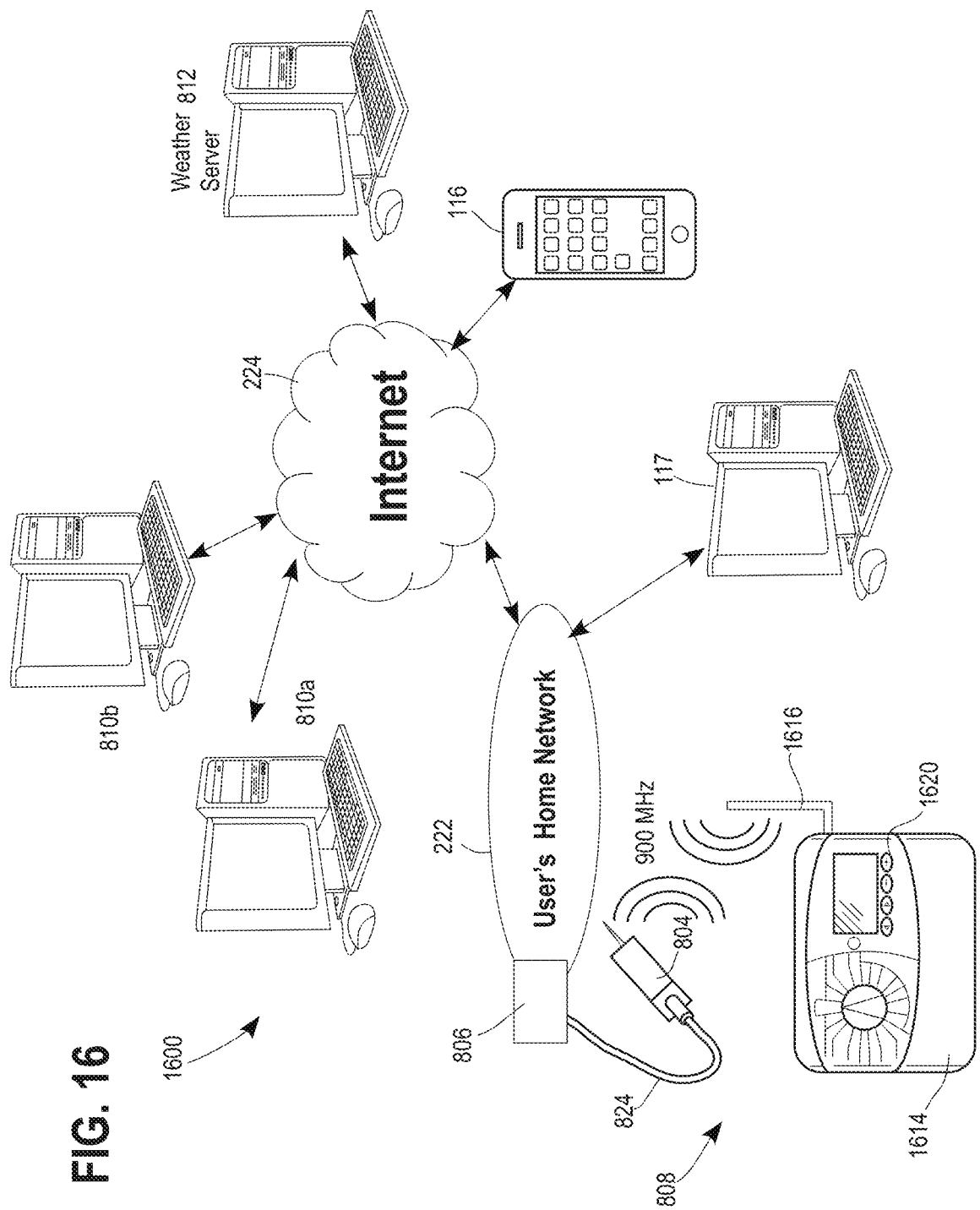
FIG. 16 shows a simplified block diagram of an exemplary system providing wireless access to one or more irrigation controllers, in accordance with some embodiments.

FIG. 16 shows a simplified block diagram of an exemplary system 1600 providing wireless access to one or more irrigation controllers 1614, in accordance with some embodiments. The system 1600 is similar to the system 800 of FIG. 8. In system 1600, however, the wireless adapter is directly cooperated with or otherwise incorporated into the irrigation controller 1614. Accordingly, the wireless communication with the network adapter 804 is implemented from the irrigation controller 1614 and/or a wireless adapter cooperated directly with the irrigation controller. In some embodiments, the irrigation controller includes a wireless transceiver coupled with an antenna 1616 to provide for the wireless communication (e.g., via 900 MHz, WiFi, etc.). The server 810 continues to communicate with the wireless adapter of the irrigation controller 1614 through the wireless communication established between the network adapter 804 and the irrigation controller 1614 containing the wireless adapter. In some embodiments, the irrigation controller includes a user interface 1620. The user interface can be configured to include one or more buttons, display, rotary dial, options, etc. In some implementations, a user establishes an association between the irrigation controller 1614 and a user account maintained by the server 810, for example, by pressing one or more buttons 1620 within a predefined time of requesting the association and/or in an instruction by the server.

FIG. 17 illustrates a simplified block diagram of an exemplary irrigation controller 1614 with a wireless adapter 1702 cooperated with the irrigation controller, in accordance with some embodiments. In some embodiments, the wireless adapter is partially or fully inserted into and/or otherwise mounted with the irrigation controller 1614. For example, the wireless adapter can be configured to insert into a slot, port or the like within the irrigation controller 1614 to establish direct communication with the irrigation controller.

The wireless adapter 1702 continues to provide the wireless communication with the network adapter 804, accesses a local area network 222, establishes a wireless local area network or other such communication networks. In some embodiments, the wireless adapter comprises a controller that controls a wireless transceiver coupled with an antenna 1716 used in wireless communication. The controller controls the functions of the wireless adapter, including the wireless communications and/or communications with the irrigation controller 1614. Further, in at least some embodiments, the wireless adapter 1702 continues to request and/or poll information (e.g., status information) from the irrigation controller 1614 and locally stores that information to be delivered to the server 810 or user device 116 (e.g., in response to a request). In some embodiments, the information is maintained at the wireless adapter until request, it is replace by other information, the information becomes stale (e.g., a threshold time expires), or the like. The wireless adapter 1702, in some embodiments, is further configured to communicate with one or more local sensors and use that information to locally determine whether local irrigation is to be interrupted, suspended and/or whether the irrigation schedule is to be modified. For example, the wireless adapter 1702 can store one or more thresholds (such as rain thresholds, temperature thresholds, etc.), which may be received from the server or a user (e.g., defined by a user at a user device 116 and forwarded through the communication network 224) and locally stored. Using the threshold information the wireless adapter can make determinations about whether to interrupt and/or modify irrigation.

FIG. 18 illustrates a simplified block diagram of an exemplary irrigation controller 1614 that incorporates the functionality of a wireless adapter, in accordance with some embodiments. The irrigation controller 1614 includes one or more controllers and/or processors 1812 coupled with internal and/or external memory 1814 that stores relevant information, schedules, parameters, settings, thresholds and the like. For example, the memory 1814 stores programs, firmware, software and the like to be implemented by the controller 1812 to provide irrigation control as well as the functionality of the wireless adapter. The controller 1812 can further include the functionality of a wireless transceiver, or the irrigation controller 1614 can include a separate wireless transceiver to provide for wireless communication.

FIG. 19 illustrates a simplified block diagram of an exemplary irrigation controller 1912 with a wireless adapter 1902 removably positioned with a backplane 1920 of the irrigation controller, in accordance with some embodiments. The irrigation controller includes a control panel 1914 that cooperates with a housing 1918. The housing is typically weather resistant providing at least some protection for the control panel and other components from environmental conditions. The control panel 1914 includes one or more processors, controllers, microcontrollers, memory, and the like to implement the irrigation schedule. The control panel 1914 further opens and/or can be removed to expose a backplane 1920 of the irrigation controller. The backplane 1920 comprises communication and/or power lines and further allows one or more modules 1922 to be mounted with the backplane 1920 and establish communication with the control panel 1914. For example, one or more of the modules 1922 can be station modules that are configured to drive one or more valve solenoids via station lines 1924 as instructed by the control panel 1914.

In some embodiments, a wireless adapter is implemented as a wireless adapter module or smart module 1902 that is configured to mount with the backplane 1920 and establish communication over the backplane with the control panel 1914. Accordingly, the wireless adapter 1902 provides the wireless communication with the network adapter 804. In some embodiments, an antenna 1916 may extend from the wireless adapter 1902, or the wireless adapter may couple with an antenna mounted on the housing 1918 of the irrigation controller 1912. Further, the wireless adapter module 19102 can store information, communicate some or all of that information to the server 810, receive irrigation schedules and/or commands (e.g., as defined by the server and/or a user through a user device 116), and other such functionality as described above and below.

Figure 20:
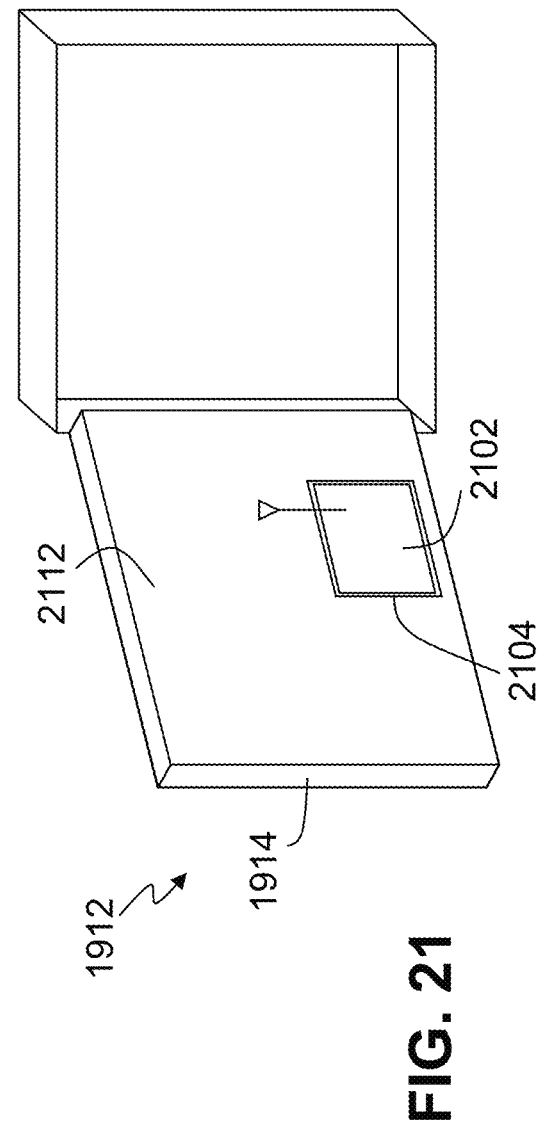
FIG. 20 illustrates a simplified block diagram of an exemplary irrigation controller with a control panel and a wireless adapter cooperated with the control panel, in accordance with some embodiments.

FIG. 20 illustrates a simplified block diagram of an exemplary irrigation controller 1912 with a control panel 1914 and a wireless adapter 2002 cooperated with the control panel, in accordance with some embodiments. The control panel 1914 provides control in implementing irrigation schedules. Further, the control panel typically includes a user interface that allows a user to interact with the irrigation controller (e.g., program irrigation schedule, obtain status information, set thresholds, etc.). The wireless adapter 2002 is configured to be removably cooperated with the control panel. For example, the wireless adapter 2002 can be configured as a removable module, cartridge or other such removable plug-in device. The removable wireless adapter 2002 can cooperate with the control panel 1914 through a slot 2012, port, connector or other such configuration providing communication between the control panel 1912 and the wireless adapter 2002. In some embodiments, the wireless adapter 2002 is at least partially inserted into a slot 2012 mating a connector of the wireless adapter with a connector within the slot of the control panel. The wireless adapter 2002 provides the wireless communication between the wireless adapter and the network adapter 804. Again, this communication is typically a point-to-point communication and can use 900 MHz, Bluetooth, WiFi, or the like.

Figure 21:
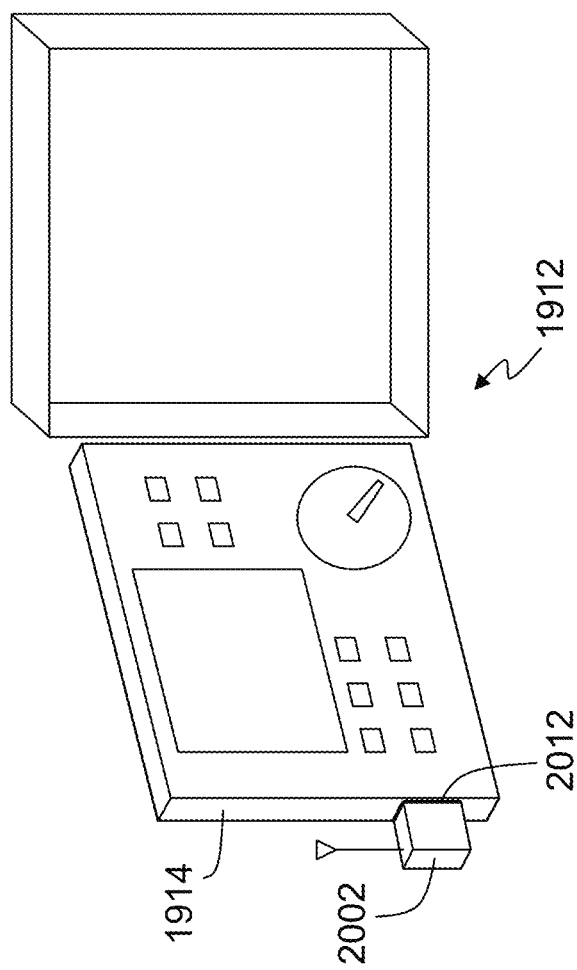
FIG. 21 illustrates a simplified block diagram of an exemplary irrigation controller with a control panel and a wireless adapter cartridge that cooperates with a communication cartridge bay on the control panel, in accordance with some embodiments.

FIG. 21 illustrates a simplified block diagram of an exemplary irrigation controller 1912 with a control panel 1914 and a wireless adapter cartridge 2102 that cooperates with a communication cartridge bay 2104. In some embodiments, the cartridge bay 2104 is on a backside 2112 of the control panel. The wireless adapter cartridge 2102 provides the wireless communication for the irrigation controller 1912 with the network adapter 804. Again, the wireless adapter cartridge 2102 can store information obtained from the control panel 1914 of the irrigation controller 1912 and forward that information to the server 810 (e.g., in response to a request from the server or a user), receive irrigation commands and/or schedules and provide the other functionality of the wireless adapter described above and below. In some embodiments, the wireless adapter 2102 includes an antenna or couples with an antenna on the irrigation controller.

One or more of the embodiments, methods, processes, approaches, and/or techniques described above or below may be implemented in one or more computer programs executable by a processor-based system. By way of example, such a processor based system may comprise the processor based system 1510, an irrigation controller 114 (and/or control panel of an irrigation controller), a wireless adapter 112, 212, 312, 412, network adapter 404, server, computer, tablet, smart phone, laptop, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described processes, steps or techniques for allowing one or more users to wirelessly and remotely interact with an irrigation controller 114. As another example, such computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium (e.g., a tangible, computer readable, storage medium) configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: establishing a wireless network through a wireless adapter; allowing a remote device to wirelessly join the wireless network; and allowing the remote device to communicate and interact with an irrigation controller directly coupled with the adapter.

Some embodiments provide systems used in controlling irrigation that include: an irrigation controller configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site; a wireless adapter directly communicationally coupled through a direct wired connection with the irrigation controller; and a network adapter wirelessly coupled over a point-to-point wireless communication path with the wireless adapter, wherein the network adapter further couples through a direct wired connection with a local router of a local area network, wherein the local router is further configured to provide communication over a distributed network to a remote server; wherein the wireless adapter is configured to communicate with the remote server, through the network adapter and over a distributed network, to receive, through the remote server, the irrigation schedule defined by a user through a first user device, of the plurality of user devices, in communication with the server over the distributed network, and to forward the irrigation schedule to the irrigation controller to be implemented by the irrigation controller.

Other embodiments provide methods for use in controlling irrigation. Some of these methods comprise: receiving, at a server from over a distributed communication network, an irrigation schedule from a first remote user device of a plurality of user devices selectively coupled with the server over the distributed communication network; identifying, at the server, a first irrigation control system of a plurality of irrigation control systems with which a first user operating the first user device is associated, wherein each of the plurality of irrigation systems located at different sites where irrigation is to be controlled; communicating, from the server, a graphical user interface to the first user device; receiving, through the graphical user interface and from the first user device, a command to be directed to the first irrigation control system; identifying a wireless adapter within the first irrigation control system; and communicating, from the server and over the distributed communication network, the command to the wireless adapter configured to receive the command over a point-to-point wireless communication channel from a network adapter coupled with the distributed network and forward the command to an irrigation controller of the first irrigation control system over a direct wireline connection between the wireless adapter and the irrigation controller.

In some instances, methods may additionally or alternatively comprise: identifying, at the server, which one of a plurality of irrigation control systems the first user device is associated, each of the plurality of irrigation systems located at different sites where irrigation is to be controlled; identifying, at the server, a first irrigation control system with which a first user, using the first user device, is associated, each of the plurality of irrigation systems located at different sites where irrigation is to be controlled; and identifying, at the server, a first irrigation control system of a plurality of separate irrigation control systems located at different locations with which a first user, using the first user device, is associated, each of the plurality of irrigation systems located at different sites where irrigation is to be controlled.

Further, some embodiments include a method for use in implementing irrigation, the method comprising: communicating, from a server and over a distributed network, a user interface to a remote user device; receiving at the server, from the user device, an irrigation schedule; identifying an irrigation controller that is associated with a user of the user device; communicating the irrigation schedule to a local router of a local area network at a site where the irrigation controller is located; forwarding the irrigation schedule from the local router to a wireless network adapter coupled through a direct wireline connection with the local router; wirelessly transmitting the irrigation schedule over a point-to-point wireless communication channel from the wireless network adapter to a wireless adapter; and transferring the irrigation schedule from the wireless adapter over a wireline connection to the irrigation controller.

Other embodiments provide a method for use in controlling irrigation, the method comprising: receiving, at a wireless adapter of an irrigation system of a site where irrigation is implemented and controlled, status information from an irrigation controller directly coupled through a wireline with the wireless adapter, wherein the wireless adapter is separate from and external to the irrigation controller; locally storing within the wireless adapter the status information in response to receiving the status information; receiving, at the wireless adapter from over a direct point-to-point wireless communication path, a request for information from a server at a location remote from the site; determining, at the wireless adapter, whether information consistent with the poll request is stored locally on the wireless adapter; retrieving relevant information from the information locally stored on the wireless adapter consistent with the poll request; and communicating a response over the point-to-point wireless communication path intended for the server in response to the poll request.

Further, some embodiments provide a system for use in controlling irrigation. The system comprises: an irrigation controller configured to be positioned locally at a site where irrigation is to be controlled; one or more valves at the site, the one or more valves are coupled with the irrigation controller, wherein the irrigation controller is configured to control the activation and deactivation of the one or more valves in accordance with an irrigation schedule stored in the irrigation controller to implement irrigation at the site; and a wireless adapter communicationally coupled over a wireline with the irrigation controller, wherein the wireless adapter is configured to: wirelessly communicate with a network adapter over a point-to-point wireless communication path, wherein the network adapter further couples with a local router providing communication over a distributed communication network; communicate, through the network adapter, over the distributed communication network with a remote irrigation server; and receive, through the server, the irrigation schedule defined by a user through a consumer electronic device in communication over the distributed communication network with the server.

Additionally, some embodiments provide methods of providing irrigation control comprising: detecting, at a server, access by a remote user device selectively communicating with the server over a distributed communication network; identifying a first irrigation system associated with a user operating the user device and with which the user has authorization, wherein the first irrigation system is one irrigation system of a plurality of irrigation systems in communication with the server, each of the plurality of irrigation systems is located remote from the server and at different sites where irrigation it to be implemented by a corresponding one of the plurality of irrigation systems; communicating, over the distributed network to the user device, a user interface to be displayed on the user device and configured to allow the user to program an irrigation schedule; identifying at least a portion of a programmed irrigation schedule; and displaying a natural language description of at least the portion of the programmed irrigation schedule.

Further, in some embodiments, a user device located remote from a site where the irrigation controller is located is communicationally coupled, over a distributed network, with a server, and wherein the user device displays a user interface allowing the user to program an irrigation schedule and displays a natural language description of a summary of prior entered scheduling information relevant to irrigation schedule programming options currently displayed on the user interface and a summary of at least one or more irrigation programming options specified and currently displayed through the user interface.

Similarly, some embodiments provide methods of programming irrigation schedules comprising: displaying a first user interface comprising a first plurality of options configured to be designated by a user in programming an irrigation schedule; detecting designations by the user of one or more of the first plurality of options; and displaying a second user interface associated with the first user interface, wherein the second user interface comprises: a second plurality of options configured to be designated by the user in programming an irrigation schedule; and a natural language description of a least a first designated option of the designated one or more options of the first plurality of options.

Other embodiments provide methods of providing irrigation control, comprising: detecting, at a server, access by a remote user device selectively communicating with the server over a distributed communication network; identifying a first irrigation system associated with a user operating the user device and with which the user has authorization, wherein the first irrigation system is one irrigation system of a plurality of irrigation systems in communication with the server, each of the plurality of irrigation systems is located remote from the server and at different sites where irrigation it to be implemented by a corresponding one of the plurality of irrigation systems; forwarding an interactive user interface to the user device to be displayed on the user device; determining an irrigation schedule of an irrigation controller of the irrigation system; and receiving, at the server and from the user device, a request to change the irrigation schedule. Further, some embodiments additionally comprise identifying the change to the irrigation schedule; calculating a predicted change in a cost of irrigation according to the change to the irrigation schedule; and forwarding the predicted change in cost to the user device to be displayed to the user.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for use in controlling irrigation, the system comprising:
   an irrigation controller configured to be positioned locally at a site where irrigation is to be controlled, wherein the irrigation controller is configured to couple with one or more valves at the site and the irrigation controller is configured to control activation and deactivation of the one or more valves in accordance with an irrigation schedule stored in the irrigation controller to implement irrigation at the site, wherein the irrigation controller comprises a user interface and a display to display irrigation schedule information;
   a wireless adapter directly communicationally coupled through a direct wired connection with the irrigation controller;
   wherein the wireless adapter is configured to wirelessly communicate, through a local router at the site, over a distributed network with a remote mobile electronic device;
   wherein the wireless adapter is configured to poll the irrigation controller to acquire status information comprising an irrigation schedule from the irrigation controller, and to receive a request communicated from the mobile electronic device, through the local router and over the distributed network, requesting the status information; and
   wherein the wireless adapter is configured to communicate the status information over the distributed network to the mobile electronic device.

2. The system of claim 1, wherein
the wireless adapter is configured to initiate the communication of the status information to the mobile electronic device in response to the poll request from the mobile electronic device.

3. The system of claim 1, wherein the wireless adapter is configured to receive, from over the distributed network, a modification to the irrigation schedule that is defined by a user through the mobile electronic device; and
the wireless adapter is configured to forward the modification to the irrigation schedule to the irrigation controller to be implemented by the irrigation controller.

4. The system of claim 1, further comprising:
a sensor at the site and in wireless communication with the wireless adapter, wherein the wireless adapter is configured to wirelessly receive sensor data from the sensor and the wireless adapter is configured to adjust the irrigation schedule in response to the received sensor data.

5. The system of claim 1, further comprising a remote server, wherein the server is located remote from the site and is accessible by multiple users from a plurality of user devices accessing different user accounts associated with different irrigation systems at different irrigation sites, wherein the server couples with the distributed network and is configured to communicate over the distributed network with the wireless adapter and to selectively communicate over the distributed network with the plurality of user devices each operated by a respective one of the multiple users to provide at least some of the status information to the user devices, wherein the user devices comprises the mobile electronic device.

6. The system of claim 1, wherein the wireless adapter is further configured to identify a change to the irrigation schedule specified by a user, calculate a predicted change in a cost of irrigation according to the change to the irrigation schedule, and communicate, over the distributed network, the predicted change in cost to the user.

7. The system of claim 1, wherein the mobile electronic device is configured to display a user interface configured to allow the user to program the irrigation schedule, identify at least a portion of the programmed irrigation schedule, and display a natural language description of at least the portion of the programmed irrigation schedule.

8. The system of claim 1, wherein the mobile electronic device is configured to display a user interface allowing the user to program the irrigation schedule and display a natural language description of a summary of prior entered irrigation scheduling information and currently entered irrigation scheduling information.

9. The system of claim 1, wherein the wireless adapter is configured to: receive weather forecast data predicting pending weather conditions, determine whether irrigation is to be interrupted at the irrigation controller as a function of the weather forecast data, and communicate an interrupt command to the irrigation controller in response to determining that irrigation is to be interrupted at the irrigation controller.

10. The system of claim 1, wherein the wireless adapter comprises a communication button, wherein the wireless adapter is configured to communicate, in response to detecting an activation of the communication button, an identification of the wireless adapter to a server in establishing an association of the wireless adapter with a first user account of a plurality of user accounts managed by the server.

11. The system of claim 1, further comprising:
an application configured to be executed on the mobile electronic device, wherein the application when executed on the mobile device is configured to:
receive, from the user through a displayed graphical user interface, modifications to the irrigation schedule; and
wirelessly communicate to the wireless adapter, via the distributed network, the modifications to the irrigation schedule;
wherein the wireless adapter is configured to forward the modification of the irrigation schedule to the irrigation controller to be implemented by the irrigation controller causing the irrigation controller to implement the modifications to the irrigation schedule.

12. The system of claim 1, wherein the wireless adapter comprises an HTTP server configured to communicate information comprising HTML pages to the mobile electronic device enabling user interaction with the irrigation controller and adjust the irrigation schedule based on the HTML pages utilizing graphics and input capabilities of the mobile electronic device.

13. The system of claim 1, wherein the irrigation controller comprises a control panel comprising the user interface, the display and a connector slot;
wherein the wireless adapter is configured to be inserted into the connector slot of the control panel and communicatively couple with the irrigation controller.

14. The system of claim 1, wherein the irrigation controller comprises a backplane, and wherein the wireless adapter is configured to mount with the backplane of the irrigation controller and communicatively couple through the backplane with the irrigation controller.

15. The system of claim 1, wherein the wireless adapter is configured to:
host a local wireless network;
enable a second mobile electronic device to join the local wireless network; and
establish, over the local wireless network, direct wireless communication with the second mobile electronic device.

16. The system of claim 15, wherein the wireless adapter, in hosting the local wireless network, is configured to host the local wireless network such that the local wireless network is independent and separate from a separate site wireless network at the site hosted by a separate device at the site.

17. The system of claim 1, wherein the irrigation controller is configured to: identify a change to the irrigation schedule made at the irrigation controller, and communicate the change through the wireless adapter to the mobile electronic device.

18. A method of controlling irrigation, the method comprising:
communicating, from a wireless adapter over a direct wireline connection coupling the wireless adapter to an irrigation controller, a request to the irrigation controller for status information comprising an irrigation schedule from the irrigation controller, wherein the wireless adapter is separate from and external to the irrigation controller, and wherein the wireless adapter and the irrigation controller are located at a site where the irrigation controller is configured to control irrigation, wherein the irrigation controller comprises a user interface and a display to display irrigation schedule information;

receiving, at the wireless adapter in response to polling of the irrigation controller by the wireless adapter, the status information from the irrigation controller;

storing the status information locally at the wireless adapter;

receiving, at the wireless adapter through a local router and over a distributed network, a request from a mobile electronic device for the status information; and communicating, from the wireless adapter through the local router and over the distributed network, to the mobile electronic device the status information retrieved from the local storage of the wireless adapter.

19. The method of claim 18, further comprising:

further polling the irrigation controller, from the wireless adapter and in response to the wireless adapter receiving the request from the mobile electronic device, requesting current status information;

receiving current status information from the irrigation controller; and communicating, from the wireless adapter, the current status information in addition to the status information locally stored at the wireless adapter.

20. The method of claim 18, further comprising:

receiving, at the wireless adapter weather forecast data predicting pending weather conditions;

determining at the wireless adapter whether irrigation is to be interrupted at the irrigation controller as a function of the weather forecast data; and communicating, from the wireless adapter in response to determining that irrigation is to be interrupted, an interrupt command to the irrigation controller configured to cause the irrigation controller to interrupt irrigation.

21. The method of claim 18, further comprising:

receiving, at a server that is remote from the site, weather forecast data predicting pending weather conditions;

determining whether irrigation is to be interrupted at the irrigation controller as a function of the weather forecast data; and communicating, from the server, an interrupt command to the wireless adapter in response to determining that irrigation is to be interrupted at the irrigation controller.

* * * * *

UNITED STATES PATENT AND TRADEMARK OFFICE
CERTIFICATE OF CORRECTION

| | | |
|---|---|---|
| PATENT NO. | : 11,109,546 B2 | Page 1 of 1 |
| APPLICATION NO. | : 16/408066 | |
| DATED | : September 7, 2021 | |
| INVENTOR(S) | : Steven W. Weiler et al. | |

It is certified that error appears in the above-identified patent and that said Letters Patent is hereby corrected as shown below:

On the Title Page

Item (73) Assignee, delete "Walmart Apollo, LLC" and replace with --Rain Bird Corporation--.

Item (73) Assignee, delete "Bentonville, AR" and replace with --Azusa, CA--.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*